(12) United States Patent
Kim et al.

(10) Patent No.: US 11,762,430 B2
(45) Date of Patent: Sep. 19, 2023

(54) STRUCTURE OF HINGE FOR FOLDABLE ELECTRONIC DEVICE, AND ELECTRONIC DEVICE INCLUDING THE SAME

(71) Applicant: Samsung Electronics Co., Ltd., Suwon-si (KR)

(72) Inventors: Jaehee Kim, Suwon-si (KR); Chongkun Cho, Suwon-si (KR); Hyungsoo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 212 days.

(21) Appl. No.: 17/349,253

(22) Filed: Jun. 16, 2021

(65) Prior Publication Data

US 2022/0011827 A1    Jan. 13, 2022

Related U.S. Application Data

(63) Continuation of application No. PCT/KR2021/006501, filed on May 25, 2021.

(30) Foreign Application Priority Data

Jul. 13, 2020  (KR) .................. 10-2020-0086040

(51) Int. Cl.
*G06F 1/16* (2006.01)
*F16C 11/04* (2006.01)

(52) U.S. Cl.
CPC .......... *G06F 1/1681* (2013.01); *F16C 11/045* (2013.01)

(58) Field of Classification Search
None
See application file for complete search history.

(56) References Cited

U.S. PATENT DOCUMENTS

| | | |
|---|---|---|
| 9,250,733 B2 | 2/2016 | Lee et al. |
| 9,557,771 B2 | 1/2017 | Park et al. |
| 9,921,613 B2 | 3/2018 | Kuramochi |
| 10,037,058 B2 | 7/2018 | Kato |
| 10,356,919 B2 | 7/2019 | Bi |

(Continued)

FOREIGN PATENT DOCUMENTS

| | | |
|---|---|---|
| KR | 10-2015-0096827 A | 8/2015 |
| KR | 10-2015-0142290 A | 12/2015 |

(Continued)

OTHER PUBLICATIONS

International Search Report and Written Opinion dated Sep. 28, 2021, issued in International Patent Application No. PCT/KR2021/006501.

*Primary Examiner* — Anthony Q Edwards
*Assistant Examiner* — Rashen E Morrison
(74) *Attorney, Agent, or Firm* — Jefferson IP Law, LLP

(57) ABSTRACT

A hinge structure is provided. The hinge structure includes a first rotary member connected with a first housing, a second rotary member connected with a second housing, a gear structure that makes the first rotary member and the second rotary member operate in conjunction with each other, a first arm connected with the first rotary member, a second arm connected with the second rotary member, a first torque providing member that fastens the first arm and the first rotary member, and a second torque providing member that fastens the second arm and the second rotary member.

19 Claims, 22 Drawing Sheets

(56) References Cited

U.S. PATENT DOCUMENTS

| | | |
|---|---|---|
| 10,401,917 B1 | 9/2019 | Dai et al. |
| 10,748,456 B2 | 8/2020 | Pyo et al. |
| 10,761,572 B1* | 9/2020 | Siddiqui ............... G06F 1/1681 |
| 10,775,852 B2 | 9/2020 | Kim et al. |
| 11,061,445 B2 | 7/2021 | Kim et al. |
| 11,550,367 B2* | 1/2023 | Lin ....................... G06F 1/1681 |
| 11,553,613 B2* | 1/2023 | Sim ....................... G06F 1/1681 |
| 11,599,155 B2* | 3/2023 | Siddiqui ............... G06F 1/1618 |
| 2015/0233162 A1 | 8/2015 | Lee et al. |
| 2015/0366089 A1 | 12/2015 | Park et al. |
| 2017/0351303 A1 | 12/2017 | Kuramochi |
| 2018/0059740 A1 | 3/2018 | Kato |
| 2019/0090363 A1 | 3/2019 | Bi |
| 2020/0035133 A1 | 1/2020 | Pyo et al. |

FOREIGN PATENT DOCUMENTS

| | | |
|---|---|---|
| KR | 10-2018-0025818 A | 3/2018 |
| KR | 10-2019-0062107 A | 6/2019 |
| KR | 10-2020-0013549 A | 2/2020 |
| KR | 10-2074867 B1 | 3/2020 |
| KR | 10-2020-0052371 A | 5/2020 |

* cited by examiner

STRUCTURE OF HINGE FOR FOLDABLE ELECTRONIC DEVICE, AND ELECTRONIC DEVICE INCLUDING THE SAME

CROSS-REFERENCE TO RELATED APPLICATION(S)

This application is a continuation application, claiming priority under § 365(c), of an International application No. PCT/KR2021/006501, filed on May 25, 2021, which was based on and claimed the benefit of a Korean patent application number 10-2020-0086040, filed on Jul. 13, 2020, in the Korean Intellectual Property Office, the disclosure of which is incorporated by reference herein in its entirety.

BACKGROUND

1. Field

The disclosure relates to a hinge structure for a foldable electronic device and an electronic device including the hinge structure.

2. Description of Related Art

Portable electronic devices, such as smartphones or notebook computers, may provide various functions, such as telephone call, video playback, Internet search, and the like, based on various types of applications. Users may want to use the aforementioned various functions through wider screens. However, portability may be decreased with an increase in screen size. Accordingly, foldable portable electronic devices capable of increasing portability using foldable structures have been developed.

The above information is presented as background information only to assist with an understanding of the disclosure. No determination has been made, and no assertion is made, as to whether any of the above might be applicable as prior art with regard to the disclosure.

SUMMARY

In a foldable electronic device, a hinge structure may be connected with housings and may perform rotary motion while supporting the housings during rotation of the housings through a predetermined angle. The housings may be mounted at various angles. To this end, a hinge structure capable of resisting high torque of the housings mounted at a predetermined angle is required.

Aspects of the disclosure are to address at least the above-mentioned problems and/or disadvantages and to provide at least the advantages described below. Accordingly, an aspect of the disclosure is to provide a hinge structure capable of resisting high torque and an electronic device including the same.

Another aspect of the disclosure is to provide a hinge structure that is capable of resisting high torque and that has a relatively slim or compact shape in consideration of portability of an electronic device, and an electronic device including the hinge structure.

Additional aspects will be set forth in part in the description which follows and, in part, will be apparent from the description, or may be learned by practice of the presented embodiments.

In accordance with an aspect of the disclosure, a hinge structure is provided. The hinge structure includes a first rotary member connected with a first housing, a second rotary member connected with a second housing, a gear structure that makes the first rotary member and the second rotary member operate in conjunction with each other, a first arm connected with the first rotary member, a second arm connected with the second rotary member, a first torque providing member that fastens the first arm and the first rotary member, and a second torque providing member that fastens the second arm and the second rotary member. The first torque providing member includes a first friction plate that moves depending on rotation of the first rotary member, a second friction plate that at least partially faces the first friction plate, and a first elastic member that presses one side of the first friction plate or the second friction plate. The second torque providing member includes a third friction plate that moves depending on rotation of the second rotary member, a fourth friction plate that at least partially faces the third friction plate, and a second elastic member that presses one side of the third friction plate or the fourth friction plate.

In accordance with another aspect of the disclosure, an electronic device is provided. The electronic device includes a first housing, a second housing, a display disposed on the first housing and the second housing, and a hinge structure that connects the first housing and the second housing. The hinge structure includes a first rotary member connected with the first housing, a second rotary member connected with the second housing, a gear structure that makes the first rotary member and the second rotary member operate in conjunction with each other, a first arm connected with the first rotary member, a second arm connected with the second rotary member, a first torque providing member that fastens the first arm and the first rotary member, and a second torque providing member that fastens the second arm and the second rotary member. The first torque providing member includes a first friction plate that moves depending on rotation of the first rotary member, a second friction plate that at least partially faces the first friction plate, and a first elastic member that presses one side of the first friction plate or the second friction plate. The second torque providing member includes a third friction plate that moves depending on rotation of the second rotary member, a fourth friction plate that at least partially faces the third friction plate, and a second elastic member that presses one side of the third friction plate or the fourth friction plate.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
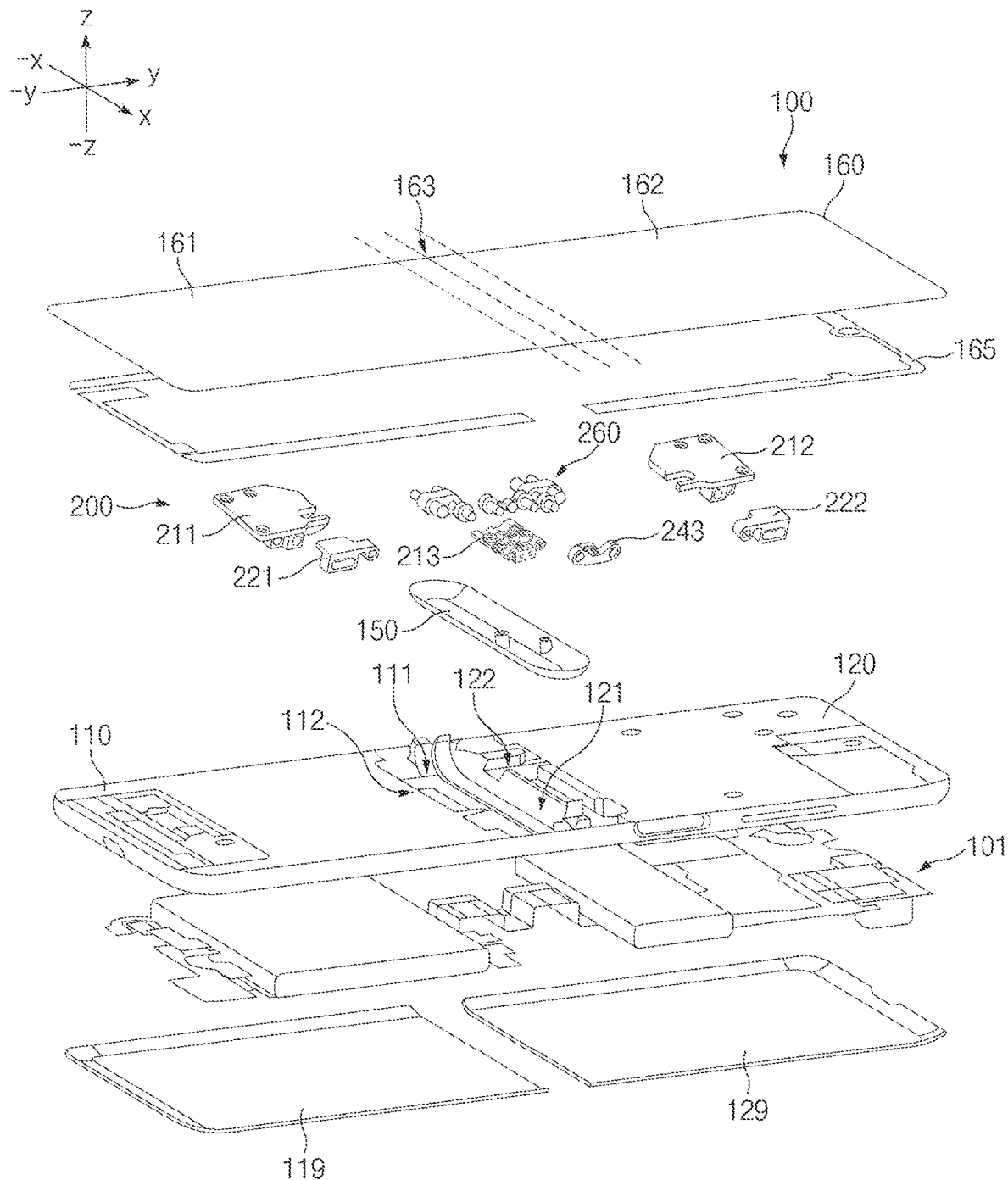
FIG. 1A is an exploded perspective view of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit).

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1A is an exploded perspective view of an electronic device according to an embodiment of the disclosure.

Figure 1B:
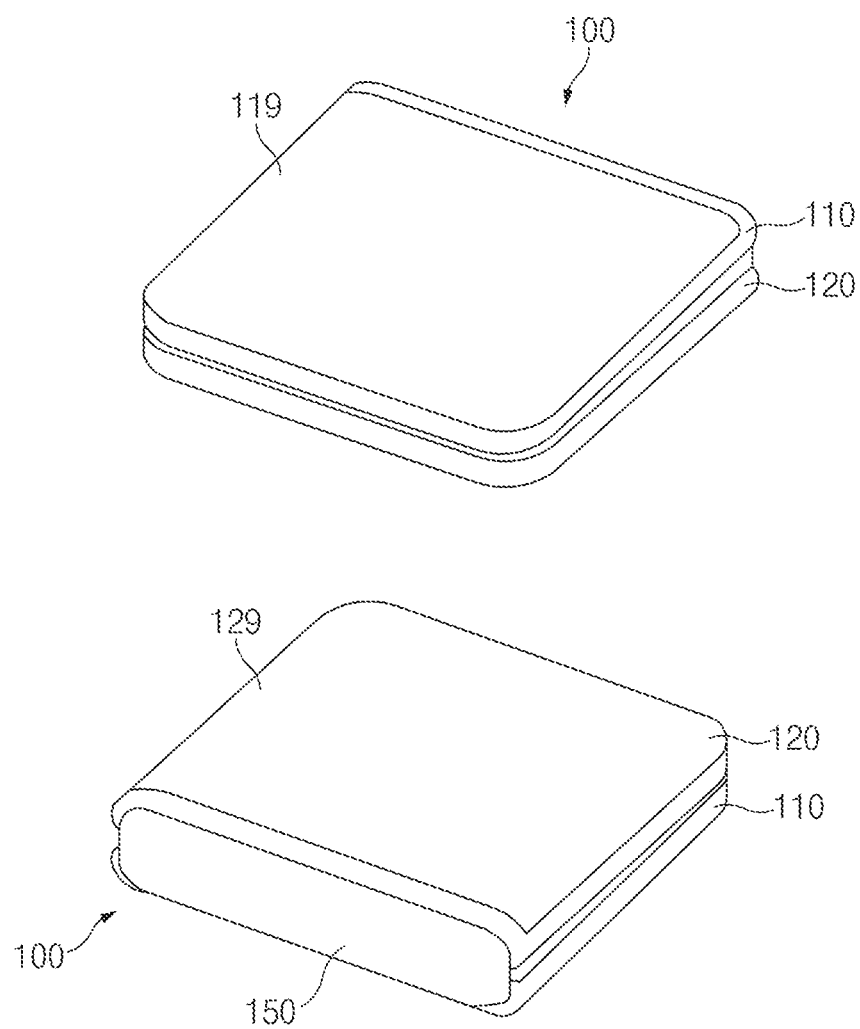
FIG. 1B is a view illustrating one example of an exterior of an electronic device in a folded state according to an embodiment of the disclosure.

FIG. 1B is a view illustrating one example of the exterior of an electronic device in a folded state according to an embodiment of the disclosure.

Referring to FIGS. 1A and 1B, an electronic device 100 (or, a foldable electronic device, a portable electronic device, or a portable foldable electronic device) according to an embodiment may include a first housing 110, a second housing 120, a display 160 (e.g., a flexible display), a hinge structure 200, a hinge housing 150 in which a hinge structure 200 is disposed, various electronic components 101 (e.g., a battery, a printed circuit board, a camera, at least one sensor, communication circuitry, and an antenna) associated with operation of an electronic device 100, a first cover 119 that covers at least part of one surface (e.g., a surface facing the −Z-axis direction) of a first housing 110, and a second cover 129 that covers one surface (e.g., a surface facing the −Z-axis direction) of a second housing 120. FIG. 1A is an exploded perspective view of the electronic device 100 in a first state (e.g., a flat state, an unfolded state, or an open state), and FIG. 1B is a perspective view of the electronic device 100 in a second state (e.g., a folded state or a closed state).

According to various embodiments, depending on an arrangement, the first housing 110 may be disposed to be continuous with the second housing 120 in the Y-axis direction, or may be disposed side by side with the second housing 120 in the Y-axis direction. Alternatively, when a central portion 163 of the display 160 is folded, one surface (e.g., a surface facing the Z-axis direction in FIG. 1A) of the first housing 110 may be disposed to face one surface (e.g., a surface facing the Z-axis direction in FIG. 1A) of the second housing 120.

For example, at least part of the first housing 110 may be formed of a metallic material, or at least part of the first housing 110 may be formed of a non-metallic material. For example, the first housing 110 may be formed of a material having a predetermined stiffness to support at least part of the display 160. One area (e.g., a first portion 161 and part of the central portion 163) of the display 160 may be disposed on at least part of a front surface (e.g., the surface facing the Z-axis direction in FIG. 1A) of the first housing 110. At least part of the first housing 110 may be bonded with one area (e.g., the first portion 161 and part of the central portion 163) of the display 160 through an adhesive means, an adhesive member, or an adhesive tape. According to various embodiments, at least part of the first housing 110 may be bonded with a lattice structure or a support structure disposed under one area of the display 160. Alternatively, at least part of the periphery of the front surface of the first housing 110 may be bonded with at least part of the periphery of one area (e.g., the first portion 161 and part of the central portion 163) of the display 160. In another case, one side of an upper portion of the front surface of the first housing 110 may be bonded with one side of the first portion 161 of the display 160. In this regard, at least part of an adhesive layer 165 (e.g., an adhesive means, an adhesive member, or an adhesive tape) may be at least partially disposed between the first housing 110 and the first portion 161 of the display 160. The first housing 110 may have an empty space inside or may be coupled with the first cover 119 to form an empty space inside, and the electronic components 101 (e.g., a printed circuit board and components, such as at least one processor, at least one memory, and a battery, which are mounted on the printed circuit board) that are required for driving the display 160 may be disposed in the empty space.

According to various embodiments, edges of the first housing 110 (e.g., the remaining three edges other than the edge facing the second housing 120) may protrude above a bottom surface of a central portion of the first housing 110 by a specified height to surround the periphery of at least one side of the display 160. Alternatively, sidewalls may be disposed on at least one of the edges of the first housing 110 to at least partially face the periphery of the display 160. The sidewalls formed on at least a part of the edges of the first housing 110 may have a specified height at the remaining three edges other than the edge facing the second housing 120. An edge portion of the first housing 110 that faces the second housing 120 may include a depression 111, at least part of which has a predetermined curvature such that at least part of the hinge housing 150 is disposed in the depression 111. According to various embodiments, the first housing 110 may include, on the edge portion facing the second housing 120, a first step 112 on which part of the hinge structure 200 mounted in the hinge housing 150 is seated.

According to various embodiments, depending on an arrangement, the second housing 120 may be disposed side by side with the first housing 110, or may be disposed such that at least one surface thereof faces one surface (e.g., the surface on which the display 160 is disposed) of the first housing 110. The second housing 120 may be formed of the same material as that of the first housing 110. The second housing 120 may be disposed to be symmetric to the first housing 110 in a left/right direction or an up/down direction, and at least part of the remaining area of the display 160 (e.g., a second portion 162 of the display 160 and an opposite side of the central portion 163 thereof) other than the area disposed on the first housing 110 may be disposed on a front surface of the second housing 120. At least part of the second housing 120 may be bonded with at least part of the second portion 162 of the display 160 and at least part of the opposite side of the central portion 163 of the display 160. Alternatively, the periphery of the front surface of the second housing 120 may be bonded with at least part of the second portion 162 of the display 160 and at least part of the opposite side of the central portion 163 of the display 160. In another case, one side of a lower portion of the front surface (e.g., the surface facing the Z-axis direction in FIG. 1A) of the second housing 120 may be bonded with one side of the second portion 162 of the display 160. In this regard, at least part of the adhesive layer 165 (e.g., an adhesive means, an adhesive member, or an adhesive tape) may be at least partially disposed between the second housing 120 and the second portion 162 of the display 160. Similarly to the first housing 110, the second housing 120 may have an empty space inside or may be coupled with the second cover 129 to form an empty space inside, and electronic components required for driving the display 160 may be disposed in the empty space.

According to various embodiments, edges of the second housing 120 (e.g., the remaining three edges other than the edge facing the first housing 110) may protrude above a bottom surface of a central portion of the second housing 120 by a specified height to surround the periphery on an opposite side of the display 160. Alternatively, similarly to the sidewalls formed on the first housing 110, sidewalls may be disposed on at least one of the edges of the second housing 120 to at least partially face the periphery of the display 160. The sidewalls formed on at least a part of the edges of the second housing 120 may have a specified height at the remaining three edges other than the edge facing the first housing 110.

An edge portion of the second housing 120 that faces the first housing 110 may include a depression 121, at least part of which has a predetermined curvature such that the hinge housing 150 is disposed in the depression 121. According to an embodiment, the second housing 120 may include, on the edge portion facing the first housing 110, a second step 122 on which part of the hinge structure 200 mounted in the hinge housing 150 is seated.

According to various embodiments, the electronic device 100 may include at least one sensor disposed on one side of the first housing 110 or the second housing 120 and associated with operation of a specific function of the electronic device 100. The sensor may include, for example, at least one of a proximity sensor, an illuminance sensor, an iris sensor, an image sensor (or, a camera), or a fingerprint sensor.

According to various embodiments, depending on a folded or flat state of the electronic device 100, the hinge housing 150 may be hidden by one side of the first housing 110 and one side of the second housing 120 (e.g., a flat state of the first housing 110 and the second housing 120), or may be exposed to the outside (e.g., a folded state of the first housing 110 and the second housing 120). For example, when the first housing 110 and the second housing 120 are disposed side by side as illustrated in FIG. 1A, the hinge housing 150 may be hidden by the first housing 110 and the second housing 120. When one surface of the first housing 110 and one surface of the second housing 120 face each other as illustrated in FIG. 1B, at least part of the hinge housing 150 may be exposed to the outside from between one edge of the first housing 110 and one edge of the second housing 120 (e.g., the edges of the first housing 110 and the second housing 120 that face each other in a flat state).

According to various embodiments, at least part of the display 160 may be flexible. According to an embodiment, the display 160 may include the first portion 161 disposed on the first housing 110, the second portion 162 disposed on the second housing 120, and the central portion 163 or the central area to which the first housing 110 and the second housing 120 are adjacent. According to various embodiments, the entire display 160 may have flexibility. The central portion 163 of the display 160 may be disposed so as not to be bonded with the first housing 110 and the second housing 120. For example, the central portion 163 of the display 160 may be spaced apart from the front surfaces (e.g., the surfaces facing the Z-axis direction in FIG. 1A) of the first housing 110 and the second housing 120 at a predetermined interval. Alternatively, a predetermined gap may be formed between the central portion 163 of the display 160 and the first housing 110 and the second housing 120. The first portion 161 of the display 160 may be bonded with at least part of the first housing 110, and the second portion 162 of the display 160 may be bonded with at least part of the second housing 120. In this regard, part of the adhesive layer 165 may be disposed in at least a partial area between the display 160 and the first housing 110, and another part of the adhesive layer 165 may be disposed in at least a partial area between the display 160 and the second housing 120. According to various embodiments, as illustrated, the adhesive layer 165 may be disposed on only the peripheries of the first housing 110 and the second housing 120.

According to various embodiments, the hinge structure 200 may include a first rotary member 211 (or, a first rotary part or a first rotary means), a second rotary member 212 (or, a second rotary part or a second rotary means), a first arm 221, a second arm 222, a fixing bracket 213, a gear bracket 243, and a hinge assembly 260 (or, a hinge part or a hinge module) (e.g., a torque providing structure or a gear structure). The hinge assembly 260 may include plate springs to provide a relatively high frictional force. The hinge assembly 260 may be fixed to sides of the first rotary member 211 and the second rotary member 212 (or, the first arm 221 and the second arm 222) and may be compressed or released in response to rotation of the first arm 221 and the second arm 222 (or, rotation of the first rotary member 211 and the second rotary member 212). Accordingly, the hinge structure 200 according to various embodiments supports stably maintaining various mounting angles by maintaining a high frictional force during rotation of the first housing 110 and the second housing 120 while maintaining a relatively slim structure without an increase in the thickness of the electronic device 100. In various embodiments, when the electronic device 100, the hinge structure 200, or the hinge assembly 260 provides torque, it may mean that the electronic device 100, the hinge structure 200, or the hinge assembly 260 provides a frictional force or resists torque. Accordingly, the frictional force may be expressed and understood as a force that resists operations of the housings 110 and 120, a force that fixes postures of the housings 110 and 120, or a force that maintains the shapes of the housings 110 and 120.

Meanwhile, in FIG. 1A, it is exemplified that the single hinge structure 200 is mounted in the hinge housing 150. However, the disclosure is not limited thereto. For example, a plurality of (e.g., two or more) hinge structures 200 may be mounted in the hinge housing 150.

Figure 2:
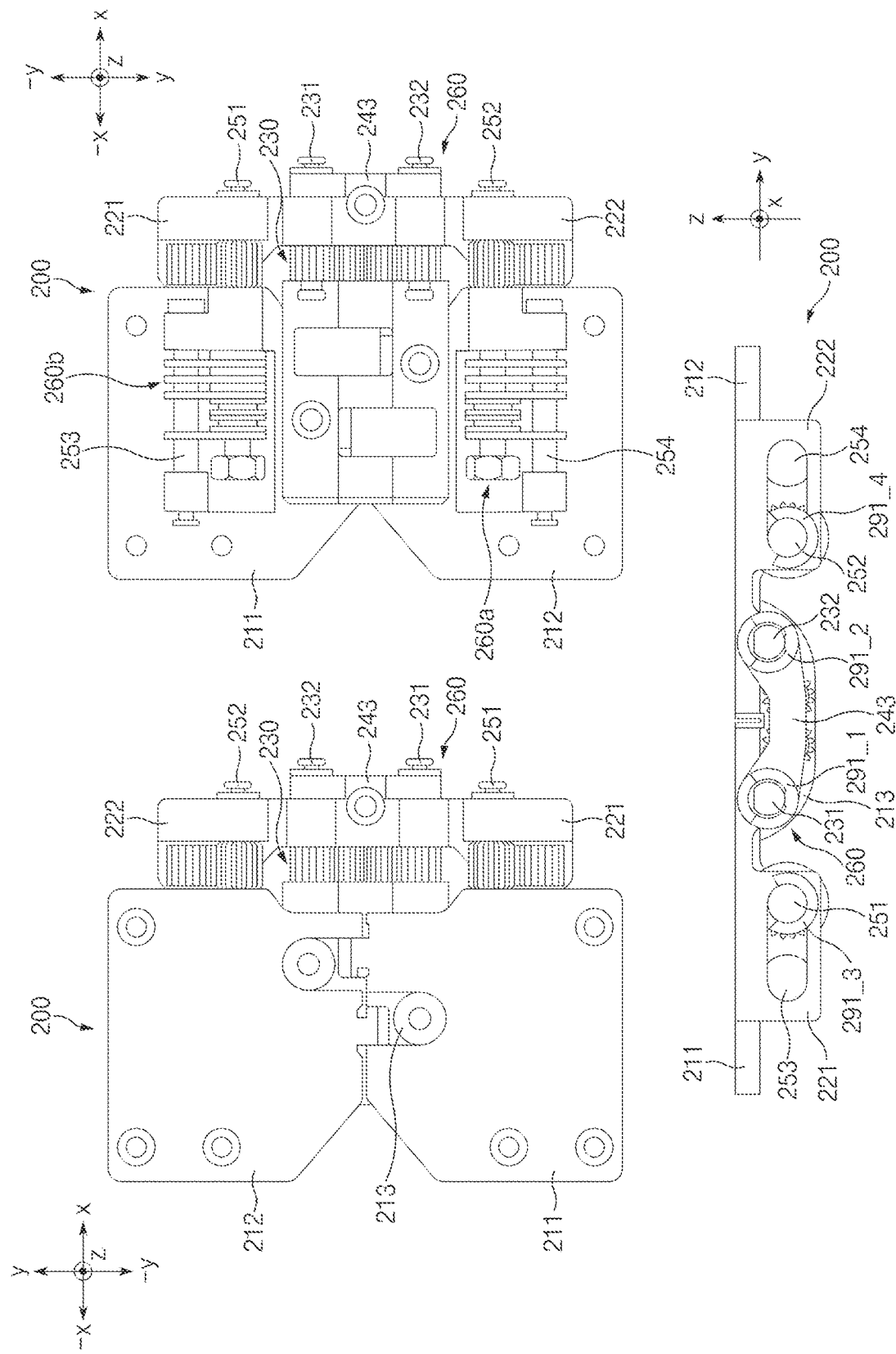
FIG. 2 is a view illustrating one example of an exterior of a hinge structure of an electronic device according to an embodiment of the disclosure.

FIG. 2 is a view illustrating one example of an exterior of the hinge structure of an electronic device according to an embodiment of the disclosure.

Figure 3:
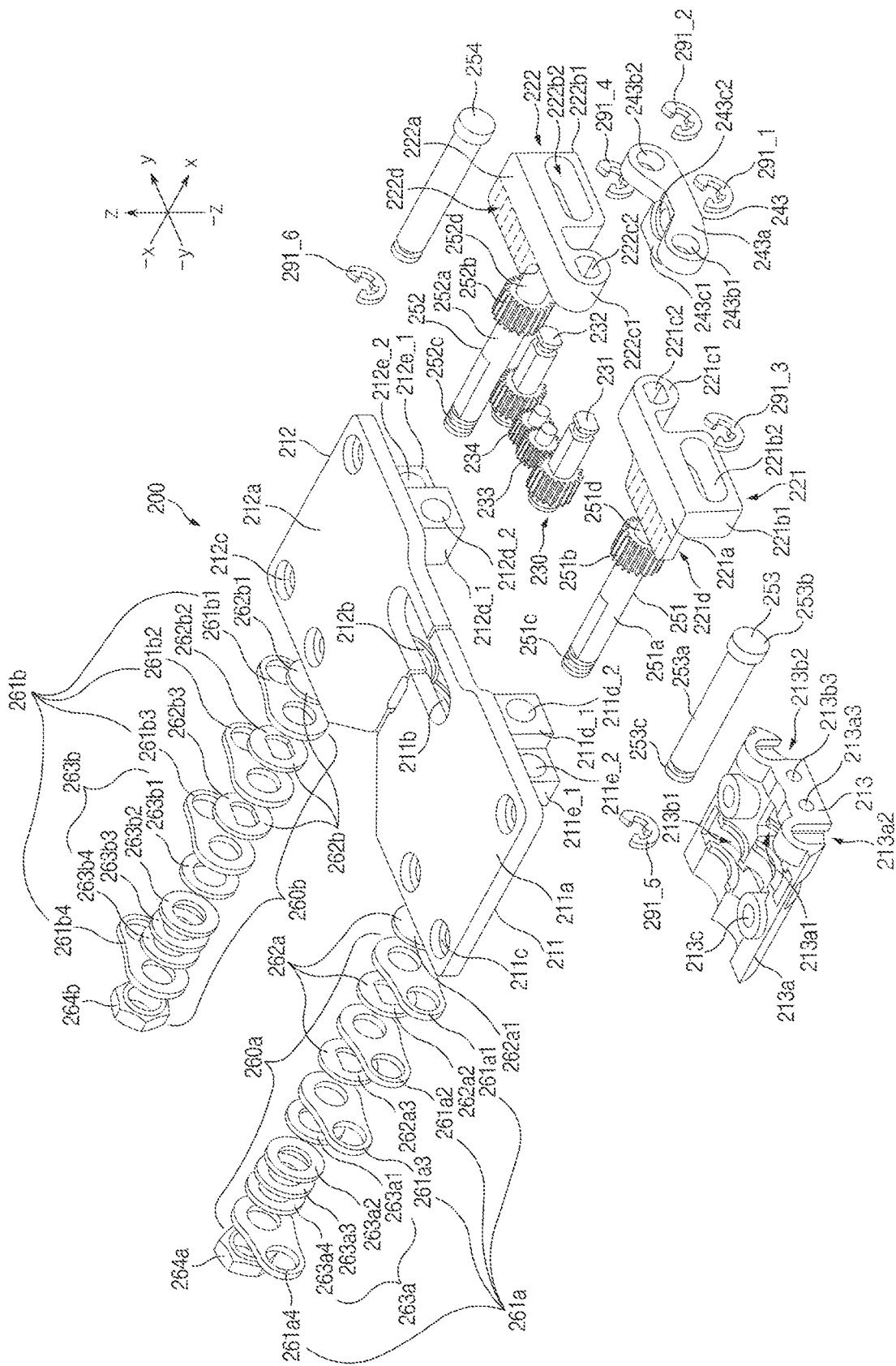
FIG. 3 is an exploded perspective view of a hinge structure according to an embodiment of the disclosure.

FIG. 3 is an exploded perspective view of a hinge structure according to an embodiment of the disclosure.

Figure 4:
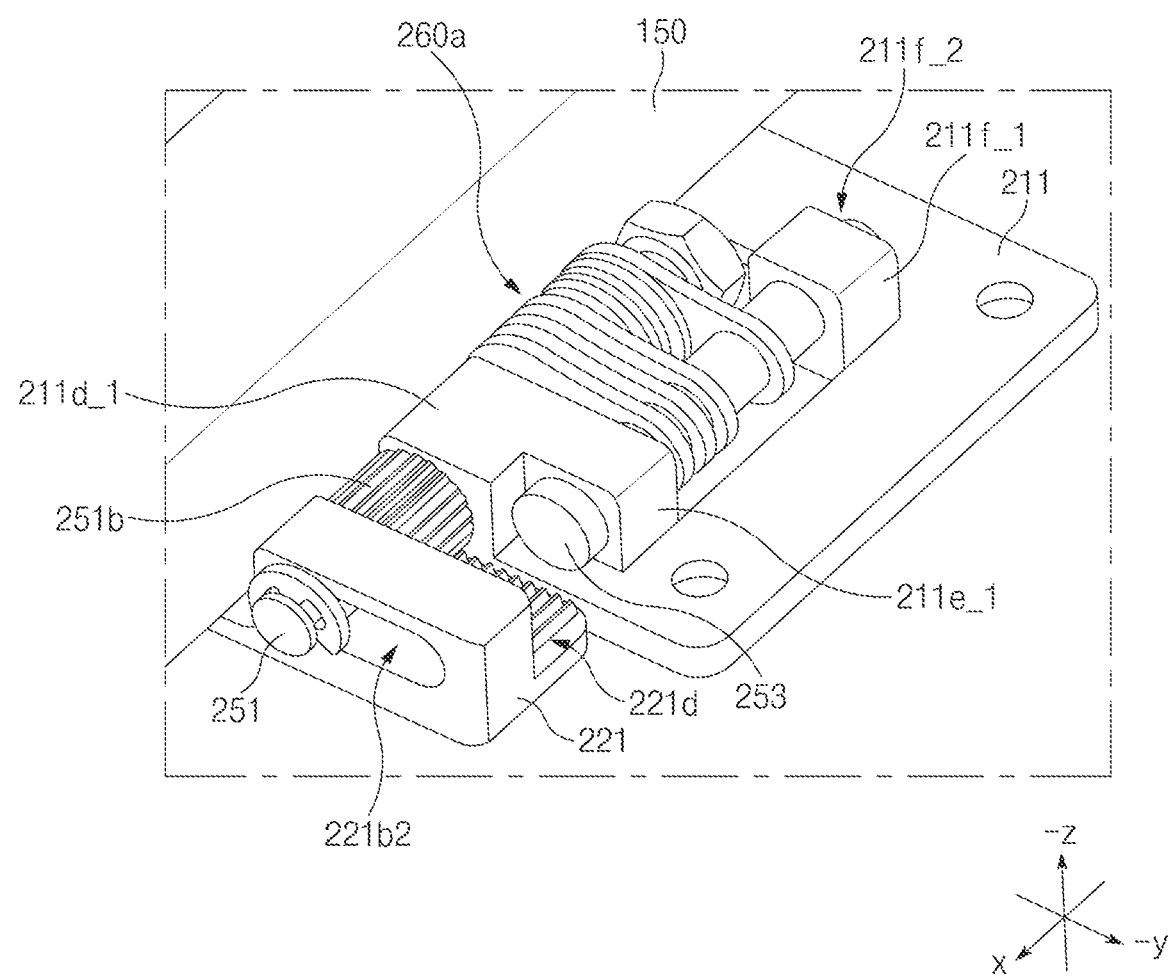
FIG. 4 is a view illustrating one example of part of a rear side of a hinge structure according to an embodiment of the disclosure.

FIG. 4 is a view illustrating one example of part of a rear side of a hinge structure according to an embodiment of the disclosure.

Figure 5:
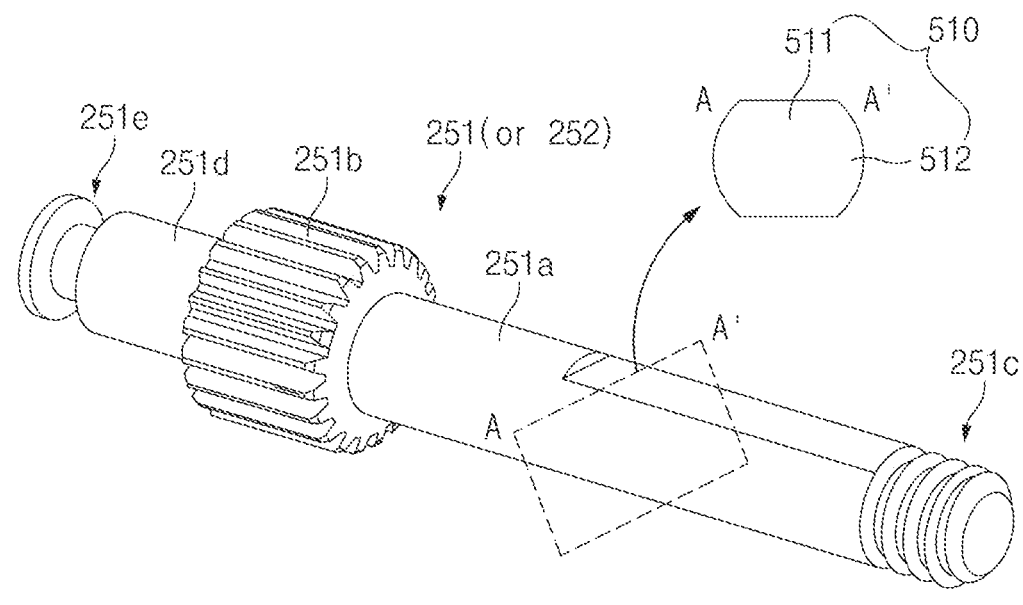
FIG. 5 is a view illustrating one example of a rotary shaft and a friction plate according to an embodiment of the disclosure.
Figure 5:
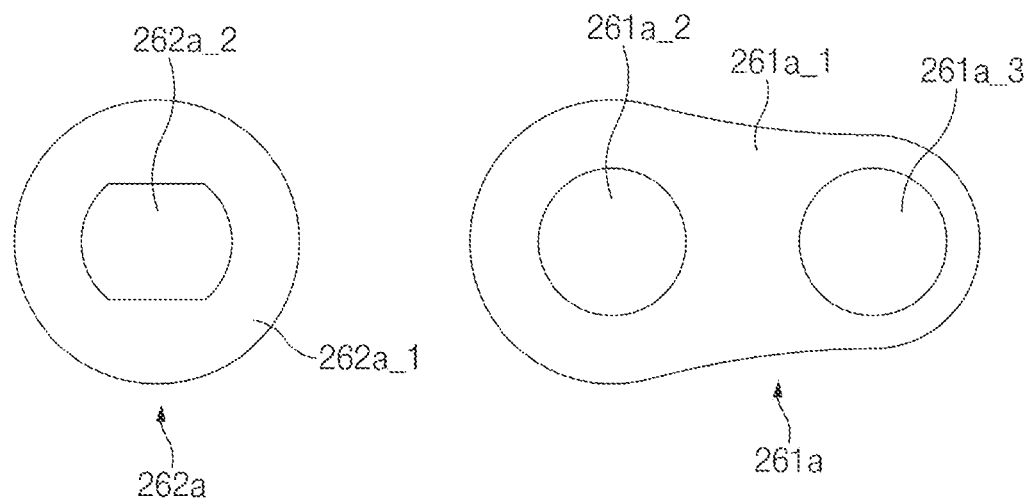

FIG. 5 is a view illustrating one example of a rotary shaft and a friction plate according to an embodiment of the disclosure.

Referring to FIGS. 2 to 5, according to an embodiment, a hinge structure 200 may include a first rotary member 211, a second rotary member 212, a first arm 221, a second arm 222, and a hinge assembly 260 (or, a hinge part or a hinge module) that includes a first rotary shaft 251 that provides a first axis and a second rotary shaft 252 that provides a second axis.

At least part of the first rotary member 211 may be coupled with the first housing 110. According to an embodiment, at least part of the first rotary member 211 may be seated on and fixed to the first step 112 of the first housing 110. At least part of the first rotary member 211 may be formed of a metallic material having a specified stiffness or more or a non-metallic material having the specified stiffness or more. The first rotary member 211 may rotate in one direction (e.g., the clockwise or counterclockwise direction) in response to rotation of the first housing 110. When the electronic device 100 is in a flat state, one side (e.g., one side of an edge facing the Y-axis direction) of the first rotary member 211 may be disposed adjacent to one side (e.g., one side of an edge facing the −Y-axis direction) of the second rotary member 212. When the electronic device 100 is in a folded state, at least part of a front surface (e.g., a surface facing the Z-axis direction) of the first rotary member 211 may be disposed to face a front surface (e.g., a surface facing the Z-axis direction) of the second rotary member 212.

The first rotary member 211 may include a first basic body 211a, a first rotary rail 211b, at least one first connecting hole 211c, a first insertion hole 211d_2, a first insertion part 211d_1, a second insertion hole 211e_2, a second insertion part 211e_1, a third insertion part 211f_1, and a third insertion hole 211f_2.

The first basic body 211a may have a constant thickness, and a front surface of the first basic body 211a may have a predetermined size and may be formed to be flat. The first connecting hole 211c may be formed through the front surface (e.g., a surface facing the Z-axis direction) and a rear surface (e.g., a surface facing the −Z-axis direction) of the first basic body 211a. A plurality of first connecting holes 211c may be disposed for a firm coupling of the first rotary member 211 and the first housing 110. At least one of the first connecting holes 211c may be disposed to be biased to edges of the first basic body 211a (e.g., an edge facing the −Y-axis direction and an edge facing the −X-axis direction or the X-axis direction in the drawing). At least one coupling member (e.g., screw) may be inserted into each of the first connecting holes 211c.

The first rotary rail 211b may be at least partially fastened to a first rail groove 213a1 of the fixing bracket 213 and may rotate as the first rotary member 211 rotates. At least part of a section of the first rotary rail 211b in the Y-axis direction may have a semicircular surface or a surface including an arc with a predetermined central angle. The first rotary rail 211b may be disposed to protrude from the rear surface (e.g., the surface facing the −Z-axis direction) of the first basic body 211a in the −Z-axis direction. The first rotary rail 211b may rotate about, for example, a virtual third axis (e.g., an axis across the −Y-axis and the Y-axis). The third axis may be formed in a higher position than the first rotary shaft 251 in the +Z-axis direction.

The first insertion part 211d_1 may protrude from the first basic body 211a in the −Z-axis direction. A section of the first insertion part 211d_1 in the Z-axis direction may have, for example, an overall quadrilateral shape. However, the disclosure is not limited thereto, and the section of the first insertion part 211d_1 in the Z-axis direction may be formed in a polygonal shape, a shape, at least part of which has a partial form of "D" (e.g., a convex form of "D"), or an oval shape (including a circular shape). The first insertion hole 211d_2 may be formed through a central portion of the first insertion part 211d_1 in the X-axis direction. For example, at least part of the first rotary shaft 251 may be disposed in the first insertion hole 211d_2. In this regard, the first insertion hole 211d_2 may have a hollow cylindrical shape. For example, the area of the first insertion hole 211d_2 may be larger than or equal to the area of a section of one side of the first rotary shaft 251 (e.g., a section of a central portion of the first rotary shaft 251 in the Z-axis direction).

The second insertion part 211e_1 may protrude from the first basic body 211a in the −Z-axis direction similarly to the first insertion part 211d_1 and may be disposed adjacent to the first insertion part 211d_1. According to various embodiments, at least part of the second insertion part 211e_1 may be integrated with the first insertion part 211d_1, or may be formed to be continuous with the first insertion part 211d_1. Alternatively, a predetermined separation distance may be formed between at least part of the second insertion part 211e_1 and the first insertion part 211d_1. Similarly to the section of the first insertion part 211d_1 in the Z-axis direction, a section of the second insertion part 211e_1 in the Z-axis direction may have an overall quadrilateral shape, but may be formed in a polygonal shape, a shape, at least part of which has the shape of "D", or a circular shape. The second insertion hole 211e_2 may be formed through a central portion of the second insertion part 211e_1 in the X-axis direction. Accordingly, the second insertion hole 211e_2 may be disposed side by side with the first insertion hole 211d_2 with respect to the X-axis. For example, at least part of a first fixing shaft 253 may be disposed in the second insertion hole 211e_2. In this regard, the second insertion hole 211e_2 may have a hollow cylindrical shape. For example, the area of the second insertion hole 211e_2 may be larger than or equal to the area of a section of the first fixing shaft 253 (e.g., a section of a central portion of the first fixing shaft 253 in the Z-axis direction). When a section of one side of the first fixing shaft 253 (e.g., the section of the central portion of the first fixing shaft 253 in the Z-axis direction) is the same as a section of one side of the first rotary shaft 251 (e.g., the section of the central portion of the first rotary shaft 251 in the Z-axis direction), the first insertion hole 211d_2 and the second insertion hole 211e_2 may have the same size. Alternatively, as the first fixing shaft 253 is inserted into the second insertion hole 211e_2, the second insertion hole 211e_2 may have the same diameter as the first fixing shaft 253, and the first fixing shaft 253 may be press-fit into the second insertion hole 211e_2. According to various embodiments, the size of the second insertion hole 211e_2 may be larger than the size of the section of the first fixing shaft 253 by a specified size.

The third insertion part 211f_1 may be disposed to protrude downward (e.g., in the −Z-axis direction) from the first basic body 211a. The third insertion part 211f_1 may have, in a central portion thereof, the third insertion hole 211f_2 into which an edge of the first fixing shaft 253 that faces the −X-axis direction is inserted. The third insertion part 211f_1 may be aligned with the second insertion part 21e_1 on the X-axis. The diameter of the third insertion hole 211f_2 may be the same as or similar to the diameter of the first fixing shaft 253. To prevent the first fixing shaft 253 from being separated from the third insertion hole 211f_2 of the third insertion part 211f_1, a fixing means 291_5 (e.g., a fixing clip) may be mounted on an end of the first fixing shaft 253 that faces the −X-axis direction.

At least part of the second rotary member 212 may be coupled with the second housing 120. According to an embodiment, at least part of the second rotary member 212 may be seated on and fixed to the second step 122 of the second housing 120. The second rotary member 212 may have the same shape and material as the first rotary member 211. The second rotary member 212 may rotate in one direction (e.g., the clockwise or counterclockwise direction) in response to rotation of the second housing 120. In this process, the second rotary member 212 may rotate in an opposite direction to that of the first rotary member 211. For example, when the first rotary member 211 rotates in the clockwise direction, the second rotary member 212 may rotate in the counterclockwise direction, and when the first rotary member 211 rotates in the counterclockwise direction, the second rotary member 212 may rotate in the clockwise direction.

Similarly to the first rotary member 211, the second rotary member 212 may include a second basic body 212a, a second rotary rail 212b, at least one second connecting hole 212c, a fourth insertion hole 212d_2, a fourth insertion part 212d_1, a fifth insertion hole 212e_2, and a fifth insertion part 212e_1. Additionally, as mentioned above, to fix a second fixing shaft 254, a sixth insertion part and a sixth insertion hole disposed side by side with the fifth insertion part 212e and the fifth insertion hole 212e_2 may be provided similarly to the third insertion part 211f_1 and the third insertion hole 211f_2 described above with reference to FIG. 4.

The second basic body 212a may have the same shape as the first basic body 211a described above. The second connecting hole 212c may be formed through a front surface (e.g., a surface facing the Z-axis direction) and a rear surface (e.g., a surface facing the −Z-axis direction) of the second basic body 212a. The second connecting hole 212c may be used to couple the second rotary member 212 and the second housing 120.

The second rotary rail 212b may be at least partially fastened to a second rail insertion groove 213b1 formed on the fixing bracket 213 and may rotate as the second rotary member 212 rotates. The second rotary rail 212b may have the same shape as the first rotary rail 211b, or may have a shape similar to that of the first rotary rail 211b. For example, at least part of a section of the second rotary rail 212b in the Y-axis direction may have a semicircular surface or a surface including an arc with a predetermined central angle. The second rotary rail 212b may be disposed to protrude from the rear surface (e.g., the surface facing the −Z-axis direction) of the second basic body 212a in the −Z-axis direction. Accordingly, the second rotary rail 212b may be disposed adjacent to the first rotary rail 211b and may rotate about a virtual fourth axis (e.g., an axis across the −Y-axis and the Y-axis). The third axis and the fourth axis may be disposed side by side on the Y-axis. The fourth axis may be formed in a higher position than the second rotary shaft 252 in the +Z-axis direction.

The fourth insertion part 212d_1 may protrude from the second basic body 212a in the −Z-axis direction. The fourth insertion part 212d_1 may be formed to be the same as or similar to the first insertion part 211d_1. The fourth insertion hole 212d_2 may be formed through a central portion of the fourth insertion part 212d_1 in the X-axis direction. For example, at least part of the second rotary shaft 252 may be disposed in the fourth insertion hole 212d_2. In this regard, the fourth insertion hole 212d_2 may have a hollow cylindrical shape. For example, the area of the fourth insertion hole 212d_2 may be larger than or equal to the area of a section of one side of the second rotary shaft 252 (e.g., a section of a central portion of the second rotary shaft 252 in the Z-axis direction).

The fifth insertion part 212e_1 may protrude from the second basic body 212a in the −Z-axis direction similarly to the fourth insertion part 212d_1 and may be disposed adjacent to the fourth insertion part 212d_1. According to various embodiments, at least part of the fifth insertion part 212e_1 may be integrated with the fourth insertion part 212d_1, or may be formed to be continuous with the fourth insertion part 212d_1. Alternatively, the fifth insertion part 212e_1 and the fourth insertion part 212d_1 may be spaced apart from each other. The fifth insertion part 212e_1 may be formed to be the same as or similar to the second insertion part 211e_1. The fifth insertion hole 212e_2 may be formed through a central portion of the fifth insertion part 212e_1 in the X-axis direction. Accordingly, the fifth insertion hole 212e_2 may be disposed side by side with the fourth insertion hole 212d_2 with respect to the X-axis. For example, at least part of the second fixing shaft 254 may be disposed in the fifth insertion hole 212e_2. In this regard, the fifth insertion hole 212e_2 may have a hollow cylindrical shape. For example, the area of the fifth insertion hole 212e_2 may be larger than or equal to the area of a section of the second fixing shaft 254 (e.g., a section of a central portion of the second fixing shaft 254 in the Z-axis direction). When a section of one side of the second fixing shaft 254 (e.g., the section of the central portion of the second fixing shaft 254 in the Z-axis direction) is the same as a section of one side of the second rotary shaft 252 (e.g., the section of the central portion of the second rotary shaft 252 in the Z-axis direction), the fourth insertion hole 212d_2 and the fifth insertion hole 212e_2 may have the same size. According to various embodiments, the second rotary member 212 may further include the sixth insertion part (not illustrated) and the sixth insertion hole (not illustrated) that correspond to the third insertion part 211f_1 and the third insertion hole 211f_2 described in the description of the first rotary member 211.

The first arm 221 may be disposed adjacent to the first rotary member 211 and may rotate in response to rotation of the first rotary member 211. In this operation, the first arm 221 may be fastened with the first rotary member 211 through the first rotary shaft 251. The first arm 221 may be formed of a metallic material having a specified strength or more or a non-metallic material having the corresponding strength. According to an embodiment, the first arm 221 may be formed of the same material as that of the first rotary member 211. The first arm 221 may include, for example, a first body 221a, a first sliding part 221b1 protruding from the first body 221a in the −Z-axis direction, and a first gear fastening part 221c1 extending from the first body 221a in the Y-axis direction and protruding in the −Z-axis direction. A front surface (e.g., a surface facing the Z-axis direction) of the first body 221a may have a predetermined size and may be formed to be flat. When the electronic device 100 is in a folded state or a flat state, the front surface of the first body 221a may be disposed side by side with the front surface of the first basic body 211a of the first rotary member 211. A first arm gear pattern 221d (e.g., a rack gear pattern) at least partially engaged with a first gear pattern 251b (e.g., a pinion gear) provided on the first rotary shaft 251 may be formed on a portion of a rear surface (e.g., a surface facing the −Z-axis direction) of the first body 221a that extends in the −X-axis direction. An edge portion of the first arm 221 that faces the −Y-axis direction may have an inverted L-shaped section in the Z-axis direction. The first sliding part 221b1 may have a predetermined width under the first body 221a. A first sliding hole 221b2 may be formed through the first sliding part 221b1 in the −X-axis direction and the X-axis direction. The first sliding hole 221b2 may have a shape (e.g., a shape including straight lines and curves) in which a section in the Z-axis direction is long in the Y-axis direction. At least part of an upper end portion of the first rotary shaft 251 that further protrudes from the first gear pattern 251b in the X-axis direction may be disposed in the first sliding hole 221b2. The first gear fastening part 221c1 may extend from the first body 221a in the Y-axis direction, may protrude in the −Z-axis direction, and may have a shape in which at least part of a section in the Z-axis direction includes curves. According to an embodiment, the first gear fastening part 221c1 may include a first gear fastening hole 221c2 formed through a central portion thereof in the −X-axis direction and the X-axis direction. Part of a first main gear 231 of a gear structure 230 may be mounted in the first gear fastening hole 221c2. A section of the first gear fastening hole 221c2 in the Z-axis direction may have a shape (e.g., a D-cut shape) including curves and straight lines. A section of the first main gear 231 in the Z-axis direction may be formed to be the same as or similar to the section of the first gear fastening hole 221c2 in the Z-axis direction, the first main gear 231 being inserted into the first gear fastening hole 221c2. The above-described first arm 221 may be rotatably mounted on a shaft of the first main gear 231 and may rotate through the first rotary shaft 251 and the first sliding hole 221b2 in response to rotation of the first rotary member 211.

The second arm 222 may have the same structure as the first arm 221, or may have a structure similar to that of the first arm 221. For example, the second arm 222 may include a second body 222a, a second sliding part 222b1 protruding from the second body 222a in the −Z-axis direction, and a second gear fastening part 222c1 extending from the second body 222a in the Y-axis direction and protruding in the −Z-axis direction. The second sliding part 222b1 may have a second sliding hole 222b2 formed therein. The second sliding hole 222b2 may have the same structure as the first sliding hole 221b2 described above, or may have a structure similar to that of the first sliding hole 221b2. The second gear fastening part 222c1 may have a second gear fastening hole 222c2 formed therein. The second gear fastening hole 222c2 may have the same structure as the first gear fastening hole 221c2 formed in the first gear fastening part 221c1, or may have a structure similar to that of the first gear fastening hole 221c2.

The hinge assembly 260 may include a first torque providing member 260a, a second torque providing member 260b, the first fixing shaft 253, the first rotary shaft 251, the second fixing shaft 254, the second rotary shaft 252, the fixing bracket 213, the gear structure 230, and the gear bracket 243. Additionally or alternatively, the hinge assembly 260 may include fixing means 291_1, 291_2, 291_3, 291_4, 291_5, and 291_6 (e.g., E-rings) that fix at least some of the components.

The first torque providing member 260a may include at least one first type friction plate 261a commonly coupled to the first fixing shaft 253 and the first rotary shaft 251, at least one second type friction plate 262a mounted on the first rotary shaft 251, a first elastic member 263a, and a first fixing part 264a (e.g., a nut).

Referring to FIG. 5, the at least one first type friction plate 261a may have, for example, the shape of "8" and may be spaced apart from each other at predetermined intervals. One surface of the at least one first type friction plate 261a may be disposed to make contact with the at least one second type friction plate 262a. The first type friction plate 261a may include a first base plate 261a_1, a first hole 261a_2 into which the first rotary shaft 251 is inserted, and a second hole 261a_3 into which the first fixing shaft 253 is inserted. Accordingly, while the first rotary member 211 rotates, the first type friction plate 261a may move along a travel path of the first rotary member 211, but may be fixed without self-rotating (or, rotating in place). The first hole 261a_2 that is formed in the first type friction plate 261a and into which the first rotary shaft 251 is inserted may have a circular shape such that the first rotary shaft 251 rotates in place and may have a diameter larger than or similar to the diameter of the first rotary shaft 251. The second hole 261a_3 that is formed in the first type friction plate 261a and into which the first fixing shaft 253 is inserted may be formed to be the same as the section of the first fixing shaft 253 in the Z-axis direction. According to various embodiments, the size of the second hole 261a_3 may be larger than the size of the section of the first fixing shaft 253. According to an embodiment, the at least one first type friction plate 261a may include a plurality of friction plates, and the plurality of first type friction plates may include friction plate 261a1, friction plate 261a2, friction plate 261a3, and/or friction plate 261a4. In the drawing, it is exemplified that the four first type friction plates are disposed. However, the disclosure is not limited thereto. For example, at least one of the number or size of first type friction plates 261a may vary depending on the magnitude of a frictional force to be provided.

The at least one second type friction plate 262a may include a second base plate 262a_1 and a fixing hole 262a_2 formed in a central portion of the second base plate 262a_1 and may be formed in an overall oval shape, a shape, at least part of which includes part of "D", or a polygonal shape. One side of the first rotary shaft 251 may be inserted into the fixing hole 262a_2 formed in the central portion of the second type friction plate 262a, and the second type friction plate 262a may rotate as the first rotary shaft 251 rotates in place. In this regard, the shape of the fixing hole 262a_2 of the second type friction plate 262a may be the same as or similar to the shape of a section of an area including a straight part among sections of the first rotary shaft 251 in the Z-axis direction. Accordingly, the second type friction plate 262a may generate a frictional force of a predetermined magnitude by rubbing against the first type friction plate 261a adjacent thereto while rotating in place during rotation of the first rotary member 211. According to an embodiment, similarly to the first type friction plate 261a, the at least one second type friction plate 262a may include a plurality of friction plates, and the plurality of second type friction plates may include friction plate 262a1, friction plate 262a2, and/or friction plate 262a3. The plurality of second type friction plates may be disposed to alternate with the plurality of first type friction plates. In the drawing, it is exemplified that the three second type friction plates are disposed. However, at least one of the number or size of second type friction plates 262a may vary depending on the magnitude of a designed frictional force.

The first elastic member 263a may have a plate spring shape having a hole formed in a central portion thereof and may have an overall dome shape. For example, the first elastic member 263a may be formed in a ring shape having a predetermined curvature from the X-axis to the −X-axis (or, from the −X-axis to the X-axis). The first elastic member 263a may be compressed or released by force acting in the X-axis direction. The first elastic member 263a may include a plurality of plate springs (e.g., 263a1, 263a2, 263a3, and/or 263a4) engaged with each other. At least one of the number or shape of first elastic members 263a may vary depending on the magnitude of a frictional force provided by the electronic device 100.

The first fixing part 264a may be fastened with an end of the first rotary shaft 251 that passes through the at least one first type friction plate 261a, the at least one second type friction plate 262a, and the first elastic member 263a and protrudes in the −X-axis direction. According to an embodiment, a first fastening pattern 251c (e.g., a bolt pattern) may be formed on the end of the first rotary shaft 251 that faces the −X-axis direction, and the first fastening pattern 251c may be fastened with the first fixing part 264a having a nut pattern.

The second torque providing member 260b may be disposed to be paired with the first torque providing member 260a. In this regard, the second torque providing member 260b may have the same structure and configuration as the first torque providing member 260a, or may have a structure and configuration similar to that of the first torque providing member 260a. For example, the second torque providing member 260b may include at least one third type friction plate 261b commonly coupled to the second fixing shaft 254 and the second rotary shaft 252, at least one fourth type friction plate 262b mounted on the second rotary shaft 252, a second elastic member 263b, and a second fixing part 264b (e.g., a nut). In the above-described configuration, the third type friction plate 261b may have a structure including a plurality of friction plates 261b1, 261b2, 261b3, and/or 261b4 identically or similarly to the first type friction plate 261a described above, and the fourth type friction plate 262 may have a structure including a plurality of friction plates 262b1, 262b2, and/or 262b3 identically or similarly to the second type friction plate 262a described above. The second elastic member 263b may have a structure including a plurality of plate springs 263b1, 263b2, 263b3, and/or 263b4 identically or similarly to the first elastic member 263a, and the second fixing part 264b may have the same structure as the first fixing part 264a, or may have a structure similar to that of the first fixing part 264a.

At least part of the first rotary shaft 251 may have a cylindrical shape extending in the X-axis direction or the −X-axis direction. The first rotary shaft 251 may be moved in the clockwise or counterclockwise direction with respect to the virtual third axis (e.g., a third axis 211_13 of FIG. 7) as the first rotary member 211 rotates. In this operation, the first rotary shaft 251 may rotate in place (may rotate in the clockwise or counterclockwise direction about the center point of the first rotary shaft 251). Referring to FIG. 5, the first rotary shaft 251 may include a first column 251a, the first gear pattern 251b, a first extension 251d, and the first fastening pattern 251c. The first column 251a may have an overall cylindrical shape. A predetermined area 510 (a cut area A-A') of the first column 251a may include a flat area 511 and a curved area 512. The reason why the flat area 511 partly exists is because the plate springs and the friction plates have to be compressed when a nut is tightened, but the first rotary shaft 251 (e.g., a pinion shaft) is pulled and compressed so that friction between the first rotary shaft 251 and the first rotary member 211 increases. When the friction between the first rotary shaft 251 and the first rotary member 211 increases, the lifetimes of the corresponding components (e.g., the rotary shaft and the rotary member) may be reduced. Accordingly, the first rotary shaft 251 partially having a D-cut shape may contribute to preventing the friction plates 262a from being pushed in the X-axis direction by a predetermined distance or more and transmitting a compressive force according to nut tightening to only the friction plates 262a and the elastic member 263a.

Accordingly, as illustrated, a section of the predetermined area of the first column 251a may have curved shapes at opposite sides thereof and may have straight shapes at the top and bottom thereof. The first type friction plate 261a, the second type friction plate 262a, and the elastic member 263a may be mounted on the predetermined area of the first column 251a. The other area (e.g., an area where the flat area is not formed) of the first column 251a may be disposed in the first insertion hole 211d_2 of the first rotary member 211.

The first gear pattern 251b may be located between the first column 251a and the first extension 251d. The first gear pattern 251b may have a larger diameter than the first column 251a. The first gear pattern 251b may have a pinion gear shape. At least part of the first gear pattern 251b may be disposed to be engaged with the first arm gear pattern 221d (e.g., a rack gear pattern) formed on the first arm 221. The first extension 251d may have the same shape as the other area (e.g., the cylindrical area where the flat area is not formed) of the first column 251a. At least part of the first extension 251d may be disposed in the first sliding hole 221b2 formed in the first arm 221. The first extension 251d may be moved inside the first sliding hole 221b2 while the first arm 221 rotates. A circular rail groove 251e having a concave strap shape may be formed on an end portion of the first extension 251d. A third fixing means 291_3 (e.g., an E-ring) may be fastened to the circular rail groove 251e. Accordingly, the first rotary shaft 251 may be prevented from being separated from one side of the first arm 221. The first fastening pattern 251c may have, for example, a bolt shape. The first fastening pattern 251c may be coupled with the first fixing part 264a.

The second rotary shaft 252 may have substantially the same structure as the first rotary shaft 251, or may have a structure similar to that of the first rotary shaft 251. For example, similarly to the first rotary shaft 251, the second rotary shaft 252 may include a second column 252a, a second gear pattern 252b, a second extension 252d, and a second fastening pattern 252c. The second column 252a may have the same shape as the first column 251a described above, or may have a shape similar to that of the first column 251a. For example, the second column 252a may include a predetermined area including a flat area and another area including a cylindrical area. The second gear pattern 252b may be disposed between the second column 252a and the second extension 252d and may have a gear pattern (e.g., a pinion gear) having a larger diameter than the second column 252a. At least part of the second gear pattern 252b may be disposed to be engaged with a second arm gear pattern 222d (e.g., a rack gear pattern) of the second arm 222. The second extension 252d may extend from the second gear pattern 252b in the X-axis direction, and at least part of the second extension 252d may be disposed in the second sliding hole 222b2 of the second arm 222. The second extension 252d may be slid (or, moved) inside the second sliding hole 222b2 in response to rotation of the second arm 222. A rail groove having a strap shape may be formed on an end portion of the second extension 252d that faces the X-axis direction, and a fixing means (e.g., fourth fixing means 291_4) may be fastened to the rail groove. The second fastening pattern 252c may include, for example, a bolt pattern. The second fastening pattern 252c may be fastened with the second fixing part 264b.

The first fixing shaft 253 may have a cylindrical shape extending in the X-axis direction or the −X-axis direction. For example, at least part of the first fixing shaft 253 may be inserted into the second insertion hole 211e_2 formed in the second insertion part 211e_1 of the first rotary member 211. The first fixing shaft 253 may include a body 253a that is disposed in the second insertion hole 211e_2, the second hole 261a_3 formed in the first type friction plate 261a, and the third insertion hole 211f_2, a head 253b that is provided at an end of the body 253a facing the X-axis direction and that has a larger diameter than the second insertion hole 211e_2 such that the first fixing shaft 253 is not separated from the second insertion hole 211e_2 in the −X-axis direction, and a strap-shaped rail groove 253c provided at an end of the body 253a facing the −X-axis direction. A fifth fixing means 291_5 (e.g., an E-ring) that operates to prevent separation of the first fixing shaft 253 from the first rotary member 211 may be disposed in the rail groove 253c. The first fixing shaft 253 may be disposed in the second insertion hole 211e_2 and the third insertion hole 211f_2 and may prevent rotation and movement of the first type friction plate 261a.

The second fixing shaft 254 may have the same structure as the first fixing shaft 253 described above, and at least part of the second fixing shaft 254 may be disposed in the fifth insertion hole 212e_2 and the sixth insertion hole (not illustrated). For example, one side of the third type friction plate 261b may be mounted on the second fixing shaft 254. The second fixing shaft 254 may prevent the third type friction plate 261b from rotating in place and moving.

The fixing bracket 213 may support the first rotary member 211 and the second rotary member 212 and may be fastened with at least part of the gear structure 230. For example, the fixing bracket 213 may include a fixing body 213a including at least a portion formed to be round in the −Z-axis direction and at least a portion formed to be flat in the Z-axis direction, the first rail insertion groove 213a1 (or, an insertion hole) into which the first rotary rail 211b of the first rotary member 211 is inserted, the second rail insertion groove 213b1 (or, an insertion hole) into which the second rotary rail 212b of the second rotary member 212 is inserted, and at least one hole 213c used to couple the fixing bracket 213 to the hinge housing 150. For example, the fixing bracket 213 may include a plurality of (e.g., two) holes 213c used to couple the fixing bracket 213 to the hinge housing 150. According to various embodiments, the fixing bracket 213 may include, on one side thereof (e.g., a side surface facing the X-axis direction), a first gear recess 213a2 in which one end (e.g., an end facing the −X-axis direction) of the first main gear 231 is disposed, a second gear recess 213b2 in which one end (e.g., an end facing the −X-axis direction) of a second main gear 232 is disposed, a third gear recess 213a3 that is disposed between the first gear recess 213a2 and the second gear recess 213b2 and in which one end (e.g., an end facing the −X-axis direction) of a first idle gear 233 is disposed, and a fourth gear recess 213b3 in which one end (e.g., an end facing the −X-axis direction) of a second idle gear 234 is disposed. In another example, the fixing bracket 213 may be integrally formed with the hinge housing 150.

The gear structure 230 may include the first main gear 231, the first idle gear 233, the second idle gear 234, and the second main gear 232. The first main gear 231 may be disposed between the fixing bracket 213 and the first arm 221 and may transmit rotational forces of the first rotary member 211 and the first arm 221 to the first idle gear 233. The second main gear 232 may be disposed between the fixing bracket 213 and the second arm 222 and may transmit rotational forces of the second rotary member 212 and the second arm 222 to the second idle gear 234. The first idle gear 233 may be disposed between the first main gear 231 and the second idle gear 234 and may operate such that the first main gear 231 and the second idle gear 234 simultaneously rotate. The second idle gear 234 may be disposed between the second main gear 232 and the first idle gear 233 and may operate such that the second main gear 232 and the first idle gear 233 simultaneously rotate.

One side (e.g., the end facing the −X-axis direction) of the first main gear 231 may be inserted into the first gear recess 213a2 of the fixing bracket 213, and an opposite side (e.g., a column extending in the X-axis direction) of the first main gear 231 may be inserted into the first gear fastening hole 221c2 of the first arm 221. A fixing means may be mounted on an opposite end (e.g., an end facing the X-axis direction) of the first main gear 231 to prevent separation of the first main gear 231 from the first arm 221. One side (e.g., the end facing the −X-axis direction) of the second main gear 232 may be inserted into the second gear recess 213b2 of the fixing bracket 213, and an opposite side (e.g., a column extending in the X-axis direction) of the second main gear 232 may be inserted into the second gear fastening hole 222c2 of the second arm 222. A fixing means may be mounted on an opposite end (e.g., an end facing the X-axis direction) of the second main gear 232 to prevent separation of the second main gear 232 from the second arm 222. When at least one of the first rotary member 211 or the second rotary member 212 rotates, the above-described gear structure 230 may transmit a rotational force of the one rotary member to the other rotary member to allow the first rotary member 211 and the second rotary member 212 to identically rotate in a folding or unfolding operation of the electronic device 100.

The gear bracket 243 may serve to fix the first main gear 231 and the second main gear 232. The gear bracket 243 may fix, to the hinge housing 150, the first arm 221 to which the first main gear 231 is fastened and the second arm 222 to which the second main gear 232 is fastened. In another example, the gear bracket 243 may fix, to the fixing bracket 213, the first arm 221 to which the first main gear 231 is fastened and the second arm 222 to which the second main gear 232 is fastened. In this regard, the gear bracket 243 may include a gear bracket body 243a, a first gear connecting hole 243b1, a second gear connecting hole 243b2, a housing fastening part 243c1, and a housing fastening hole 243c2. The gear bracket body 243a and the housing fastening part 243c1 may be disposed with a predetermined angle (e.g., 90 degrees) therebetween. The first gear connecting hole 243b1 may be disposed adjacent to an edge of the gear bracket body 243a that faces the −Y-axis direction, and the second gear connecting hole 243b2 may be disposed adjacent to an edge of the gear bracket body 243a that faces the Y-axis direction.

The fixing means 291_1, 291_2, 291_3, 291_4, 291_5, and 291_6 may include at least one E-ring. For example, the fixing means 291_1, 291_2, 291_3, 291_4, 291_5, and 291_6 may include the first fixing means 291_1 that is mounted on one side of the first main gear 231 and that prevents separation of the first main gear 231 from the first arm 221, the second fixing means 291_2 that is mounted on one side of the second main gear 232 and that prevents separation of the second main gear 232 from the second arm 222, the third fixing means 291_3 that is mounted on the edge portion of the first rotary shaft 251 facing the X-axis direction and that prevents separation of the first rotary shaft 251 from the first sliding hole 221b2 of the first arm 221, the fourth fixing means 291_4 that is mounted on the edge portion of the second rotary shaft 252 facing the X-axis direction and that prevents separation of the second rotary shaft 252 from the second sliding hole 222b2 of the second arm 222, the fifth fixing means 291_5 that prevents separation of the first fixing shaft 253 from the first rotary member 211, and the sixth fixing means 291_6 that prevents separation of the second fixing shaft 254 from the second rotary member 212.

Figure 6:
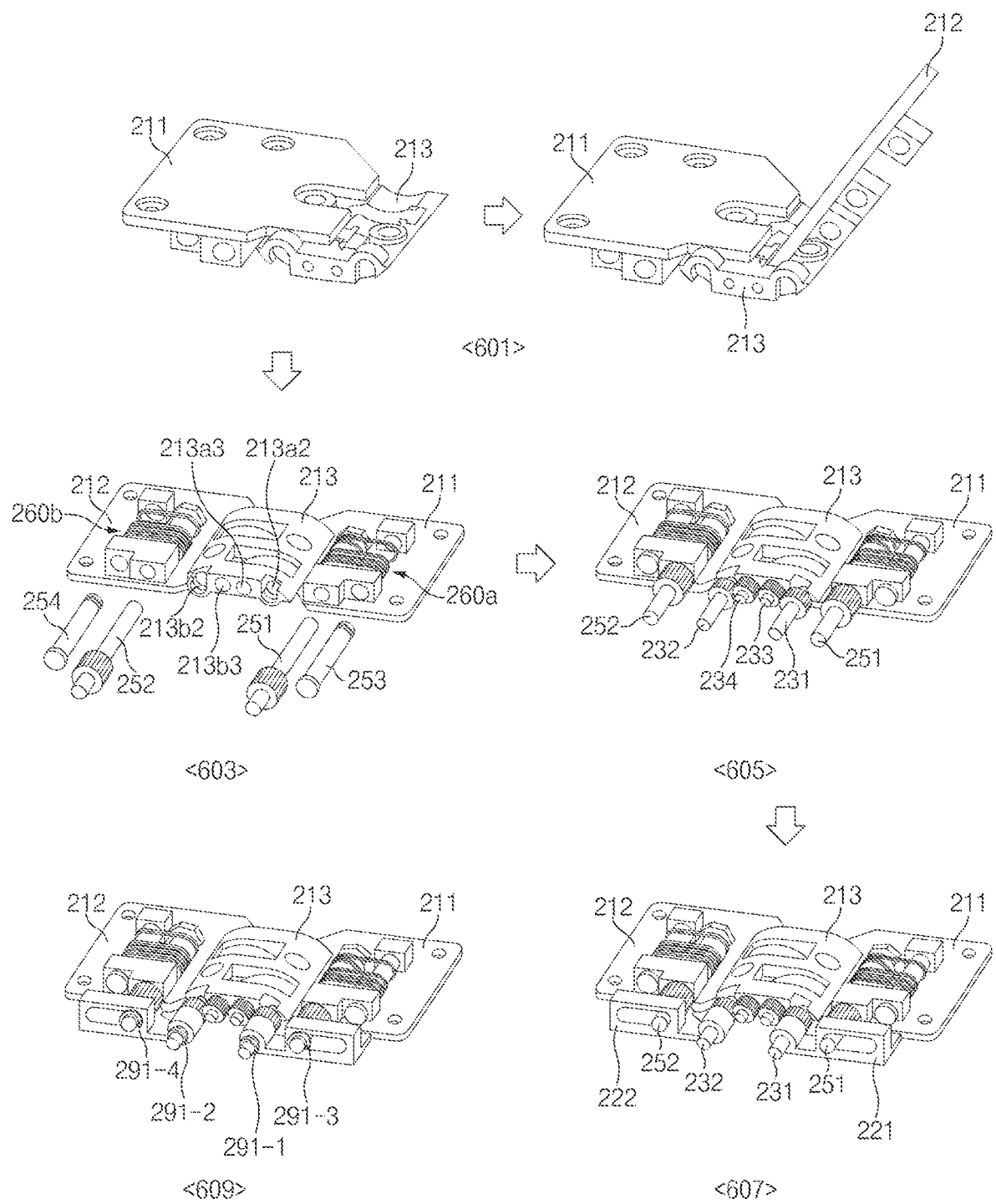
FIG. 6 is a view illustrating one example of an assembly process of a hinge structure according to an embodiment of the disclosure.

FIG. 6 is a view illustrating one example of an assembly process of a hinge structure according to an embodiment of the disclosure.

Referring to FIGS. 3 and 6, as in state 601, a first rotary rail 211b of a first rotary member 211 may be inserted into a first rail insertion groove 213a1 of a fixing bracket 213. After the first rotary rail 211b of the first rotary member 211 is inserted into the first rail insertion groove 213a1 of the fixing bracket 213, the second rotary rail 212b of the second rotary member 212 may be inserted into the second rail insertion groove 213b1 of the fixing bracket 213.

After the first rotary member 211 and the second rotary member 212 are fastened, as in state 603, the first torque providing member 260a may be disposed on the rear surface of the first rotary member 211, and the first rotary shaft 251 and the first fixing shaft 253 may be inserted into the first insertion hole 211d_2 and the second insertion hole 211e_2 of the first rotary member 211 and may be fastened with the components (e.g., the first type friction plate 261a, the second type friction plate 262a, the first elastic member 263a, and the first fixing part 264a) of the first torque providing member 260a. Similarly, the second torque providing member 260b may be disposed on the rear surface of the second rotary member 212, and the second rotary shaft 252 and the second fixing shaft 254 may be inserted into the fourth insertion hole 212d_2 and the fifth insertion hole 212e_2 of the second rotary member 212 and may be fastened with the components (e.g., the third type friction plate 261b, the fourth type friction plate 262b, the second elastic member 263b, and the second fixing part 264b) of the second torque providing member 260b.

In state 605, the gear structure 230 (e.g., the first main gear 231, the second main gear 232, the first idle gear 233, and the second idle gear 234) may be disposed on one side of the fixing bracket 213 (e.g., in the first gear recess 213a2, the second gear recess 213b2, the third gear recess 213a3, and the fourth gear recess 213b3).

In state 607, the first arm 221 and the second arm 222 may be fastened. For example, the first extension 251d of the first rotary shaft 251 may be disposed in the first sliding hole 221b2 of the first arm 221, and the first gear pattern 251b may be disposed to be engaged with the first arm gear pattern 221d formed on the first arm 221. In this process, one side of the first main gear 231 may be inserted into the first gear fastening part 221c1 of the first arm 221. Similarly, the second extension 252d of the second rotary shaft 252 may be disposed in the second sliding hole 222b2 of the second arm 222, the second gear pattern 252b may be disposed to be engaged with the second arm gear pattern 222d formed on the second arm 222, and one side of the second main gear 232 may be inserted into the second gear fastening part 222c1 of the second arm 222.

In state 609, the fixing means 291_1, 291_2, 291_3, 291_4, 291_5, and 291_6 may be mounted on the corresponding components. For example, the first fixing means 291_1 may be mounted on one end of the first main gear 231, and the second fixing means 291_2 may be mounted on one end of the second main gear 232. Furthermore, the third fixing means 291_3 may be mounted on one end of the first rotary shaft 251, and the fourth fixing means 291_4 may be mounted on one end of the second rotary shaft 252. Additionally, the fifth fixing means 291_5 and the sixth fixing means 291_6 may be mounted on the first fixing shaft 253 and the second fixing shaft 254, respectively.

Figure 7:
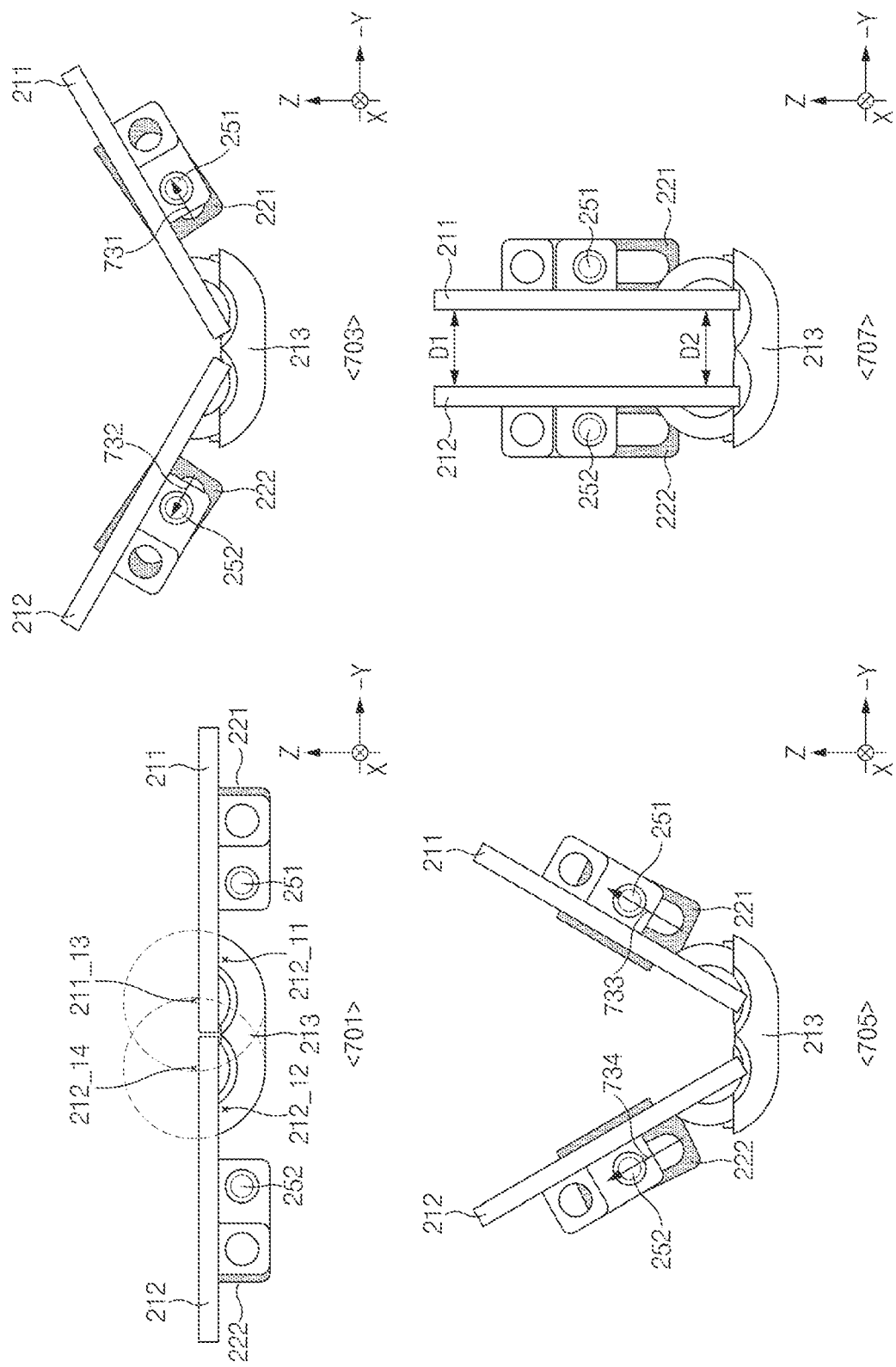
FIG. 7 is a view illustrating examples of a mounting angle of an electronic device according to an embodiment of the disclosure.

FIG. 7 is a view illustrating examples of a mounting angle of an electronic device according to an embodiment of the disclosure.

Referring to FIGS. 3 and 7, as in state 701, at least a part of the components of an electronic device 100, for example, a hinge structure 200 may have a flat state (or, an open state). In this regard, the first rotary member 211 and the second rotary member 212 may be disposed parallel to each other on the Y-axis and the −Y-axis. Similarly, the first arm 221 and the second arm 222 may be disposed parallel to each other on the Y-axis and the −Y-axis. The first rotary member 211 may rotate in the clockwise or counterclockwise direction about the virtual third axis 211_13 corresponding to the center point of the first rotary rail 211b. The second rotary member 212 may rotate in the clockwise or counterclockwise direction about a virtual fourth axis 212_14 corresponding to the center point of the second rotary rail 212b. The first arm 221 may rotate in the clockwise or counterclockwise direction about a first axis 212_11 corresponding to the center point of the first main gear 231. The second arm 222 may rotate in the clockwise or counterclockwise direction about a second axis 212_12 corresponding to the center point of the second main gear 232. When the hinge structure 200 is in the flat state, the first rotary shaft 251 inside the first sliding hole 221b2 may be biased toward the center of the hinge structure 200, and the second rotary shaft 252 inside the second sliding hole 222b2 may be biased toward the center of the hinge structure 200.

As in state 703, at least a part of the components of the electronic device 100, for example, the hinge structure 200 may have a first partially folded state of being folded by a first angle in the Z-axis direction with respect to the horizontal state. The first angle or the angle between the Y-axis and the first rotary member 211 may be an angle between about 10 degrees and about 50 degrees. Alternatively, the angle between the first rotary member 211 and the second rotary member 212 may be a specific angle of about 120 degrees. Because the central axes of rotation of the first rotary member 211 and the first arm 221 differ from each other, as illustrated, in the first partially folded state, the amount of rotation of the first rotary member 211 and the amount of rotation of the first arm 221 may differ from each other even though components (e.g., the first housing 110 and the second housing 120) of the electronic device 100 move the same distance. Similarly, in the first partially folded state, the amount of rotation of the second rotary member 212 and the amount of rotation of the second arm 222 may differ from each other while the hinge structure 200 is disposed at the first angle. In the first partially folded state, the first rotary shaft 251 may move a first distance in a first direction 731 inside the first sliding hole 221b2. In the first partially folded state, the second rotary shaft 252 may move the first distance in a second direction 732 inside the second sliding hole 222b2.

As in state 705, at least a part of the components of the electronic device 100, for example, the hinge structure 200 may have a second partially folded state of being folded by a second angle in the Z-axis direction with respect to the horizontal state. The second angle or the angle between the Y-axis and the first rotary member 211 may be an angle between about 50 degrees and about 80 degrees. Alternatively, the angle between the first rotary member 211 and the second rotary member 212 may be a specific angle of about 80 degrees. Because the central axes of rotation of the first rotary member 211 and the first arm 221 differ from each other, in the second partially folded state, the amount of rotation of the first rotary member 211 or the amount of rotation of the second rotary member 212 may differ from the amount of rotation of the first arm 221 or the amount of rotation of the second arm 222. In the second partially folded state, the first rotary shaft 251 inside the first sliding hole 221b2 may move a second distance (e.g., a distance greater than the first distance) in a third direction 733. In the second partially folded state, the second rotary shaft 252 inside the second sliding hole 222b2 may move the second distance (e.g., a distance greater than the first distance) in a fourth direction 734.

As in state 707, at least a part of the components of the electronic device 100, for example, the hinge structure 200 may have a folded state in the Z-axis direction with respect to the horizontal state. The folded state may include a state in which at least part of the first rotary member 211 and at least part of the second rotary member 212 face each other. According to an embodiment, in the folded state, the first rotary member 211 and the second rotary member 212 may be disposed side by side in the form of "11". In the folded state, the first arm 221 and the second arm 222 may also be disposed side by side with respect to the Z-axis. The first rotary member 211 and the first arm 221 may be disposed parallel to each other with respect to the Z-axis. The second rotary member 212 and the second arm 222 may be disposed parallel to each other with respect to the Z-axis. According to various embodiments, the distance between an end of the first rotary member 211 that faces the Z-axis direction and an end of the second rotary member 212 that faces the Z-axis direction may differ from the distance between an end of the first rotary member 211 that faces the −Z-axis direction and an end of the second rotary member 212 that faces the −Z-axis direction. For example, the distance D1 between the end of the first rotary member 211 that faces the Z-axis direction and the end of the second rotary member 212 that faces the Z-axis direction may be shorter than the distance D2 between the end of the first rotary member 211 that faces the −Z-axis direction and the end of the second rotary member 212 that faces the −Z-axis direction. The first rotary shaft 251 inside the first sliding hole 221b2 may move a third distance (e.g., a distance greater than the second distance in the Z-axis direction) toward the edge of the first sliding hole 221b2 that faces the Z-axis direction. The second rotary shaft 252 inside the second sliding hole 222b2 may move the third distance (e.g., a distance greater than the second distance in the Z-axis direction) toward the edge of the second sliding hole 222b2 that faces the Z-axis direction. Alternatively, the first rotary shaft 251 may be located at the edge of the first sliding hole 221b2 that faces the Z-axis direction, and the second rotary shaft 252 may be located at the edge of the second sliding hole 222b2 that faces the Z-axis direction.

Although the hinge structure 200 has been described as having the four states, the disclosure is not limited thereto. For example, the hinge structure 200 may have states of being partially folded with various angles between the flat state and the folded state.

Figure 8:
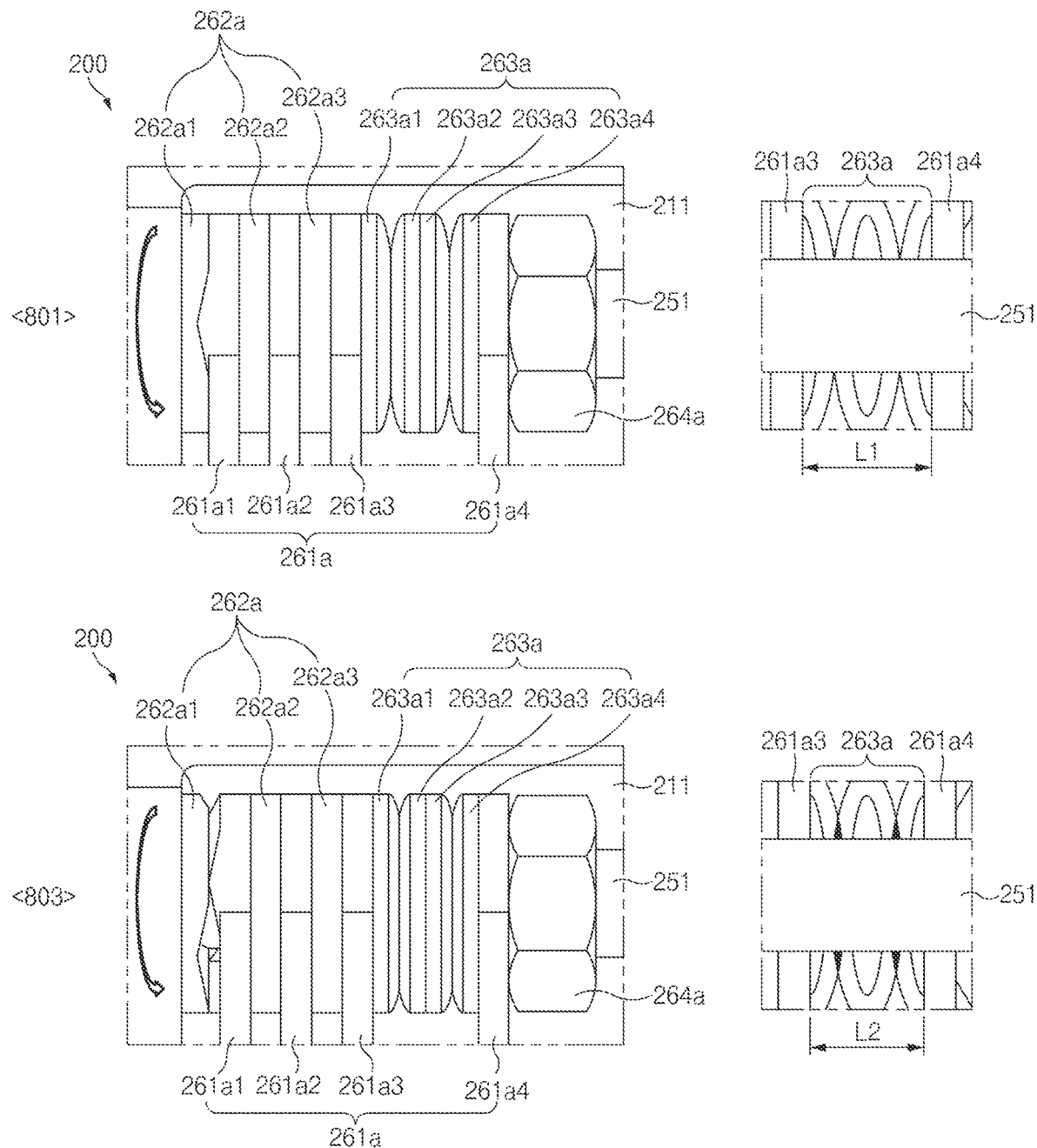
FIG. 8 is a view illustrating provision of a frictional force by a torque providing member according to an embodiment of the disclosure.

FIG. 8 is a view illustrating provision of a frictional force by a torque providing member according to an embodiment of the disclosure.

Referring to FIGS. 3, 7, and 8, a hinge structure 200 may include at least a first rotary member 211, a first torque providing member 260a and a first rotary shaft 251 that are disposed on a rear surface of a first rotary member 211, a second rotary member 212, and a second torque providing member 260b and a second rotary shaft 252 that are disposed on a rear surface of a second rotary member 212. In the drawing, some of the components of the first rotary member 211, the first torque providing member 260a, and the first rotary shaft 251 are illustrated. As described above with reference to FIG. 3, the first torque providing member 260a may include the first type friction plate 261a, the second type friction plate 262a, the first elastic member 263a, and the first fixing part 264a. The first type friction plate 261a may include friction plate 261a1, friction plate 261a2, friction plate 261a3, and friction plate 261a4, and the second type friction plate 262a may include friction plate 262a1, friction plate 262a2, and friction plate 262a3. The first type friction plate 261a and the second type friction plate 262a may be alternately mounted on the first rotary shaft 251.

According to various embodiments, friction plate 261a1 of the first type friction plate 261a and friction plate 262a1 of the second type friction plate 262a may each include a cam structure. Friction plate 261a1 may have a cam structure including ridges and valleys formed in a direction toward the first insertion part 211d_1 of the first rotary member 211. Friction plate 262a1 may have a cam structure including ridges and valleys formed in a direction toward friction plate 261a1. Accordingly, the cam structure of friction plate 261a1 that includes the ridges and the valleys may be disposed to be engaged with the cam structure of friction plate 262a1 that includes the ridges and the valleys. According to an embodiment, as in state 801, the ridges of friction plate 261a1 may be disposed to be engaged with the valleys of friction plate 262a1. In this case, the first elastic member 263a may have a first width L1. The first width may refer to, for example, the thickness by which a plurality of plate springs are stacked one above another. The state in which the ridges of friction plate 261a1 and the valleys of friction plate 262a1 are disposed to be engaged with each other in the hinge structure 200 may include one of the flat state or the folded state of the electronic device 100 described above with reference to FIG. 7.

According to various embodiments, when the hinge structure 200 has a partially folded state, the first rotary shaft 251 may rotate, and the second type friction plate 262a may rotate as the first rotary shaft 251 rotates. In this operation, as in state 803, the ridges of friction plate 261a1 and the ridges of friction plate 262a1 may be disposed to make contact with each other. As the ridges of friction plate 261a1 and the ridges of friction plate 262a1 make contact with each other, the space between friction plate 261a1 and friction plate 262a1 may be widened, and accordingly the width of the first elastic member 263a may be changed to a second width L2. The second width L2 may be smaller than the first width L1. An elastic force generated by the first elastic member 263a may raise the contact strength of the first type friction plate 261a and the second type friction plate 262a. As the second type friction plate 262a rotates, the strength of friction with the first type friction plate 261a may be raised, and accordingly a frictional force of the first torque providing member 260a may be increased. The increased frictional force of the first torque providing member 260a may contribute to free-stop of the first housing 110 with a specific angle. While the second type friction plate 262a rotates in place, the first type friction plate 261a may have a state of being fixed without being rotated in place by the first fixing shaft 253. The hinge structure 200 in state 803 may include one of state 703 or state 705 other than the flat state and the folded state of the electronic device 100 described above with reference to FIG. 7.

Figure 9:
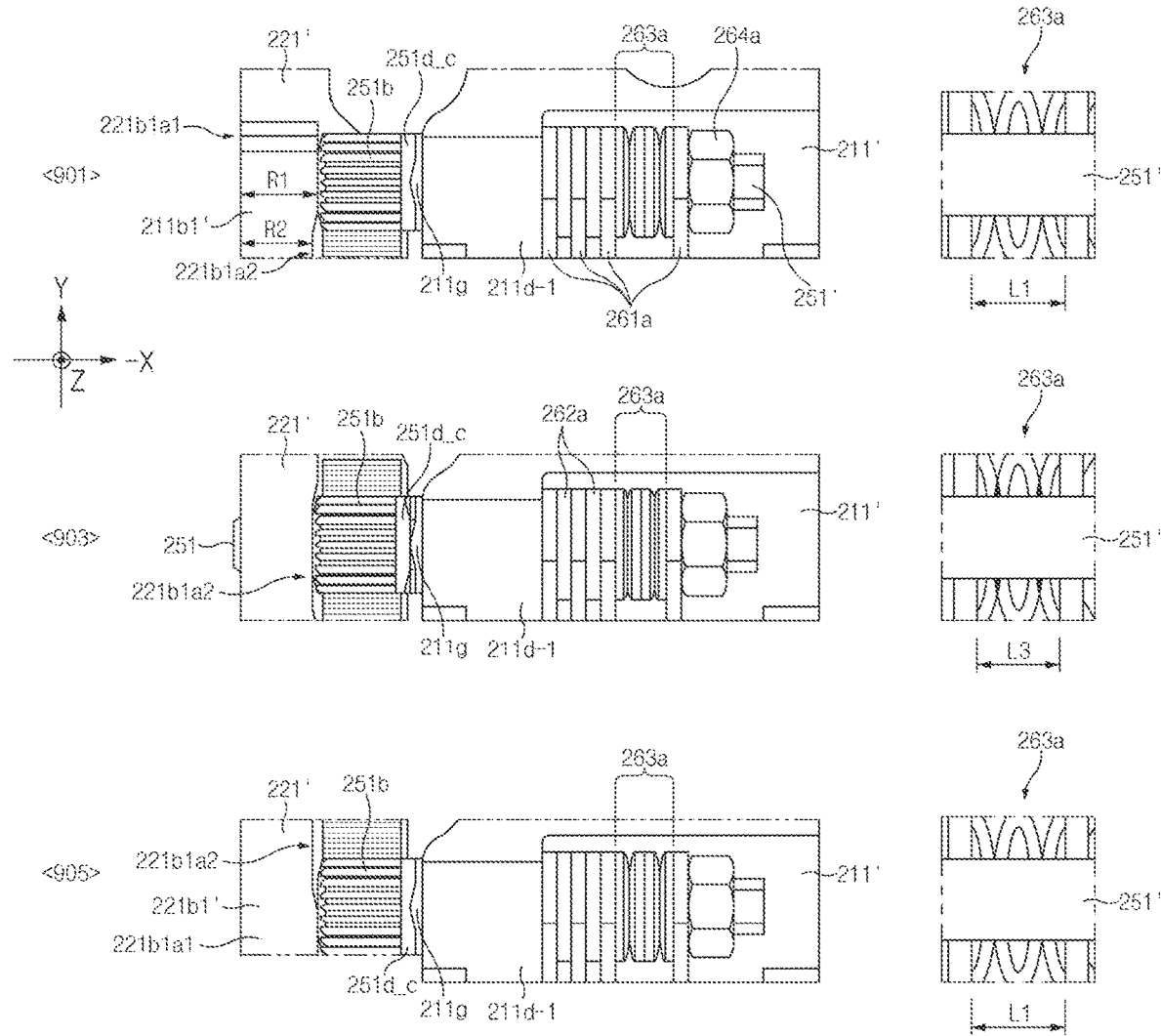
FIG. 9 is a view illustrating one example of a modified structure related to a torque providing member according to an embodiment of the disclosure.

FIG. 9 is a view illustrating one example of a modified structure related to a torque providing member according to an embodiment of the disclosure.

Referring to FIGS. 3, 7, and 9, a hinge structure 200 may include at least a modified first rotary member 211', a first torque providing member 260a disposed on a rear surface of a modified first rotary member 211', a modified first rotary shaft 251', and a modified first arm 221' fastened with the modified first rotary shaft 251'. Additionally, as described above with reference to FIG. 3, the hinge structure 200 may further include a modified second rotary member corresponding to the modified first rotary member 211', a second torque providing member, a modified second rotary shaft corresponding to the modified first rotary shaft 251', and a modified second arm corresponding to the modified first arm 221'. In the drawing, for convenience of description, parts of the modified first rotary member 211', the first torque providing member 260a, the modified first rotary shaft 251', and the modified first arm 221' are illustrated.

As in state 901, the first torque providing member 260a may include a first type friction plate 261a, a second type friction plate 262a, a first elastic member 263a, and a first fixing part 264a. The first type friction plate 261a may include a plurality of friction plates. For example, the first type friction plate 261a may include four friction plates as described above with reference to FIG. 8. The structure of the first type friction plate 261a may be the same as the structure described above with reference to FIG. 5. The second type friction plate 262a may include a plurality of friction plates. The second type friction plate 262a may include three friction plates as described above with reference to FIG. 8, or may include two friction plates as in state 901. At least one of the number of first type friction plates 261a, the number of second type friction plates 262a, or the order in which the friction plates are arranged may be changed.

According to various embodiments, as described above with reference to FIG. 3, the modified first rotary member 211' may include a first basic body 211a, a first rotary rail 211b, at least one first connecting hole 211c, a first insertion hole 211d_2, a first insertion part 211d_1, a second insertion hole 211e_2, a second insertion part 211e_1, a third insertion part 211f_1, and a third insertion hole 211f_2. Additionally, the modified first rotary member 211' may further include a fixed cam structure 211g in a direction toward a first gear pattern 251b of the modified first rotary shaft 251'. Ridges and valleys of the fixed cam structure 211g may be disposed to face a direction in which the modified first arm 221' is fastened.

According to various embodiments, as described above with reference to FIG. 3 or FIG. 5, the modified first rotary shaft 251' may include a first column 251a, the first gear pattern 251b, a first extension 251d, and a first fastening pattern 251c and may further include a rotary cam structure 251d_c. The rotary cam structure 251d_c may be formed on a side surface of the first gear pattern 251b. For example, ridges and valleys of the rotary cam structure 251d_c may be disposed on one side of the first gear pattern 251b in a direction toward the modified first rotary member 211'.

According to various embodiments, as described above with reference to FIG. 3, the modified first arm 221' may include a first body 221a, a first gear fastening part 221c1, and a first arm gear pattern 221d and may further include a modified first sliding part 221b1'. The modified first sliding part 221b1' may have different widths depending on positions. For example, the modified first sliding part 221b1' may include a first portion 221b1a1 having a first width R1 and a second portion 221b1a2 having a second width R2 smaller than the first width R1.

Referring to state 901, the hinge structure 200 may have a flat state (or, a folded state). Accordingly, the ridges and valleys of the rotary cam structure 251d_c of the modified first rotary shaft 251' may be disposed to be engaged with the valleys and ridges of the fixed cam structure 211g of the modified first rotary member 211'. One side (e.g., a side surface facing the X-axis direction) of the first gear fastening part 221c1 of the modified first rotary shaft 251' may be disposed to make contact with the first portion 221b1a1 of the modified first sliding part 221b1'. In this case, the first elastic member 263a may have, for example, a first width L1.

When the electronic device 100 is changed from a flat state to a folded state or from a folded state to a flat state or has a partially folded state, the modified first rotary member 211' may rotate, and one side of the modified first rotary shaft 251' may move inside a first sliding hole 221b2 of the modified first arm 221'. In this operation, the modified first rotary shaft 251' may rotate in place. As the modified first rotary shaft 251' rotates in place in the state in which the fixed cam structure 211g is fixed without rotation in place, the ridges of the rotary cam structure 251d_c formed on the modified first rotary shaft 251' may make contact with the ridges of the fixed cam structure 211g as in state 903. As the space between the first gear fastening part 221c1 of the modified first rotary shaft 251' and the modified first rotary member 211' is widened, the modified first rotary shaft 251' may be moved in the X-axis direction. In response, a side surface of the modified first rotary shaft 251' in the X-axis direction may be disposed to make contact with the second portion 221b1a2 of the modified first sliding part 221b1'. As the modified first rotary shaft 251' moves in the X-axis direction, the first elastic member 263a may be compressed and may have a third width L3. The third width L3 may be smaller than the first width L1. As the first elastic member 263a is compressed, the elastic force of the first elastic member 263a may be increased, and a frictional force between the first type friction plate 261a and the second type friction plate 262a may be increased.

When the electronic device 100 is changed from a partially folded state to a folded state (or, a flat state), the modified first rotary member 211' may be disposed in a direction toward the modified second rotary member. In response, one side of the modified first rotary shaft 251' may move to an edge facing the −Y-axis direction inside the first sliding hole 221b2 of the modified first arm 221'. While the electronic device 100 is changed from the partially folded state to the folded state (or, the flat state), the modified first rotary shaft 251' may rotate in place. As the modified first rotary shaft 251' rotates in place, the ridges and valleys of the rotary cam structure 251d_c formed on the modified first rotary shaft 251' may be disposed to be engaged with the valleys and ridges of the fixed cam structure 211g as in state 905. As the space between the first gear fastening part 221c1 of the modified first rotary shaft 251' and the modified first rotary member 211' is widened, the modified first rotary shaft 251' may be moved in the −X-axis direction. In response, the side surface of the modified first rotary shaft 251' in the X-axis direction may be disposed to make contact with the first portion 221*b*1*a*1 of the modified first sliding part 221*b*1'. As the modified first rotary shaft 251' moves in the −X-axis direction, the first elastic member 263*a* compressed to the third width L3 may be released and may have the first width L1.

Figure 10:
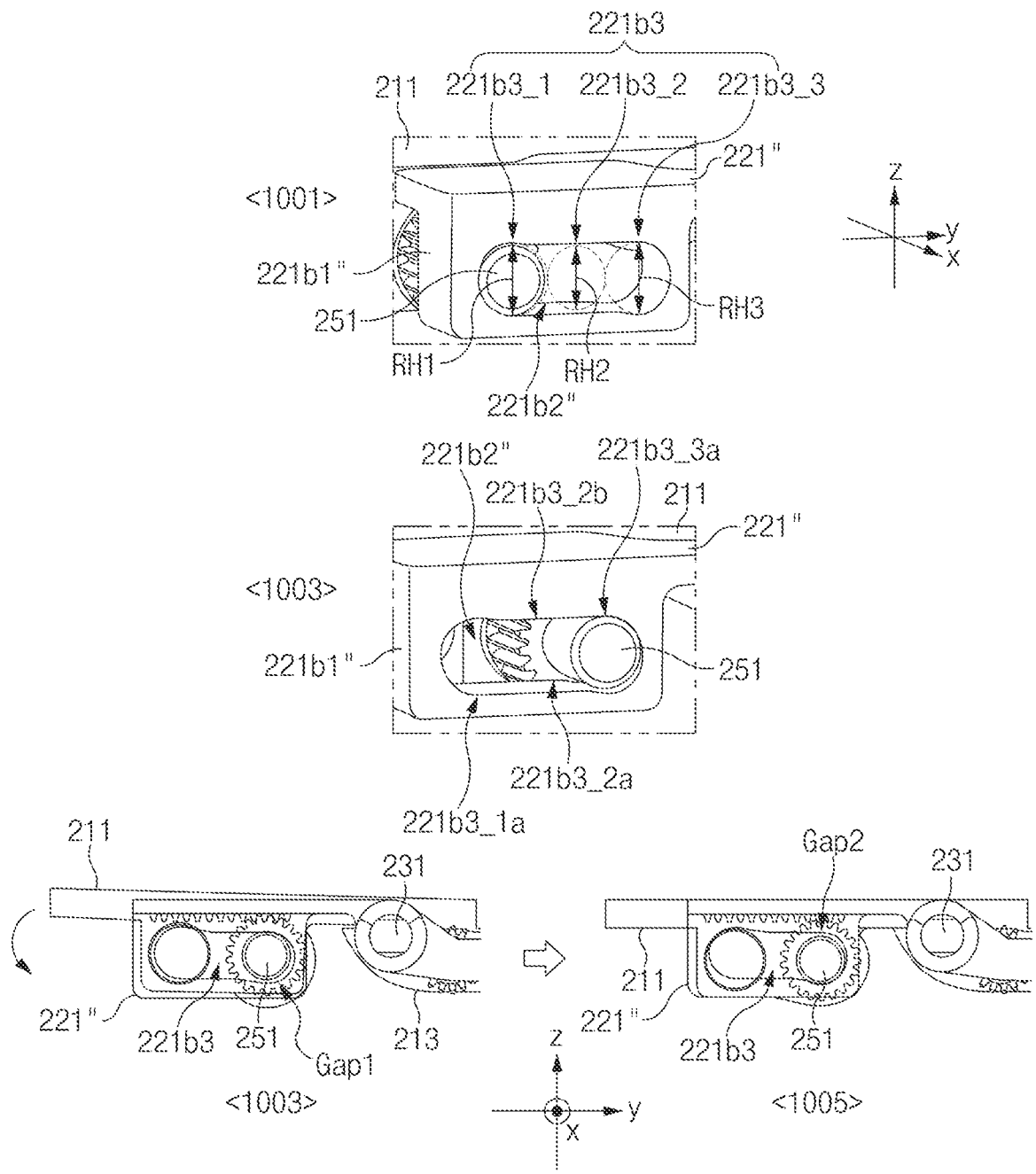
FIG. 10 is a view illustrating one example of a modified arm according to an embodiment of the disclosure.

FIG. 10 is a view illustrating one example of a modified arm according to an embodiment of the disclosure.

Referring to FIGS. 3 and 10, at least part of a hinge structure 200 may include a first rotary member 211, a first rotary shaft 251, and a modified arm 221", and as described above with reference to FIG. 3, a modified arm 221" may include a first body 221*a*, a first gear fastening part 221*c*1, and a first arm gear pattern 221*d*. Additionally, as illustrated, the modified arm 221" according to an embodiment may include a modified sliding part 221*b*1" and a modified sliding hole 221*b*2". The modified arm 221" may be applied to at least one of the first arm 221 or the second arm 222 described above with reference to FIG. 3.

The modified sliding hole 221*b*2" may include an opening area having a size similar to the diameter of a column of the first rotary shaft 251. The modified sliding hole 221*b*2" may have a shape in which the length of the hole in the Y-axis direction is greater than the length of the hole in the Z-axis direction. According to an embodiment, the modified sliding hole 221*b*2" may have a shape in which portions have different sizes. For example, the modified sliding hole 221*b*2" may include a plurality of opening areas 221*b*3 including a first opening area 221*b*3_1 into which a rotary shaft having a first diameter RH1 is inserted, a second opening area 221*b*3_2 into which a rotary shaft having a second diameter RH2 is inserted, and a third opening area 221*b*3_3 into which a rotary shaft having a third diameter RH3 is inserted. The second opening area 221*b*3_2 may have the second diameter RH2 that is the same as or similar to the diameter of the column of the first rotary shaft 251 mentioned above. The first diameter RH1 may be greater than the second diameter RH2 by a specified size. For example, the first diameter RH1 may have a size by which the first rotary shaft 251 can be moved within a predetermined range. The third diameter RH3 may have the same size as the first diameter RH1. A bottom surface 221*b*3_1*a* of the first opening area 221*b*3_1 in the −Z-axis direction may have the same height as a bottom surface 221*b*3_2*a* of the second opening area 221*b*3_2 in the −Z-axis direction. An upper side surface 221*b*3_3*a* of the third opening area 221*b*3_3 in the Z-axis direction may have the same height as an upper side surface 221*b*3_2*b* of the second opening area 221*b*3_2 in the Z-axis direction.

As in state 1001, the hinge structure 200 having the above-described structure may be moved within a predetermined range in the Z-axis direction when the first rotary shaft 251 is disposed in the first opening area 221*b*3_1. Furthermore, as in state 1003, the hinge structure 200 may be moved within a predetermined range in the −Z-axis direction when the first rotary shaft 251 is disposed in the third opening area 221*b*3_3. When the first rotary shaft 251 has a first gap Gap1 in the −Z-axis direction inside the modified sliding hole 221*b*2" as in state 1003, the heights of the first rotary member 211 and the modified arm 221" in the Z-axis direction may differ from each other. According to various embodiments, as in state 1005, the first rotary shaft 251 may be moved in the −Z-axis direction in a state of being disposed in the third opening area 221*b*3_3 and may have a second gap Gap2 in the Z-axis direction inside the modified sliding hole 221*b*2". In this case, the first rotary member 211 and the modified arm 221" may have the same height in the Z-axis direction. The first gap Gap1 and the second gap Gap2 may have the same size, or may be implemented to be different from each other.

The hinge structure 200 having the above-described structure may provide mobility to the first rotary member 211 or the second rotary member 212 at the time when the first rotary shaft 251 starts to be changed from a folded state or a flat state to a next operating state (e.g., a partially folded state), thereby supporting more easily applying additional pressure to the rotary members 211 and 212. Accordingly, the disclosure may support easily manipulating a folding or unfolding operation of the electronic device based on a smaller force.

Figure 11:
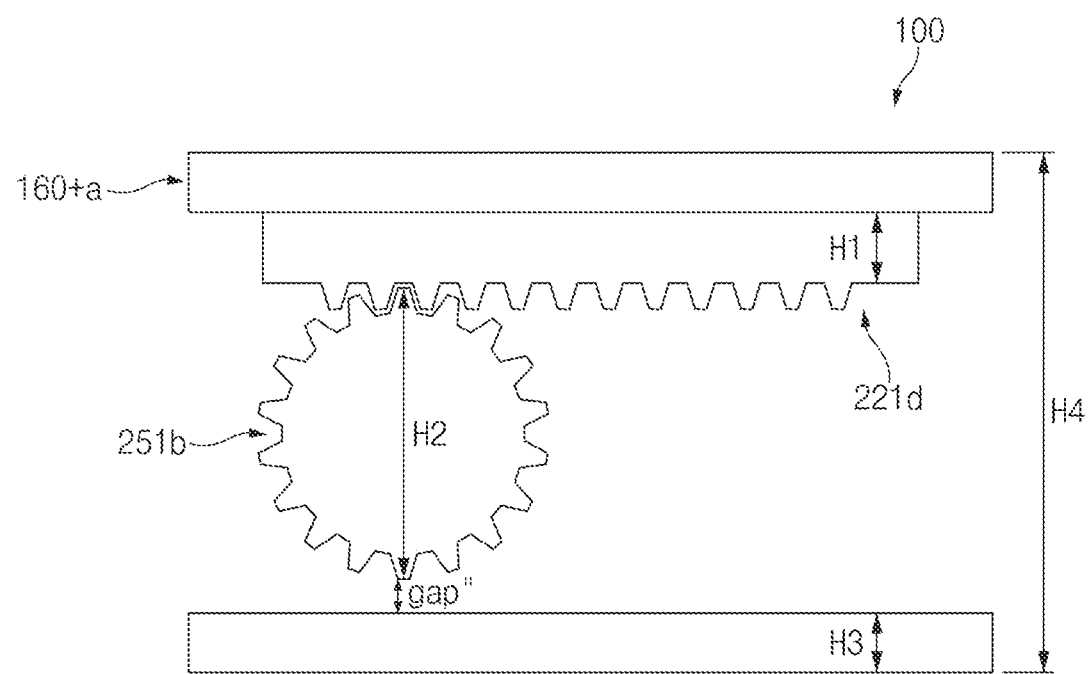
FIG. 11 is a view illustrating a structure of some components related to a thickness of an electronic device according to an embodiment of the disclosure.

FIG. 11 is a view illustrating a structure of some components related to a thickness of an electronic device according to an embodiment of the disclosure.

Figure 12:
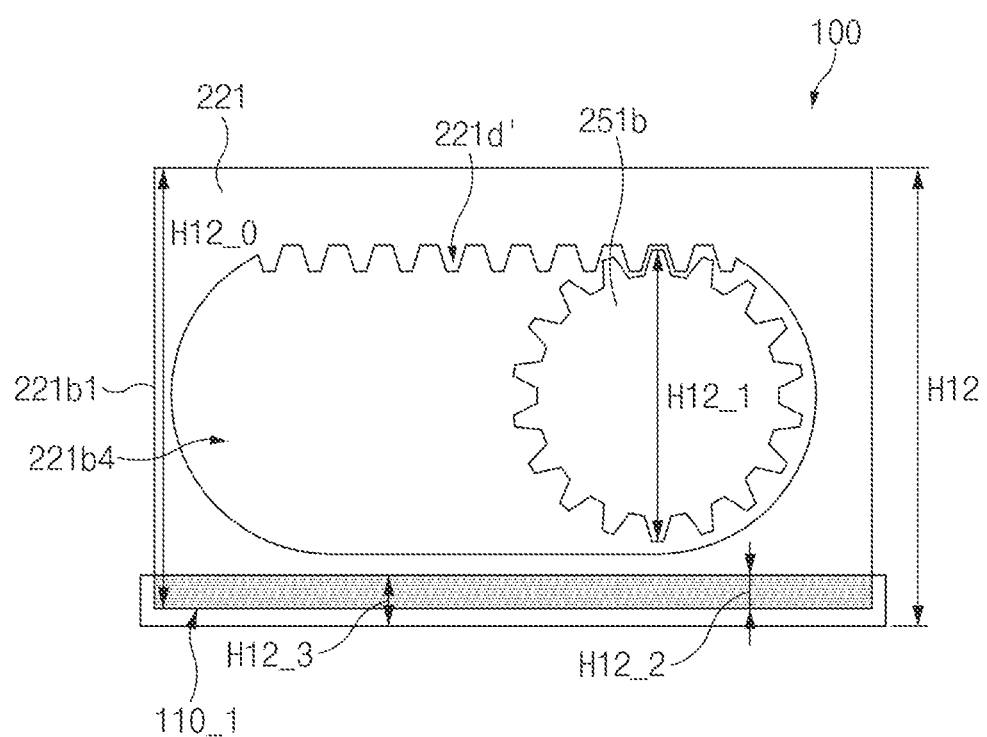
FIG. 12 is a view illustrating a partial structure of an electronic device having an improved thickness according to an embodiment of the disclosure.

FIG. 12 is a view illustrating a partial structure of an electronic device having an improved thickness according to an embodiment of the disclosure.

Referring to FIG. 11, an electronic device 100 may have a first set thickness H4. The first set thickness H4 may include, for example, the thickness of the display 160, the thickness "a" of a rear protective layer disposed on the rear surface of the display 160, the thickness H1 of the first arm gear pattern 221*d* (or, the second arm gear pattern 222*d*) of the first arm 221 (or, the second arm 222), the diameter H2 of the first gear pattern 251*b* (or, the second gear pattern 252*b*) disposed on the rotary shaft 251 or 252, the gap "gap" between the first gear pattern 251*b* and the first housing 110 (or, the second housing 120), and the thickness H3 of the first housing 110 (or, the second housing 120).

In a process in which the first rotary shaft 251 is fastened with the first arm gear pattern 221*d*, the first rotary shaft 251 may be fastened with the first arm gear pattern 221*d* formed on the portion extending from the first body 221*a* of the first arm 221, and the electronic device 100 may have the first set thickness H4 greater than the thickness in FIG. 12. The thickness of a pinion gear corresponding to the first fastening pattern 251*c* of the first rotary shaft 251 may be made greater than the thickness in FIG. 12, and thus the electronic device 100 having the above-described structure may provide a structure having good durability and functionality.

Referring to FIG. 12, an electronic device 100 may have a second set thickness H12. The second set thickness H12 may be the sum of the thickness H12_0 of the first arm 221 and the thickness H12_3 of the first housing 110 minus the thickness H12_2 by which the first arm 221 and the first housing 110 overlap each other when the first arm 221 is seated on a seating part 110_1 of the first housing 110. The electronic device 100 may include a structure in which a modified arm gear pattern 221*d*' engaged with the first gear pattern 251*b* is formed in a sliding hole 221*b*4 of the first arm 221. As the first gear pattern 251*b* is inserted into the modified arm gear pattern 221*d*', the electronic device 100 may be designed to have the second set thickness H12 smaller than the first set thickness H4 in FIG. 11. The seating part 110_1 in which the first arm 221 is seated by a predetermined depth H12_2 may be formed on one side of the first housing 110 such that part of the first arm 221 overlaps the first housing 110. The diameter H12_1 of the first gear pattern 251*b* may not affect the second set thickness H12. Although the thicknesses of a separate display and a rear panel are not illustrated in FIG. 12, the thicknesses of the display and the rear protective layer may be added to the second set thickness H12 as illustrated in FIG. 11.

Figure 13:
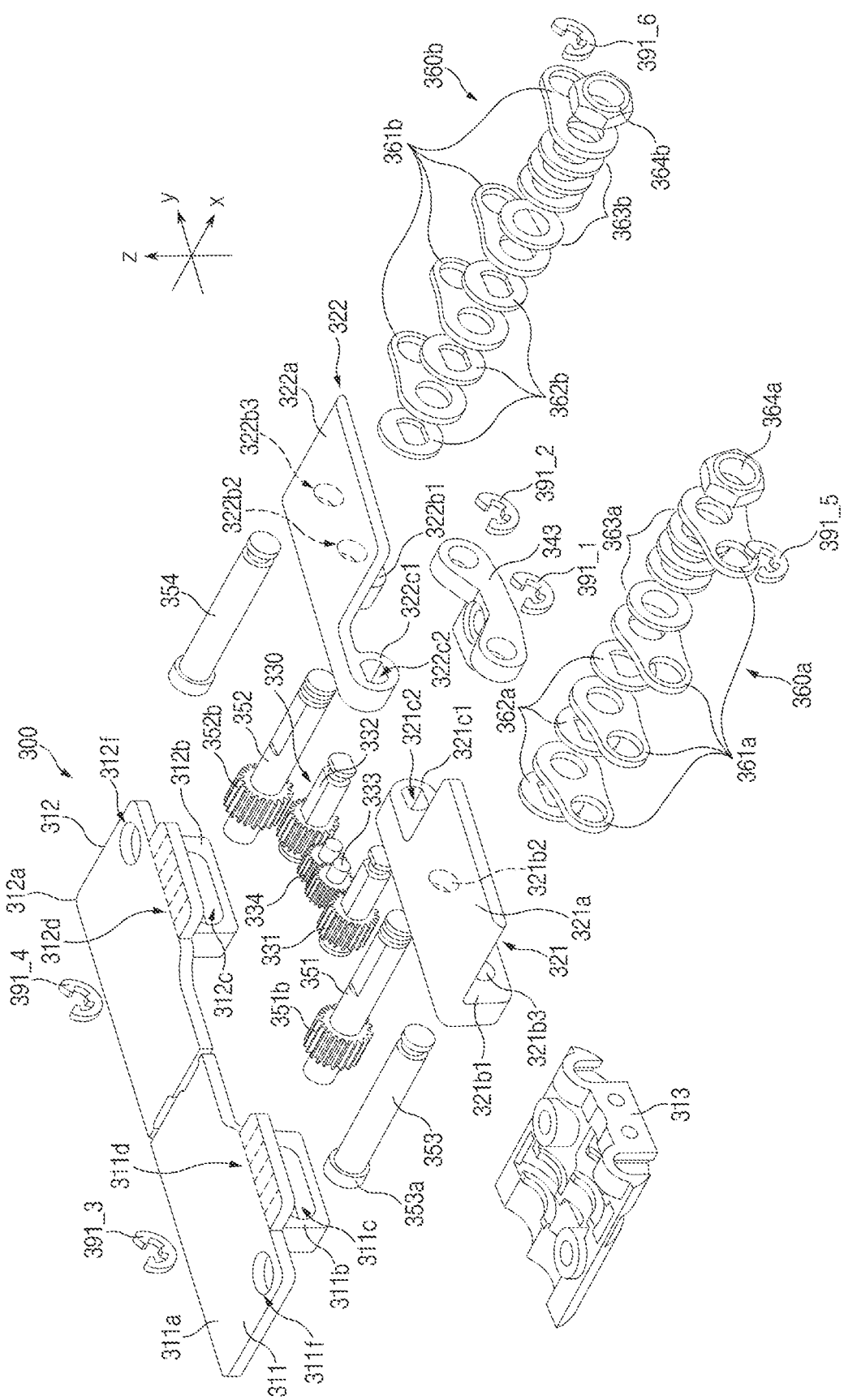
FIG. 13 is an exploded perspective view of a hinge structure according to an embodiment of the disclosure.

FIG. 13 is an exploded perspective view of a hinge structure according to an embodiment of the disclosure.

Referring to FIG. 13, a hinge structure 300 may include a first rotary member 311, a second rotary member 312, a first arm 321, a second arm 322, a hinge assembly (a first torque providing member 360a, a second torque providing member 360b, a first rotary shaft 351, a first fixing shaft 353, a second rotary shaft 352, a second fixing shaft 354, a fixing bracket 313, a gear structure 330, and a gear bracket 343), and fixing means 391_1, 391_2, 391_3, 391_4, 391_5, and 391_6.

At least part of the first rotary member 311 may be coupled with the first housing 110. At least part of the first rotary member 311 may be formed of a metallic material having a specified stiffness or more or a non-metallic material having the specified stiffness or more. The first rotary member 311 may rotate in one direction (e.g., the clockwise or counterclockwise direction) in response to rotation of the first housing 110. The first rotary member 311 may include a first basic body 311a, a first sliding part 311b, a first sliding hole 311c, a first rack gear pattern 311d, and a first rotary rail 311e.

The first basic body 311a may have a constant thickness, and a front surface of the first basic body 311a may have a predetermined size and may be formed to be flat. The first basic body 311a may include at least one hole 311f used to fasten the first basic body 311a with the first housing 110.

The first sliding part 311b may protrude from a rear surface of the first basic body 311a in the −Z-axis direction. The first sliding part 311b may include the first sliding hole 311c. The length of the first sliding hole 311c in the Y-axis direction may be greater than the length of the first sliding hole 311c in the X-axis direction. At least part of the first rotary shaft 351 may be inserted into the first sliding hole 311c. Part (e.g., an edge facing the −X-axis direction) of the first rotary shaft 351 may be moved inside the first sliding hole 311c as the first rotary member 311 rotates.

The first rack gear pattern 311d may be disposed on a protruding part that extends from one side of the first basic body 311a in one direction, for example, the X-axis direction and has a predetermined width. The first rack gear pattern 311d may be disposed in the −Z-axis direction and may be disposed to be engaged with a first fastening pattern 351d formed on the first rotary shaft 351. The first rack gear pattern 311d may be formed to be horizontal in the Y-axis direction.

The first rotary rail 311e may be disposed on the rear surface (e.g., a surface facing the −Z-axis direction) of the first basic body 311a. The first rotary rail 311e may have the same configuration as the first rotary rail 211d described above with reference to FIG. 3, or may have a configuration similar to that of the first rotary rail 211d.

At least part of the second rotary member 312 may be coupled with the second housing 120. According to an embodiment, the second rotary member 312 may have the same shape as the first rotary member 311, or may have a shape similar to that of the first rotary member 311. For example, the second rotary member 312 may include a second basic body 312a, a second sliding part 312b, a second sliding hole 312c, a second rack gear pattern 312d, and a second rotary rail 312e. The second basic body 312a may have the same structure as the first basic body 311a mentioned above, or may have a structure similar to that of the first basic body 311a. For example, the second basic body 312a may include at least one hole 312f used to fasten the second basic body 312a with the second housing 120. The second sliding part 312b may have the same structure as the first sliding part 311b of the first rotary member 311, or may have a structure similar to that of the first sliding part 311b. The second sliding hole 312c may correspond to the first sliding hole 311c of the first rotary member 311, the second rack gear pattern 312d may correspond to the first rack gear pattern 311d of the first rotary member 311, and the second rotary rail 312e may correspond to the first rotary rail 311e of the first rotary member 311.

The first arm 321 may be disposed adjacent to the first rotary member 311 and may rotate in response to rotation of the first rotary member 311. In this operation, the first arm 321 may be fastened with the first rotary member 311 through the first rotary shaft 351. The first torque providing member 360a may be disposed on the first arm 321. In this regard, the first arm 321 may include a first body 321a, a first shaft insertion part 321b1 protruding from the first body 321a in the −Z-axis direction, a first shaft insertion hole 312b2, a second shaft insertion hole 321b3, a first gear fastening part 321c1, and a first gear fastening hole 321c2. A front surface (e.g., a surface facing the Z-axis direction) of the first body 321a may have a predetermined size and may be formed to be flat. When the electronic device 100 is in a folded state or a flat state, the front surface of the first body 321a may be disposed side by side with the front surface of the first basic body 311a of the first rotary member 311. The first arm 321 may have, for example, an inverted L-shaped section in the Z-axis direction.

The first shaft insertion part 321b1 may extend from the first body 321a in the −Z-axis direction. The first shaft insertion hole 321b2 and the second shaft insertion hole 321b3 may be formed in the first shaft insertion part 321b1. At least part of the first rotary shaft 351 may be disposed in the first shaft insertion hole 321b2. In this regard, the first shaft insertion hole 312b2 may have the same diameter as a column of the first rotary shaft 351, or may have a diameter similar to that of the column of the first rotary shaft 351. According to an embodiment, the first shaft insertion hole 321b2 may have a smaller diameter than the first gear pattern 351b disposed on the first rotary shaft 351. At least part (e.g., a second type friction plate 362a) of the first torque providing member 360a may be disposed in the X-axis direction with respect to the first shaft insertion hole 321b2.

At least part of the first fixing shaft 353 may be disposed in the second shaft insertion hole 321b3. In this regard, the second shaft insertion hole 312b3 may have the same diameter as a column of the first fixing shaft 353, or may have a diameter similar to that of the column of the first fixing shaft 353. According to an embodiment, the second shaft insertion hole 321b3 may have a smaller diameter than a head 353a disposed on the first fixing shaft 353. At least part (e.g., a first type friction plate 361a) of the first torque providing member 360a may be disposed in the X-axis direction with respect to the second shaft insertion hole 321b3.

The first gear fastening part 321c1 may extend from one side of the first body 321a in the Y-axis direction. Furthermore, the first gear fastening part 321c1 may protrude in a direction toward a rear surface (e.g., a surface facing the −Z-axis direction) of the first body 321a. The first gear fastening hole 321c2 across the Y-axis may be disposed on one side of the first gear fastening part 321c1.

At least part of a first main gear 331 may be disposed in the first gear fastening hole 321c2. At least part of a section of the first gear fastening hole 321c2 in the Z-axis direction may include a straight portion. Accordingly, when the first main gear 331 inserted into the first gear fastening hole 321*c*2 rotates, the first arm 321 may rotate together.

The second arm 322 may have the same structure as the first arm 321, or may have a structure similar to that of the first arm 321. For example, the second arm 322 may include a second body 322*a*, a second shaft insertion part 322*b*1 protruding from the second body 322*a* in the −Z-axis direction, a third shaft insertion hole 322*b*2, a fourth shaft insertion hole 322*b*3, a second gear fastening part 322*c*1, and a second gear fastening hole 322*c*2. The second body 322*a* may have the same structure as the first body 321*a* of the first arm 321, and the second shaft insertion part 322*b*1 may have the same structure as the first shaft insertion part 321*b*1 of the first arm 321. According to various embodiments, the third shaft insertion hole 322*b*2 and the fourth shaft insertion hole 322*b*3 may correspond to the first shaft insertion hole 321*b*2 and the second shaft insertion hole 321*b*3, and the second gear fastening part 322*c*1 may correspond to the first gear fastening part 321*c*1. The second gear fastening hole 322*c*2 may correspond to the first gear fastening hole 321*c*2 of the first gear fastening part 321*c*1. According to various embodiments, a structure the same as or similar to the structure disposed on the rear surface of the second rotary member 212 described above with reference to FIG. 3 or FIG. 4 may be disposed on a rear surface (e.g., a surface facing the Z-axis direction) of the second arm 322.

The third shaft insertion hole 322*b*2 and the fourth shaft insertion hole 322*b*3 may be formed in the second shaft insertion part 322*b*1. The second rotary shaft 352 may be inserted into the third shaft insertion hole 322*b*2 in the X-axis direction. The second fixing shaft 354 may be inserted into the fourth shaft insertion hole 322*b*3 in the X-axis direction. At least part (e.g., a third type friction plate 361*b*) of the second torque providing member 360*b* may be disposed in the X-axis direction with respect to the fourth shaft insertion hole 322*b*3. At least part (e.g., a fourth type friction plate 362*b*) of the second torque providing member 360*b* may be disposed in the X-axis direction with respect to the third shaft insertion hole 322*b*2.

The second gear fastening part 322*c*1 may extend from one side of the second body 322*a* in the Y-axis direction. Furthermore, the second gear fastening hole 322*c*2 across the Y-axis may be disposed on one side of the second gear fastening part 322*c*1. At least part of a second main gear 332 may be disposed in the second gear fastening hole 322*c*2. At least part of a section of the second gear fastening hole 322*c*2 in the Z-axis direction may include a straight portion. Accordingly, when the second main gear 332 inserted into the second gear fastening hole 322*c*2 rotates, the second arm 322 may rotate together.

The first torque providing member 360*a* may include at least one first type friction plate 361*a* commonly coupled to the first fixing shaft 353 and the first rotary shaft 351, at least one second type friction plate 362*a* mounted on the first rotary shaft 351, a first elastic member 363*a*, and a first fixing part 364*a* (e.g., a nut). The above-described first torque providing member 360*a* may have the same structure as the first torque providing member 260*a* described above with reference to FIG. 3, or may have a structure similar to that of the first torque providing member 260*a*. For example, the first type friction plate 361*a* and the second type friction plate 362*a* may have the same structures as the first type friction plate 261*a* and the second type friction plate 262*a* described above with reference to FIG. 5, or may have structures similar to those of the first type friction plate 261*a* and the second type friction plate 262*a*.

The second torque providing member 360*b* may be disposed to be paired with the first torque providing member 360*a*. In this regard, the second torque providing member 360*b* may have the same structure and configuration as the first torque providing member 360*a*, or may have a structure and configuration similar to that of the first torque providing member 360*a*. For example, the second torque providing member 360*b* may include at least one third type friction plate 361*b* commonly coupled to the second fixing shaft 354 and the second rotary shaft 352, at least one fourth type friction plate 362*b* mounted on the second rotary shaft 352, a second elastic member 363*b*, and a second fixing part 364*b* (e.g., a nut).

The first rotary shaft 351 may be disposed between the first rotary member 311 and the first arm 321 and may rotate the first arm 321 while the first rotary member 311 rotates. The first rotary shaft 351 may have the same structure as the first rotary shaft 251 described above with reference to FIG. 3. The first rotary shaft 351 may be disposed to pass through the first shaft insertion hole 321*b*2 and part (e.g., the first type friction plate 361*a* and the second type friction plate 362*a*) of the first torque providing member 360*a*.

The second rotary shaft 352 may be disposed between the second rotary member 312 and the second arm 322 and may rotate the second arm 322 while the second rotary member 312 rotates. The second rotary shaft 352 may have substantially the same structure as the first rotary shaft 351, or may have a structure similar to that of the first rotary shaft 351. The second rotary shaft 352 may be disposed to pass through the third shaft insertion hole 322*b*2 and part (e.g., the third type friction plate 361*b* and the fourth type friction plate 362*b*) of the second torque providing member 360*b*.

The first fixing shaft 353 may have a cylindrical shape extending in the X-axis direction or the −X-axis direction. For example, at least part of the first fixing shaft 353 may be inserted into the second shaft insertion hole 321*b*3 formed in the first shaft insertion part 321*b*1 of the first arm 321. The first fixing shaft 353 may be disposed to pass through at least part of the first type friction plate 361*a* via the second shaft insertion hole 321*b*3. The first fixing shaft 353 may prevent the first type friction plate 361*a* from rotating in place and moving.

The second fixing shaft 354 may have the same structure as the first fixing shaft 353 described above, and at least part of the second fixing shaft 354 may be disposed in the fourth shaft insertion hole 322*b*3. For example, one side of the third type friction plate 361*b* may be mounted on the second fixing shaft 354. The second fixing shaft 354 may prevent the third type friction plate 361*b* from rotating in place and moving.

The fixing bracket 313 may be fastened with the first rotary member 311 and the second rotary member 312. For example, the fixing bracket 313 may have the same structure as the fixing bracket 213 described above with reference to FIG. 3 and may perform the same role as the fixing bracket 213.

The gear structure 330 may include the first main gear 331, a first idle gear 333, a second idle gear 334, and the second main gear 332. The gear structure 330 may have the same structure as the gear structure 230 described above with reference to FIG. 3.

The gear bracket 343 may serve to fix the first main gear 331 and the second main gear 332. The gear bracket 343 may have the same structure as the gear bracket 243 described above with reference to FIG. 3.

The fixing means 391_1, 391_2, 391_3, 391_4, 391_5, and 391_6 may include at least one E-ring. For example, the fixing means 391_1, 391_2, 391_3, 391_4, 391_5, and 391_6 may include the first fixing means 391_1 that is mounted on one side of the first main gear 331 and that prevents separation of the first main gear 331 from the first arm 321, the second fixing means 391_2 that is mounted on one side of the second main gear 332 and that prevents separation of the second main gear 332 from the second arm 322, the third fixing means 391_3 that is mounted on an edge portion of the first rotary shaft 351 facing the −X-axis direction and that prevents separation of the first rotary shaft 351 from the first sliding hole 311c of the first rotary member 311, the fourth fixing means 391_4 that is mounted on an edge portion of the second rotary shaft 352 facing the −X-axis direction and that prevents separation of the second rotary shaft 352 from the second sliding hole 312c of the second rotary member 312, the fifth fixing means 391_5 that prevents separation of the first fixing shaft 353 from the first arm 321, and the sixth fixing means 391_6 that prevents separation of the second fixing shaft 354 from the second arm 322.

The hinge structure 300 of the disclosure having the above-described structure may have the structure in which the first rotary member 311 is fastened with the first arm 321 through the first rotary shaft 351 and the first fixing shaft 353 and may have the structure in which the first gear pattern 351b of the first rotary shaft 351 is disposed to be engaged with the first rack gear pattern 311d formed on the first rotary member 311. Furthermore, the first torque providing member 360a may be disposed on the first arm 321. Similarly, the hinge structure 300 may have the structure in which the second rotary member 312 is fastened with the second arm 322 through the second rotary shaft 352 and the second fixing shaft 354 and may have the structure in which the second gear pattern 352b of the second rotary shaft 352 is disposed to be engaged with the second rack gear pattern 312d formed on the second rotary member 312. Furthermore, the second torque providing member 360b may be disposed on the second arm 322.

Figure 14:
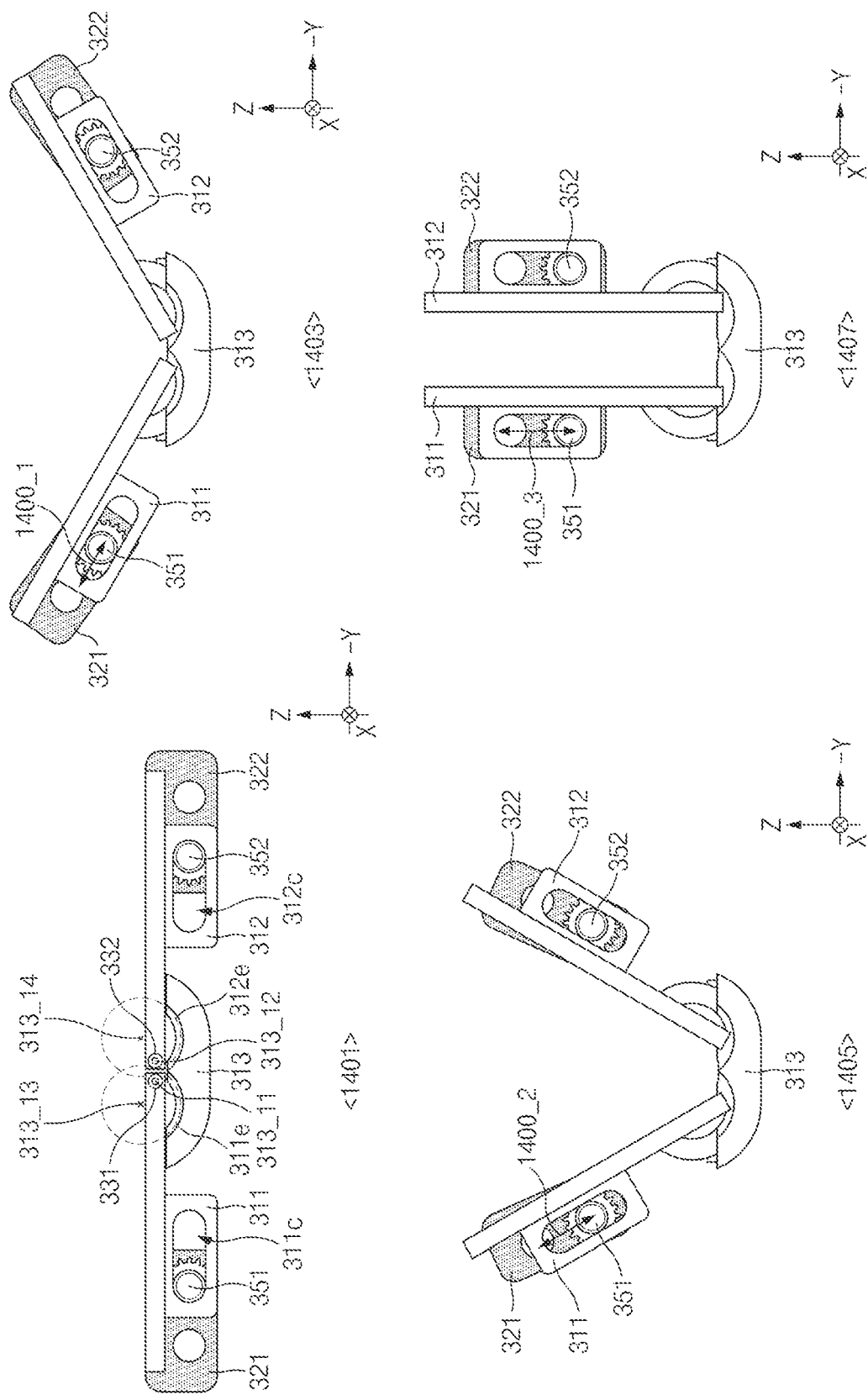
FIG. 14 is a view illustrating examples of a mounting angle of an electronic device having a hinge structure according to an embodiment of the disclosure.

FIG. 14 is a view illustrating examples of a mounting angle of an electronic device having a hinge structure according to an embodiment of the disclosure.

Referring to FIGS. 13 and 14, as in state 1401, at least a part of the components of an electronic device 100, for example, a hinge structure 300 may have a flat state (or, an open state). In this regard, the first rotary member 311 and the second rotary member 312 may be disposed parallel to each other on the Y-axis and the −Y-axis. Similarly, the first arm 321 and the second arm 322 may be disposed parallel to each other on the Y-axis and the −Y-axis. The first rotary member 311 may rotate in the clockwise or counterclockwise direction about a center point 313_13 of the first rotary rail 311e. The second rotary member 312 may rotate in the clockwise or counterclockwise direction about a center point 313_14 of the second rotary rail 312e. The first arm 321 may rotate in the clockwise or counterclockwise direction about a center point 313_11 of the first main gear 331. The second arm 322 may rotate in the clockwise or counterclockwise direction about a center point 313_12 of the second main gear 332. When the hinge structure 300 is in the flat state, the first rotary shaft 351 coupled to the first arm 321 may be disposed to be biased in a direction away from a central portion of the hinge structure 300 inside the first sliding hole 311c, and the second rotary shaft 352 coupled to the second arm 322 may be disposed to be biased in a direction away from the central portion of the hinge structure 300 inside the second sliding hole 312c.

As in state 1403, at least a part of the components of the electronic device 100, for example, the hinge structure 300 may have a first partially folded state of being folded by a first angle in the Z-axis direction with respect to a horizontal state. Because the central axes of rotation of the first rotary member 311 and the first arm 321 differ from each other (e.g., the central axis of the first rotary member 311 being formed in a higher position in the Z-axis direction than the central axis of the first arm 321 as described above with reference to FIG. 6), as illustrated, in the first partially folded state, the amount of rotation of the first rotary member 311 and the amount of rotation of the first arm 321 may differ from each other even though components (e.g., the first housing 110 and the second housing 120) of the electronic device 100 move the same distance. Similarly, in the first partially folded state, the amount of rotation of the second rotary member 312 may differ from the amount of rotation of the second arm 322. In the first partially folded state, the first rotary shaft 351 may move a first distance 1400_1 in the −Y-axis direction (or, in a direction toward the central portion of the hinge structure 300 or the fixing bracket 313) inside the first sliding hole 311c. In the first partially folded state, the second rotary shaft 352 may move the first distance 1400_1 in the Y-axis direction (or, in a direction toward the central portion of the hinge structure 300 or the fixing bracket 313) inside the second sliding hole 312c.

As in state 1405, at least a part of the components of the electronic device 100, for example, the hinge structure 300 may have a second partially folded state of being folded by a second angle in the Z-axis direction with respect to the horizontal state. In the second partially folded state, the first rotary shaft 351 fastened to the first arm 321 may move a second distance 1400_2 (e.g., a distance greater than the first distance 1400_1 in the direction toward the fixing bracket 313) in the direction toward the central portion of the hinge structure 300 (or, the fixing bracket 313) inside the first sliding hole 311c. In the second partially folded state, the second rotary shaft 352 fastened to the second arm 322 may move the second distance 1400_2 (e.g., a distance greater than the first distance 1400_1 in the direction toward the fixing bracket 313) in the direction toward the central portion of the hinge structure 300 (or, the fixing bracket 313) inside the second sliding hole 312c.

As in state 1407, at least a part of the components of the electronic device 100, for example, the hinge structure 300 may have a folded state in the Z-axis direction with respect to the horizontal state. The folded state may include a state in which at least part of the first rotary member 311 and at least part of the second rotary member 312 face each other. The first rotary shaft 351 fastened to the first arm 321 may move a third distance 1400_3 (e.g., a distance greater than the second distance 1400_2 in the −Z-axis direction (or, the direction toward the fixing bracket 313)) toward an edge facing the −Z-axis direction inside the first sliding hole 311c. The second rotary shaft 352 fastened to the second arm 322 may move the third distance 1400_3 (e.g., a distance greater than the second distance 1400_2 in the −Z-axis direction (or, the direction toward the fixing bracket 313)) toward an edge facing the −Z-axis direction inside the second sliding hole 312c. Alternatively, the first rotary shaft 351 may be located at the edge of the first sliding hole 311c that faces the −Z-axis direction, and the second rotary shaft 352 may be located at the edge of the second sliding hole 312c that faces the −Z-axis direction.

Although the hinge structure 300 has been described as having the four states, the disclosure is not limited thereto.

For example, the hinge structure 300 may have states of being partially folded with various angles between the flat state and the folded state.

In the above-described structure of FIG. 13, when the rotary members 311 and 312 rotate, the rotary shafts 351 and 352 fixed to the arms 321 and 322 may be passively rotated along the rack gear patterns 311d and 312d of the rotary members 311 and 312 while performing sliding motion, thereby generating friction of the friction plates 361a, 362a, 361b, and 362b disposed on the arms 321 and 322. In the case of FIG. 3 described above, the rack gear patterns (e.g., the arm gear patterns 221d and 222d) of the arms 221 and 222 may actively rotate the rotary shafts 251 and 252 fixed to the rotary members 211 and 212 while performing sliding motion relative to the rotary shafts 251 and 252, thereby generating friction of the friction plates 261a, 262a, 261b, and 262b disposed on the rotary members 211 and 212.

Figure 15:
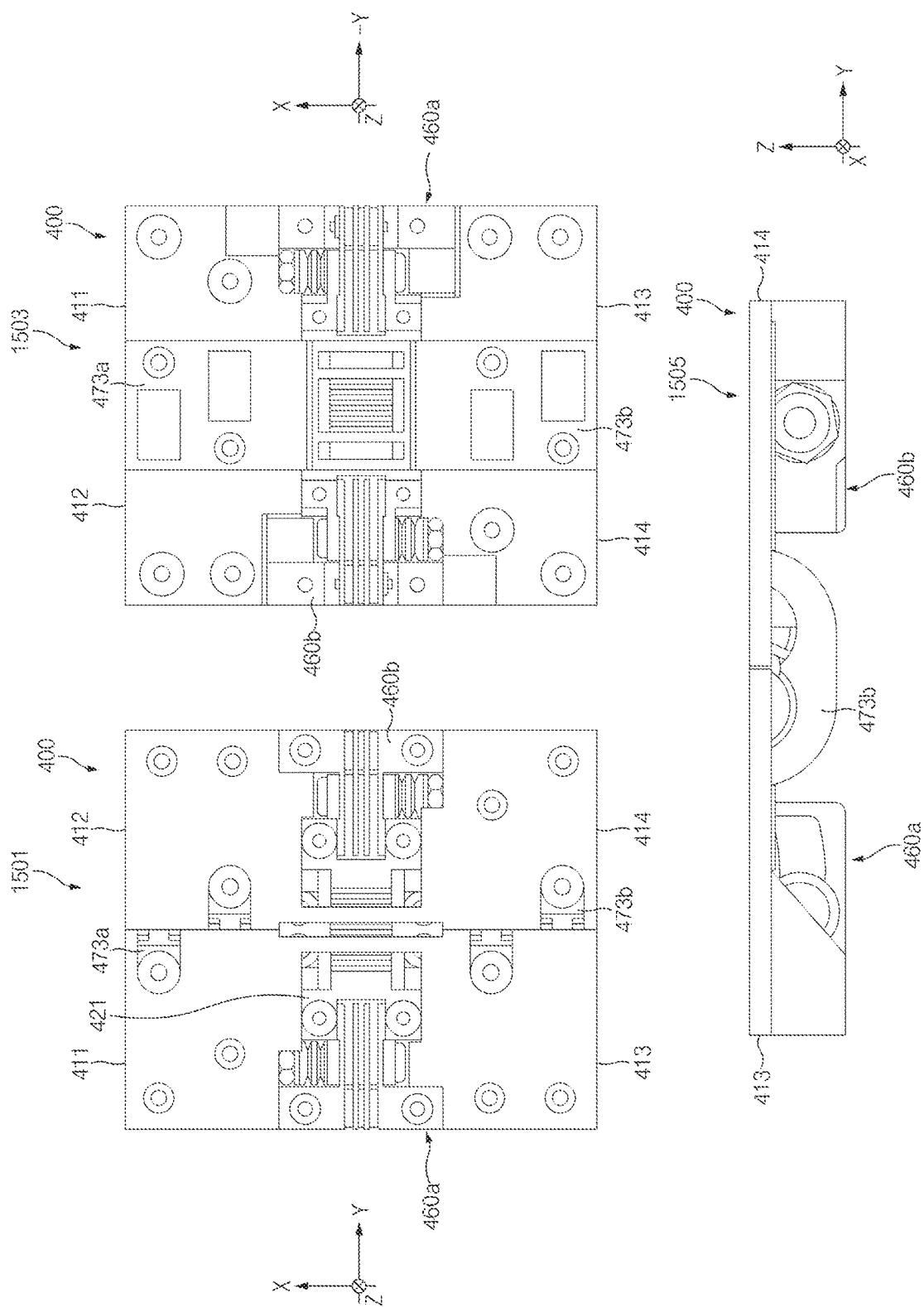
FIG. 15 is a view illustrating a hinge structure according to an embodiment of the disclosure.

FIG. 15 is a view illustrating a hinge structure according to an embodiment of the disclosure.

Figure 16:
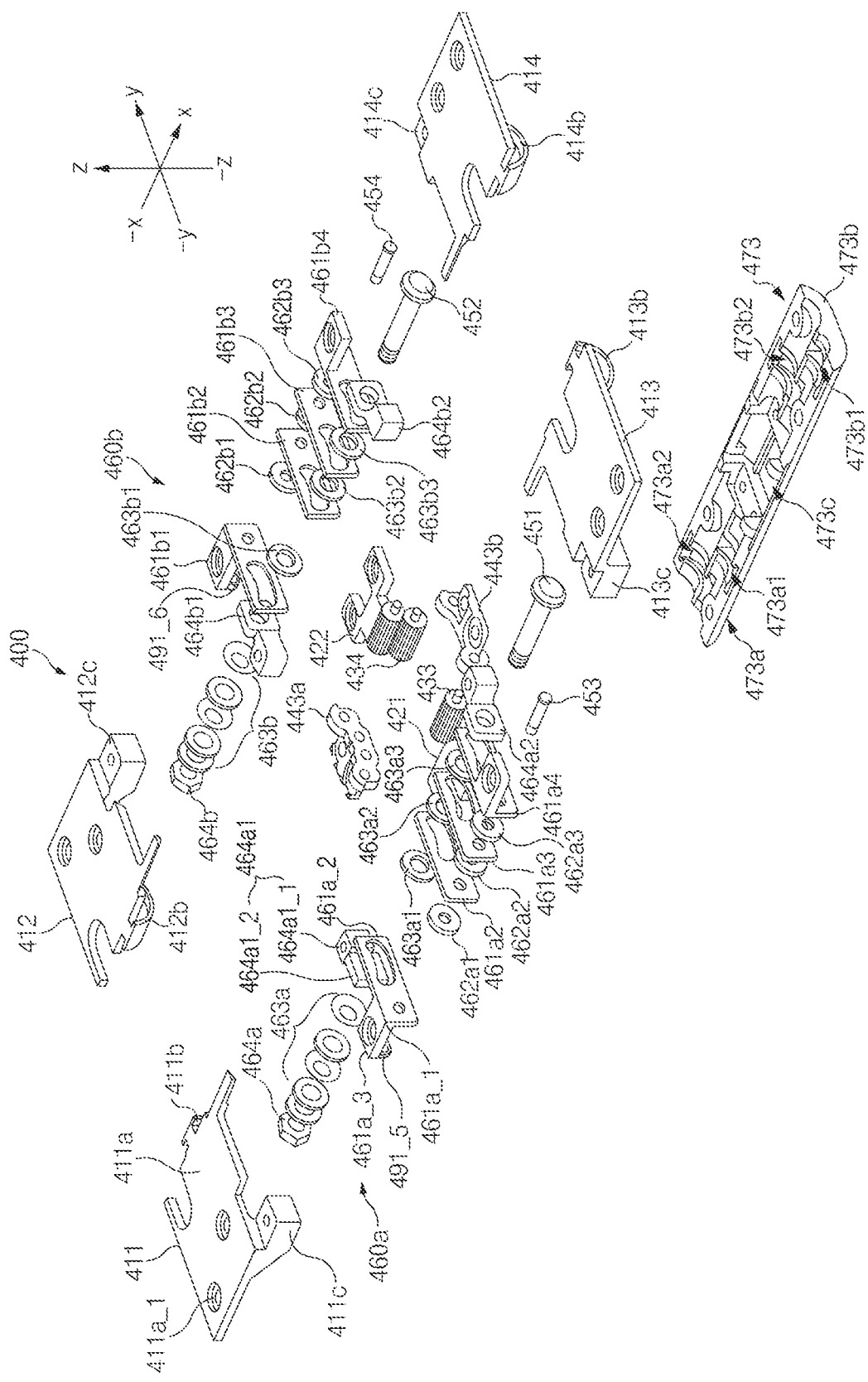
FIG. 16 is an exploded perspective view of a hinge structure according to an embodiment of the disclosure.

FIG. 16 is an exploded perspective view of a hinge structure according to an embodiment of the disclosure.

Figure 17:
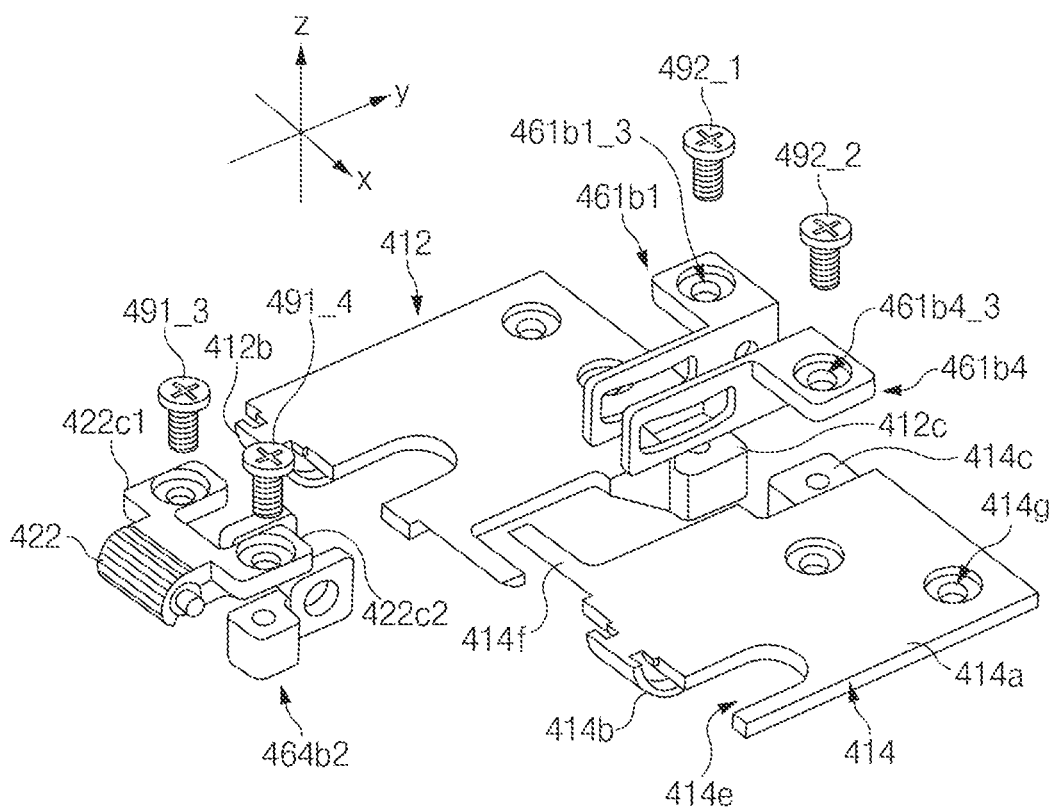
FIG. 17 is a view illustrating some components of a hinge structure according to an embodiment of the disclosure.

FIG. 17 is a view illustrating some components of a hinge structure according to an embodiment of the disclosure.

In FIG. 15, 1501 is a view illustrating a front side of the hinge structure 400, 1503 is a view illustrating a rear side of the hinge structure 400, and 1505 is a view illustrating a lateral side of the hinge structure 400.

Referring to FIGS. 15 to 17, a hinge structure 400 according to various embodiments may include a first rotary member 411, a second rotary member 412, a third rotary member 413, a fourth rotary member 414, a first arm 421, a second arm 422, a first torque providing member 460a, a second torque providing member 460b, a first rotary shaft 451, a first fixing shaft 453, a second rotary shaft 452, a second fixing shaft 454, a fixing bracket 473, a gear structure 433 and 434, gear brackets 443a and 443b, and mixing means 491_3, 491_4, 492_1, and 492_2.

At least part of the first rotary member 411 may be coupled with the first housing 110. At least part of the first rotary member 411 may be formed of a metallic material having a specified stiffness or more or a non-metallic material having the specified stiffness or more. The first rotary member 411 may rotate in one direction (e.g., the clockwise or counterclockwise direction) in response to rotation of the first housing 110. The first rotary member 411 may include a first rotary rail 411b disposed in the −Z-axis direction with respect to a basic body 411a having a flat surface facing the Z-axis direction and a first coupling part 411c coupled with one side of the first torque providing member 460a. The basic body 411a may have at least one hole 411a_1 formed through the basic body 411a in the Z-axis direction and the −Z-axis direction, and the hole 411a_1 may be used to couple the first housing 110 and the first rotary member 411. The first coupling part 411c may be formed in a lower position than an upper surface of the basic body 411a in the −Z-axis direction and may include a recess or a hole that is open in the Z-axis direction for a coupling by a fixing means.

The second rotary member 412 may be formed to be substantially the same as or similar to the first rotary member 411. For example, the second rotary member 412 may include a basic body having a flat upper surface (e.g., a surface facing the Z-axis direction), a second rotary rail 412b disposed on one side of the basic body, and a second coupling part 412c coupled with one side of the second torque providing member 460b. The second rotary member 412 may be disposed to be symmetric to the first rotary member 411 with respect to the X-axis. The second rotary member 412 may be coupled with the second housing 120. The second rotary rail 412b may be disposed to face the first rotary rail 411b. The second rotary rail 412b may be disposed side by side with the first rotary rail 411b on the Y-axis.

At least part of the third rotary member 413 may be coupled with the first housing 110. The third rotary member 413 may be formed to be similar to the first rotary member 411. The third rotary member 413 may be disposed to be symmetric to the first rotary member 411 with respect to the Y-axis. The third rotary member 413 may include a basic body having a flat surface facing the Z-axis direction, a third rotary rail 413b disposed in the −Z-axis direction with respect to the basic body, and a third coupling part 413c coupled with one side of the first torque providing member 460a. The third coupling part 413c may be disposed to face the first coupling part 411c with respect to the X-axis.

The fourth rotary member 414 may be formed to be substantially the same as or similar to the first rotary member 411. Referring to FIG. 17, the fourth rotary member 414 may include a basic body 414a having a flat upper surface (e.g., a surface facing the Z-axis direction), a fourth rotary rail 414b disposed on one side of the basic body 414a, and a fourth coupling part 414c coupled with an opposite side of the second torque providing member 460b. The basic body 414a may have at least one connecting hole 414g formed through the basic body 414a in the Z-axis direction and the −Z-axis direction, and the at least one connecting hole 414g may be used to couple the second housing 120 and the fourth rotary member 414. The basic body 414a may include a recess 414e in which a fixing means for fixing a fixing bracket (e.g., the second gear bracket 443b) disposed under the basic body 414a (e.g., in the −Z-axis direction) to the hinge housing 150 is disposed. The basic body 414a may include a prevention step 414f that extends in the −X-axis direction and that prevents separation of part (e.g., the idle gear 434) of the gear structure in the Z-axis direction. The above-described structure of the fourth rotary member 414 may be identically applied to the structures of the remaining rotary members. The fourth rotary member 414 may be disposed to be symmetric to the third rotary member 413 with respect to the X-axis and may be disposed to be symmetric to the second rotary member 412 with respect to the Y-axis. The fourth rotary member 414 may be coupled with the second housing 120. The fourth rotary rail 414b may be disposed to face the third rotary rail 413b. The fourth rotary rail 414b may be disposed side by side with the third rotary rail 413b on the Y-axis.

The first arm 421 may be coupled with the first torque providing member 460a and may be fastened with the second arm 422 through the gear structure 433 and 434. The second arm 422 may have the same structure as the first arm 421. For example, the second arm 422 may include a body 422c1 formed in the shape of "Y", fixing holes 422c2 to which fixing means (e.g., 491_3 and 491_4) provided on one side of the body 422c1 are fastened, and a main gear patter 422c3 provided on one side of the body 422c1. The fixing holes 422c2 may be disposed to face a direction from the −Y-axis to the Y-axis and may be fastened with friction-plate fixing members 464b1 and 464b2 of the second torque providing member 460b. The main gear pattern 422c3 may be disposed to face toward a main gear pattern of the first arm 421. The main gear pattern 422c3 may be engaged with, for example, the second idle gear 434.

The first torque providing member 460a may include a first friction-plate fixing member 464a1, a second friction-plate fixing member 464a2, one or more fifth type friction plates 461 including fifth type friction plates 461*a*1, 461*a*2, 461*a*3, and 461*a*4 to which the first fixing shaft 453 and the first rotary shaft 451 are commonly coupled, one or more sixth type friction plates 463*a*1, 463*a*2, and 463*a*3 mounted on the first rotary shaft 451, a first elastic member 463*a*, and a first fixing part 464*a* (e.g., a nut).

The first friction-plate fixing member 464*a*1 may include a first friction-plate fixing part 464*a*1_1 including a hole coupled with the first arm 421 through a fixing means (e.g., a screw) and a second friction-plate fixing part 464*a*1_2 including a hole into which the first rotary shaft 451 is inserted. The hole formed in the first friction-plate fixing part 464*a*1_1 may be open in the Z-axis direction, and the hole formed in the second friction-plate fixing part 464*a*1_2 may be open in the X-axis direction. Alternatively, the first friction-plate fixing part 464*a*1_1 and the second friction-plate fixing part 464*a*1_2 may be continuous (or, connected) with each other and may be disposed to be perpendicular to each other. The second friction-plate fixing member 464*a*2 may have the same structure as the first friction-plate fixing member 464*a*1. The fifth type friction plates 461*a*1, 461*a*2, 461*a*3, and 461*a*4 and the sixth type friction plates 463*a*1, 463*a*2, and 463*a*3 may be alternately disposed between the first friction-plate fixing member 464*a*1 and the second friction-plate fixing member 464*a*2.

The fifth type friction plates 461*a*1, 461*a*2, 461*a*3, and 461*a*4 may include, for example, friction plate 461*a*1 disposed adjacent to the first rotary member 411, friction plate 461*a*4 disposed adjacent to the third rotary member 413, and friction plate 461*a*2 and friction plate 461*a*3 disposed between friction plate 461*a*1 and friction plate 461*a*4. Friction plate 461*a*1 may include, for example, a base plate 461*a*_1 that has a predetermined thickness and that is disposed in the Z-axis direction and disposed to face another friction plate (e.g., friction plate 461*a*2) adjacent thereto, a sliding hole 461*a*_2 having a predetermined length in the Y-axis direction from the base plate 461*a*_1 and having a section, at least part of which has a curve, and a coupling part 461*a*_3 used to couple the first rotary member 411 with the first coupling part 411*c*. Additionally, the base plate 461*a*_1 of friction plate 461*a*1 may include a pin hole through which the first fixing shaft 453 passes. The sliding hole 461*a*_2 may move as the first rotary member 411 rotates. As at least part of a travel path of the first rotary shaft 451 includes a curved path in response to the rotation of the first rotary member 411, at least part of the sliding hole 461*a*_2 may include a curved path. For example, friction plate 461*a*4 may have the same structure as friction plate 461*a*1 with respect to the Y-axis. Friction plate 461*a*2 and friction plate 461*a*3 may have the same shape as the base plate 461*a*_1 of friction plate 461*a*1.

The sixth type friction plates 463*a*1, 463*a*2, and 463*a*3 may have, for example, a ring shape. The sixth type friction plates 463*a*1, 463*a*2, and 463*a*3 may have, in the center thereof, a hole that is open in the X-axis direction and in which the first rotary shaft 451 is disposed. The sixth type friction plates 463*a*1, 463*a*2, and 463*a*3 may be disposed to alternate with the fifth type friction plates 461*a*1, 461*a*2, 461*a*3, and 461*a*4. The sixth type friction plates 463*a*1, 463*a*2, and 463*a*3 may generate a previously designed frictional force by making surface-to-surface contact with the fifth type friction plates 461*a*1, 461*a*2, 461*a*3, and 461*a*4 while the fifth type friction plates 461*a*1, 461*a*2, 461*a*3, and 461*a*4 move.

First washer rings 462*a*1, 462*a*2, and 462*a*3 may be fixed by the first fixing shaft 453 and may be disposed to alternate with the fifth type friction plates 461*a*1, 461*a*2, 461*a*3, and 461*a*4. The first washer rings 462*a*1, 462*a*2, and 462*a*3 may be disposed side by side with the sixth type friction plates 463*a*1, 463*a*2, and 463*a*3 on the Y-axis. For example, the first washer rings 462*a*1, 462*a*2, and 462*a*3 may have a thickness that is the same as or similar to the thickness of the sixth type friction plates 463*a*1, 463*a*2, and 463*a*3. The first washer rings 462*a*1, 462*a*2, and 462*a*3 may serve to fill spaces between the fifth type friction plates 461*a*1, 461*a*2, 461*a*3, and 461*a*4 that are generated depending on the arrangement of the sixth type friction plates 463*a*1, 463*a*2, and 463*a*3.

The first fixing shaft 453 may serve to couple the fifth type friction plates 461*a*1, 461*a*2, 461*a*3, and 461*a*4. In this regard, the first fixing shaft 453 may be disposed in holes of the fifth type friction plates 461*a*1, 461*a*2, 461*a*3, and 461*a*4 and the first washer rings 462*a*1, 462*a*2, and 462*a*3. A fixing means 491_5 may be coupled to one side of the first fixing shaft 453 to prevent separation of the first fixing shaft 453 from the fifth type friction plates 461*a*1, 461*a*2, 461*a*3, and 461*a*4 and the first washer rings 462*a*1, 462*a*2, and 462*a*3.

The first rotary shaft 451 may serve to couple and fix the sixth type friction plates 463*a*1, 463*a*2, and 463*a*3. At least part of the first rotary shaft 451 may be located in the sliding holes 461*a*_2 of the fifth type friction plates 461*a*1, 461*a*2, 461*a*3, and 461*a*4. According to various embodiments, the first rotary shaft 451 may be disposed to pass through the first friction-plate fixing member 464*a*1 and the second friction-plate fixing member 464*a*2 and may be disposed to pass through the fifth type friction plates 461*a*1, 461*a*2, 461*a*3, and 461*a*4 and the sixth type friction plates 463*a*1, 463*a*2, and 463*a*3 disposed between the first friction-plate fixing member 464*a*1 and the second friction-plate fixing member 464*a*2. The first rotary shaft 451 may be formed to be thicker than the first fixing shaft 453. A fastening pattern (e.g., a bolt pattern) may be formed on an end portion of the first rotary shaft 451 that faces the −X-axis direction, and the end portion of the first rotary shaft 451 may be coupled with the first fixing part 464*a*. As the first elastic member 463*a* is disposed between the first fixing part 464*a* and the fifth type friction plates 461*a*1, 461*a*2, 461*a*3, and 461*a*4, the first rotary shaft 451 may be coupled with the first elastic member 463*a*.

The first elastic member 463*a* may include at least one plate spring having a hole formed in a central portion thereof and having a dome shape. According to an embodiment, the first elastic member 463*a* may include a plurality of plate springs. The first elastic member 463*a* may be mounted on the first rotary shaft 451.

The second torque providing member 460*b* may be disposed to be paired with the first torque providing member 460*a*. In this regard, the second torque providing member 460*b* may have the same structure and configuration as the first torque providing member 460*a*, or may have a structure and configuration similar to that of the first torque providing member 460*a*. For example, the second torque providing member 460*b* may include one or more seventh type friction plates 461*b*1, 461*b*2, 461*b*3, and 461*b*4 commonly coupled to the second fixing shaft 454 and the second rotary shaft 452, one or more eighth type friction plates 463*b* may include 463*b*1, 463*b*2, and 463*b*3 mounted on the second rotary shaft 452, a second elastic member 463*b*, and a second fixing part 464*b* (e.g., a nut).

Similarly to the fifth type friction plates 461*a*1, 461*a*2, 461*a*3, and 461*a*4, the seventh type friction plates 461*b*1, 461*b*2, 461*b*3, and 461*b*4 may include friction plate 461*b*1, friction plate 461*b*2, friction plate 461*b*3, and friction plate 461*b*4. Friction plate 461*b*1 or friction plate 461*b*4 may have the same structure as friction plate 461a1 described above, or may have a structure similar to that of friction plate 461a1. Referring to FIG. 17, friction plate 461b1 may include, for example, a coupling part 461b1_3 used to couple the second rotary member 412 with the second coupling part 412c, and friction plate 461b4 may include, for example, a coupling part 461b4_3 used to couple the fourth rotary member 414 with the fourth coupling part 414c. The first fixing means 492_1 may be fastened to the coupling part 461b1_3 to couple friction plate 461b1 to the second coupling part 412c, and the second fixing means 492_2 may be fastened to the coupling part 461b4_3 to couple friction plate 461b4 to the fourth coupling part 414c.

The eighth type friction plates 463b1, 463b2, and 463b3 may have the same structure as the sixth type friction plates 463a1, 463a2, and 463a3 described above, or may have a structure similar to that of the sixth type friction plates 463a1, 463a2, and 463a3. The eighth type friction plates 463b1, 463b2, and 463b3 may be disposed to alternate with the seventh type friction plates 461b1, 461b2, 461b3, and 461b4. Second washer rings 462b1, 462b2, and 462b3 may have the same structure as the first washer rings 462a1, 462a2, and 462a3, or may have a structure similar to that of the first washer rings 462a1, 462a2, and 462a3. The second washer rings 462b1, 462b2, and 462b3 may be disposed side by side with the eighth type friction plates 463b1, 463b2, and 463b3 on the Y-axis.

The second fixing shaft 454 may have the same structure as the first fixing shaft 453 and may perform the same role as the first fixing shaft 453 in the second torque providing member 460b. The second rotary shaft 452 may have the same structure as the first rotary shaft 451 and may perform the same role as the first rotary shaft 451 in the second torque providing member 460b. A fixing means 491_6 may be coupled to one side of the second fixing shaft 454.

The fixing bracket 473 may be coupled with the first rotary member 411, the second rotary member 412, the third rotary member 413, and the fourth rotary member 414. In this regard, the fixing bracket 473 may include a first bracket part 473a to which the first rotary member 411 and the second rotary member 412 are coupled, a second bracket part 473b to which the third rotary member 413 and the fourth rotary member 414 are coupled, and an arm seating recess 473c in which at least part of the gear structure 433 and 434 is seated. According to an embodiment, the first bracket part 473a of the fixing bracket 473 may include a first rail coupling groove (or, hole) 473a1 to which the first rotary member 411 is coupled and a second rail coupling groove (or, hole) 473a2 to which the second rotary member 412 is coupled. The second bracket part 473b of the fixing bracket 473 may include a third rail coupling groove (or, hole) 473b1 to which the third rotary member 413 is coupled and a fourth rail coupling groove (or, hole) 473b2 to which the fourth rotary member 414 is coupled. The first rail coupling groove 473a1 and the second rail coupling groove 473a2 may be spaced apart from each other by a predetermined distance with respect to the arm seating recess 473c. The arm seating recess 473c may include seating spaces in which the gear brackets 443a and 443b used to fix the first arm 421 and the second arm 422 are seated. Recesses to which the gear brackets 443a and 443b are coupled may be disposed in the arm seating recess 473c that forms the seating spaces.

The gear structure 433 and 434 may include the first idle gear 433 and the second idle gear 434. The first idle gear 433 may be disposed between the main gear pattern of the first arm 421 and the second idle gear 434, and the second idle gear 434 may be disposed between the main gear pattern of the second arm 422 and the first idle gear 433. At least part of the gear structure 433 and 434 may be seated in the arm seating recess 473c of the fixing bracket 473.

The gear brackets 443a and 443b may include the first gear bracket 443a fastened with edges of the main gear pattern of the first arm 421, the first idle gear 433, the second idle gear 434, and the main gear pattern of the second arm 422 that face the −X-axis direction, and the second gear bracket 443b fastened with edges of the main gear pattern of the first arm 421, the first idle gear 433, the second idle gear 434, and the main gear pattern of the second arm 422 that face the X-axis direction. In this regard, the first gear bracket 443a and the second gear bracket 443b may include recesses that are coupled with the edges of the main gear patterns or the idle gears that face the X-axis direction or the edges of the main gear patterns or the idle gears that face the −X-axis direction. Furthermore, the first gear bracket 443a and the second gear bracket 443b may include a fastening structure fastened with the fixing bracket 473. The above-described gear brackets 443 and 443b may prevent separation of the first arm 421, the second arm 422, and the idle gears 433 and 434 in a specific direction while supporting rotation of the first arm 421, the second arm 422, and the idle gears 433 and 434.

The fixing means 491_3, 491_4, 492_1, and 492_2 may include at least one screw. The fixing means 491_3, 491_4, 492_1, and 492_2 may fix the rotary members 411, 412, 413, and 414 and the torque providing members 460a and 460b. Furthermore, the fixing means 491_3, 491_4, 492_1, and 492_2 may fix the gear brackets 443a and 443b to the fixing bracket 473.

In the hinge structure 400 of the disclosure having the above-described structure, the first arm 421 and the second arm 422 may be connected by the gear coupling and may operate in conjunction with each other. The first torque providing member 460a may be fastened to the first rotary member 411, the third rotary member 413, and the first arm 421, and the second torque providing member 460b may be fastened to the second rotary member 412, the fourth rotary member 414, and the second arm 422. Depending on rotation of the first rotary member 411 and the third rotary member 413 (or, rotation of the second rotary member 412 and the fourth rotary member 414), friction may be generated between the fifth type friction plates 461a1, 461a2, 461a3, and 461a4 and the sixth type friction plates 463a1, 463a2, and 463a3 of the first torque providing member 460a (or, between the seventh type friction plates 461b1, 461b2, 461b3, and 461b4 and the eighth type friction plates 463b1, 463b2, and 463b3 of the second torque providing member 460b). The first elastic member 463a may exert an elastic force to increase the contact strength between the fifth type friction plates 461a1, 461a2, 461a3, and 461a4 and the sixth type friction plates 463a1, 463a2, and 463a3, and the second elastic member 463b may exert an elastic force to increase the contact strength between the seventh type friction plates 461b1, 461b2, 461b3, and 461b4 and the eighth type friction plates 463b1, 463b2, and 463b3. Accordingly, a higher frictional force may be provided, and thus various angles of the hinge structure 400 may be more stably provided.

Figure 18:
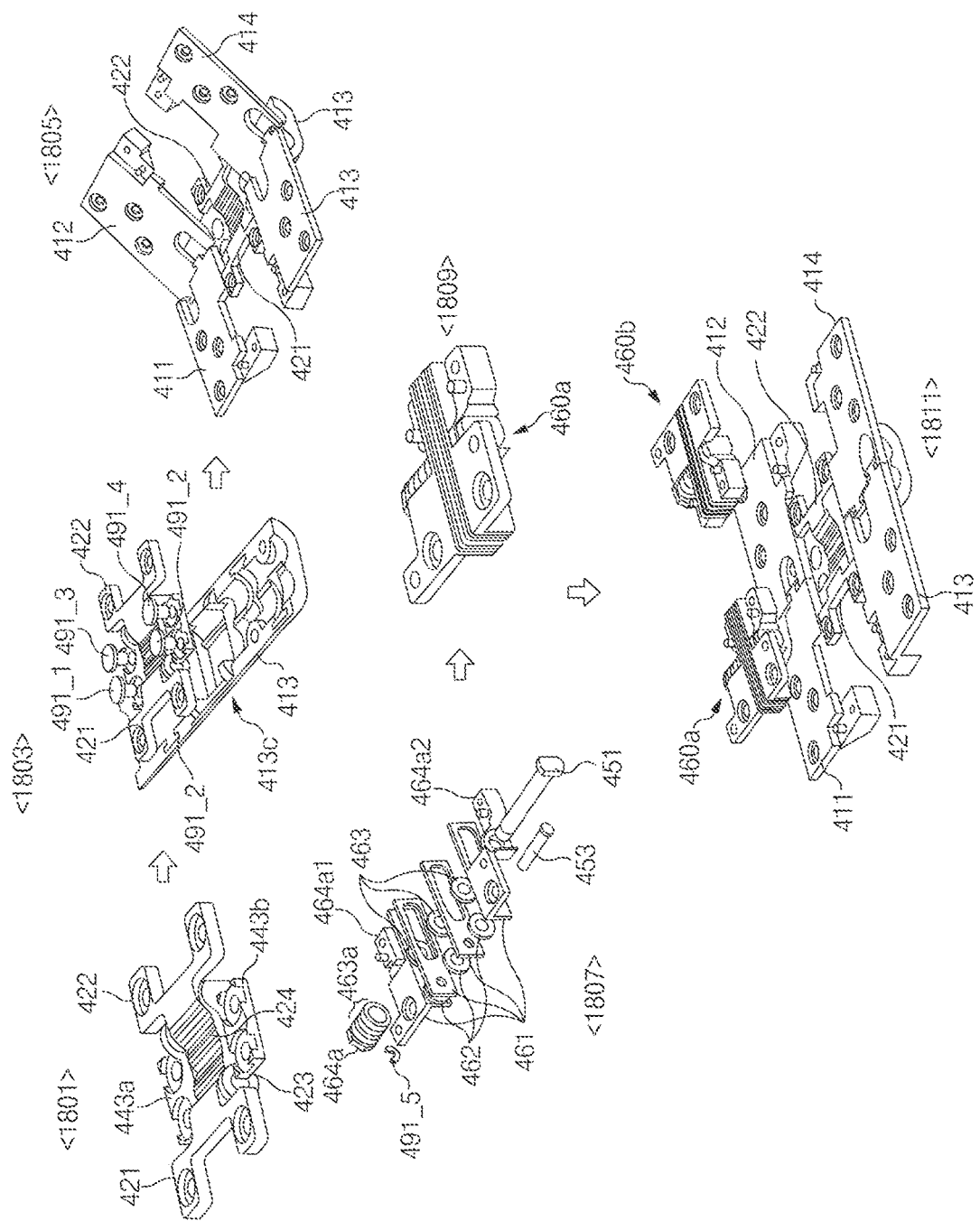
FIG. 18 is a view illustrating one example of a hinge operation process of a hinge structure according to an embodiment of the disclosure.

FIG. 18 is a view illustrating one example of a hinge operation process of a hinge structure according to an embodiment of the disclosure.

Referring to FIGS. 15 to 18, as in state 1801 to 1811, a first arm 421 may be coupled to one side of a fixing bracket 473. Furthermore, the third rotary member 413 (or, the first rotary member 411) may be coupled to one side of the first arm 421. The first arm 421 may be fastened with the second arm 422 through the first gear bracket 443a and the second gear bracket 443b. The first arm 421 may be coupled with the second friction-plate fixing member 461a2. The first rotary shaft 451 may be inserted into the second friction-plate fixing member 464a2. As described above, at least one friction plate (e.g., the fifth type friction plates 461 and the sixth type friction plates 463a) may be fixed between the first friction-plate fixing member 464a1 and the second friction-plate fixing member 464a2 through the first rotary shaft 451. Furthermore, one side of each of the fifth type friction plates 461 may be fixed by the first fixing shaft 453. The first elastic member 463a and the first fixing part 464a may be coupled to the first rotary shaft 451. As illustrated, the hinge structure 400 may have a flat state, for example, a state in which the upper surfaces of the first arm 421, the first rotary member 411, and the second rotary member 412 have the same height with respect to the Z-axis.

When the first housing 110 coupled to the first rotary member 411 and the third rotary member 413 rotates in the clockwise direction (or, when the second housing 120 coupled to the second rotary member 412 and the fourth rotary member 414 rotates in the clockwise direction), as in state 1805, the third rotary member 413 may rotate in the clockwise direction by a predetermined angle. In response to this operation, the first arm 421 fastened to the fixing bracket 473 may also rotate by the predetermined angle. While the first arm 421 rotates, the fifth type friction plates 461 fixed to the first fixing shaft 453 may slide in one direction (e.g., a direction away from the fixing bracket 473) with respect to the first rotary shaft 451. When the fifth type friction plates 461a1, 461a2, 461a3, and 461a4 slide, the sixth type friction plates 463a1, 463a2, and 463a3 fixed to the first rotary shaft 451 may generate friction with the fifth type friction plates 461a1, 461a2, 461a3, and 461a4.

Figure 19:
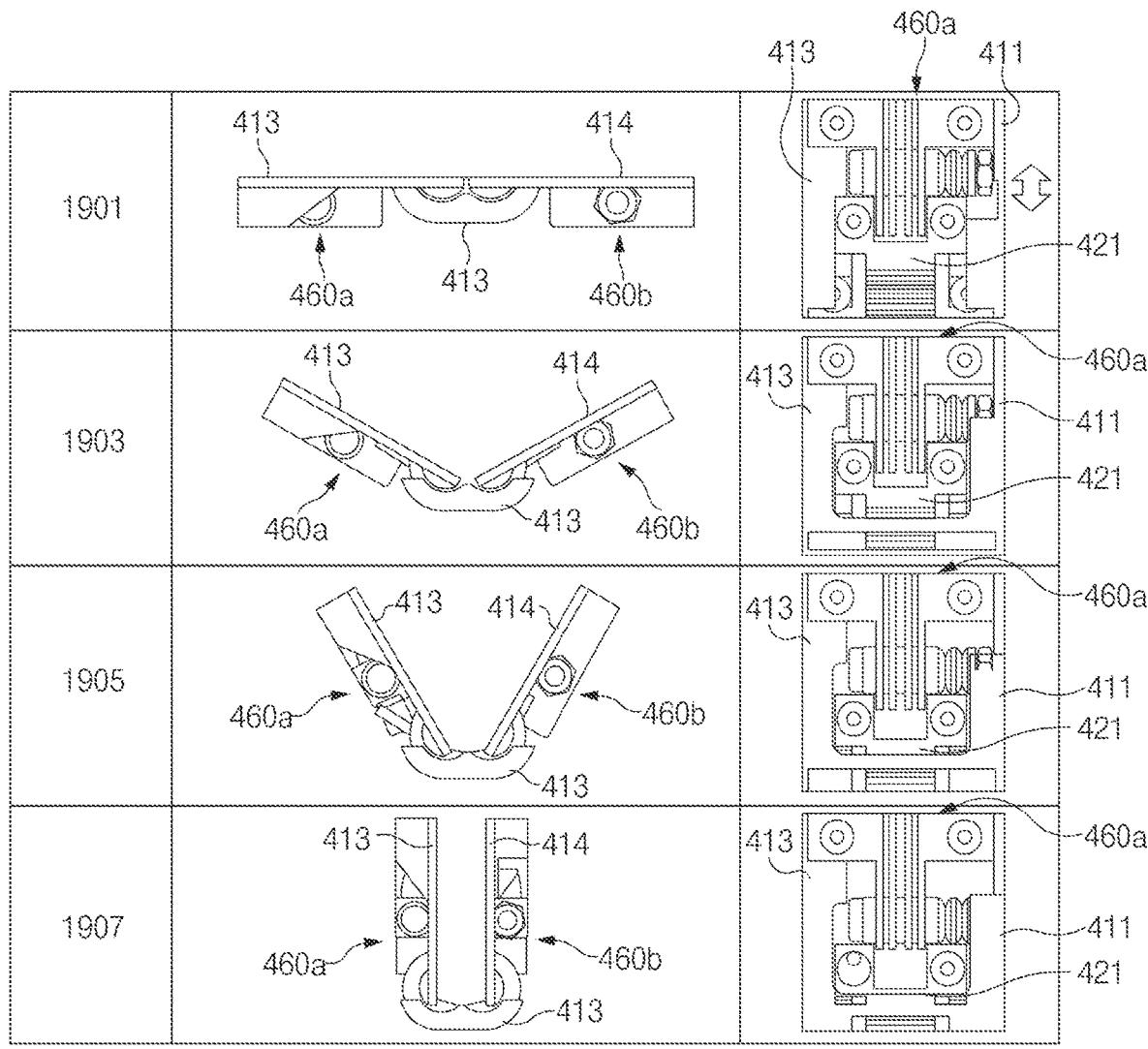
FIG. 19 is a view illustrating one example of a cam operation process of a hinge structure according to an embodiment of the disclosure.

FIG. 19 is a view illustrating one example of a cam operation process of a hinge structure according to an embodiment of the disclosure.

Referring to FIGS. 15 to 19, fifth type friction plates 461a1, 461a2, 461a3, and 461a4 may slide as a first rotary member 411 and a third rotary member 413 (or, a second rotary member 412 and a fourth rotary member 414) rotate. Here, a cam structure including ridges and valleys may be disposed on one side of friction plate 461a1 and one side of friction plate 461a4. A cam structure including ridges and valleys may be disposed on one side of the first friction-plate fixing member 464a1 and one side of the second friction-plate fixing member 464a2. The ridges and valleys of the cam structures formed on friction plate 461a1 and friction plate 461a4 may be formed on the flat base plates.

According to an embodiment, the hinge structure 400 may have a flat state. In this case, as in state 1901, the ridges and valleys formed on friction plate 461a1 may be disposed to be engaged with the valleys and ridges formed on the first friction-plate fixing member 464a1. The ridges and valleys formed on friction plate 461a4 may be disposed to be engaged with the valleys and ridges formed on the second friction-plate fixing member 464a2. Accordingly, the first elastic member 463a fastened to the first rotary shaft 451 may have a fourth length L4.

According to an embodiment, the hinge structure 400 may have a partially folded state. In this case, as in states 1903 and 1905, the ridges and valleys formed on friction plate 461a1 may be disposed to be engaged with the valleys and ridges formed on the first friction-plate fixing member 464a1. The ridges and valleys formed on friction plate 461a4 may be disposed to be engaged with the valleys and ridges formed on the second friction-plate fixing member 464a2. Accordingly, the space between friction plate 461a1 and the first friction-plate fixing member 464a1 and the space between friction plate 461a4 and the second friction-plate fixing member 464a2 may be larger than those in state 1901. In response, the width of the first elastic member 463a fastened to the first rotary shaft 451 may have a fifth length L5 smaller than the fourth length L4. As the width of the first elastic member 463a is decreased, the elastic force of the first elastic member 463a may be increased, and accordingly the contact strength of the fifth type friction plates 461 and the sixth type friction plates 463 may be raised, which results in an increase in frictional force.

According to an embodiment, the hinge structure 400 may have a folded state. For example, the first rotary member 411 and the third rotary member 413 may be disposed to face the second rotary member 412 and the fourth rotary member 414. In this case, as in state 1907, the valleys and ridges formed on friction plate 461a1 may be disposed to be engaged with the ridges and valleys formed on the first friction-plate fixing member 464a1. The ridges and valleys formed on friction plate 461a4 may be disposed to be engaged with the valleys and ridges formed on the second friction-plate fixing member 464a2. Accordingly, the space between friction plate 461a1 and the first friction-plate fixing member 464a1 and the space between friction plate 461a4 and the second friction-plate fixing member 464a2 may be the same as those in state 1901. In response, the width of the first elastic member 463a fastened to the first rotary shaft 451 may have the fourth length L4.

Figure 20:
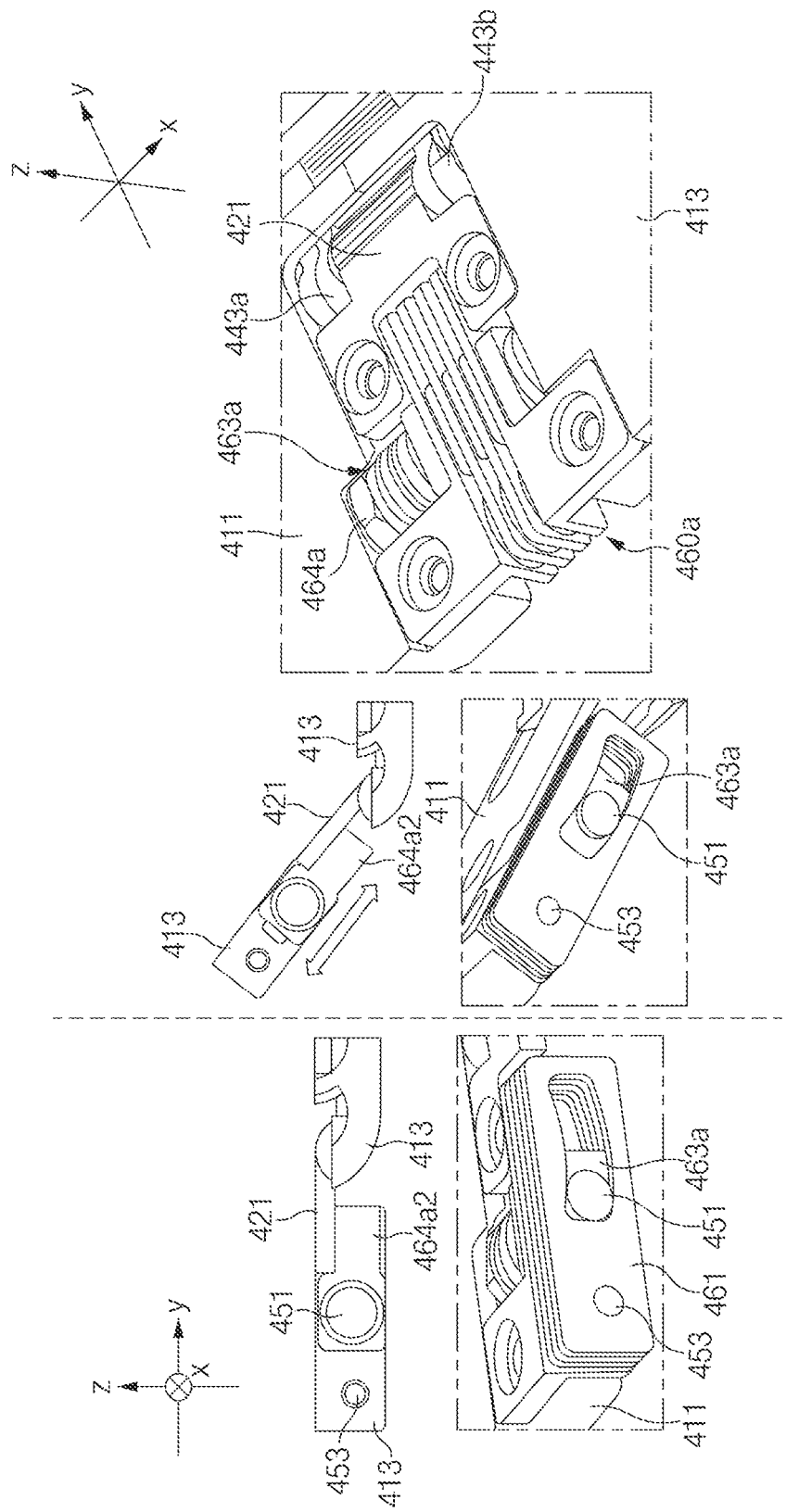
FIG. 20 is a view illustrating one example of an assembly process of a hinge structure according to an embodiment of the disclosure.

FIG. 20 is a view illustrating one example of an assembly process of a hinge structure according to an embodiment of the disclosure.

Referring to FIGS. 15 to 20, as in state 2001, a first arm 421, a second arm 422, a first idle gear 433, and a second idle gear 434 may be fixed by using a first gear bracket 443a and a second gear bracket 443b in the state in which a first idle gear 433 and a second idle gear 434 are disposed between a first arm 421 and a second arm 422, and a gear of a first arm 421, a first idle gear 433, a second idle gear 434, and a gear of the second arm 422 are engaged with each other.

In state 2003, the structure in which the first arm 421, the first idle gear 433, the second idle gear 434, the second arm 422, and the gear brackets 443a and 443b are fixed may be disposed in the arm seating recess 473c of the fixing bracket 473. In this process, the gear brackets 443a and 443b may be coupled to the recesses disposed in the arm seating recess 473c by using the fixing means 491_1, 491_2, 491_3, and 491_4.

In state 2005, the first rotary member 411, the second rotary member 412, the third rotary member 413, and the fourth rotary member 414 may be coupled to the fixing bracket 473. In this operation, the first rotary rail 411b of the first rotary member 411 may be inserted into the first rail coupling groove 473a1 of the fixing bracket 473, the second rotary rail 412b of the second rotary member 412 may be inserted into the second rail coupling groove 473a2 of the fixing bracket 473, the third rotary rail 413b of the third rotary member 413 may be inserted into the third rail coupling groove 473b1 of the fixing bracket 473, and the fourth rotary rail 414b of the fourth rotary member 414 may be inserted into the fourth rail coupling groove 473b2 of the fixing bracket 473.

In state 2007, the first torque providing member 460a may be assembled. For example, the first washer rings 462a1, 462*a*2, and 462*a*3 and the sixth type friction plates 463*a*1, 463*a*2, and 463*a*3 may be disposed to alternate with the fifth type friction plates 461*a*1, 461*a*2, 461*a*3, and 461*a*4. The fifth type friction plates 461*a*1, 461*a*2, 461*a*3, and 461*a*4 and the first washer rings 462*a*1, 462*a*2, and 462*a*3 may be fixed by using the first fixing shaft 453. The fifth type friction plates 461*a*1, 461*a*2, 461*a*3, and 461*a*4, the sixth type friction plates 463*a*1, 463*a*2, and 463*a*3, the first elastic member 463*a*, and the first fixing part 464*a* may be coupled by using the first rotary shaft 451. Accordingly, the first torque providing member 460*a* may be provided as in state 2009. The second torque providing member 460*b* may be provided by the same method as the assembly method in state 2007.

In state 2011, the assembled first torque providing member 460*a* and the assembled second torque providing member 460*b* may be coupled to the first arm 421 and the second arm 422, respectively.

Figure 21:
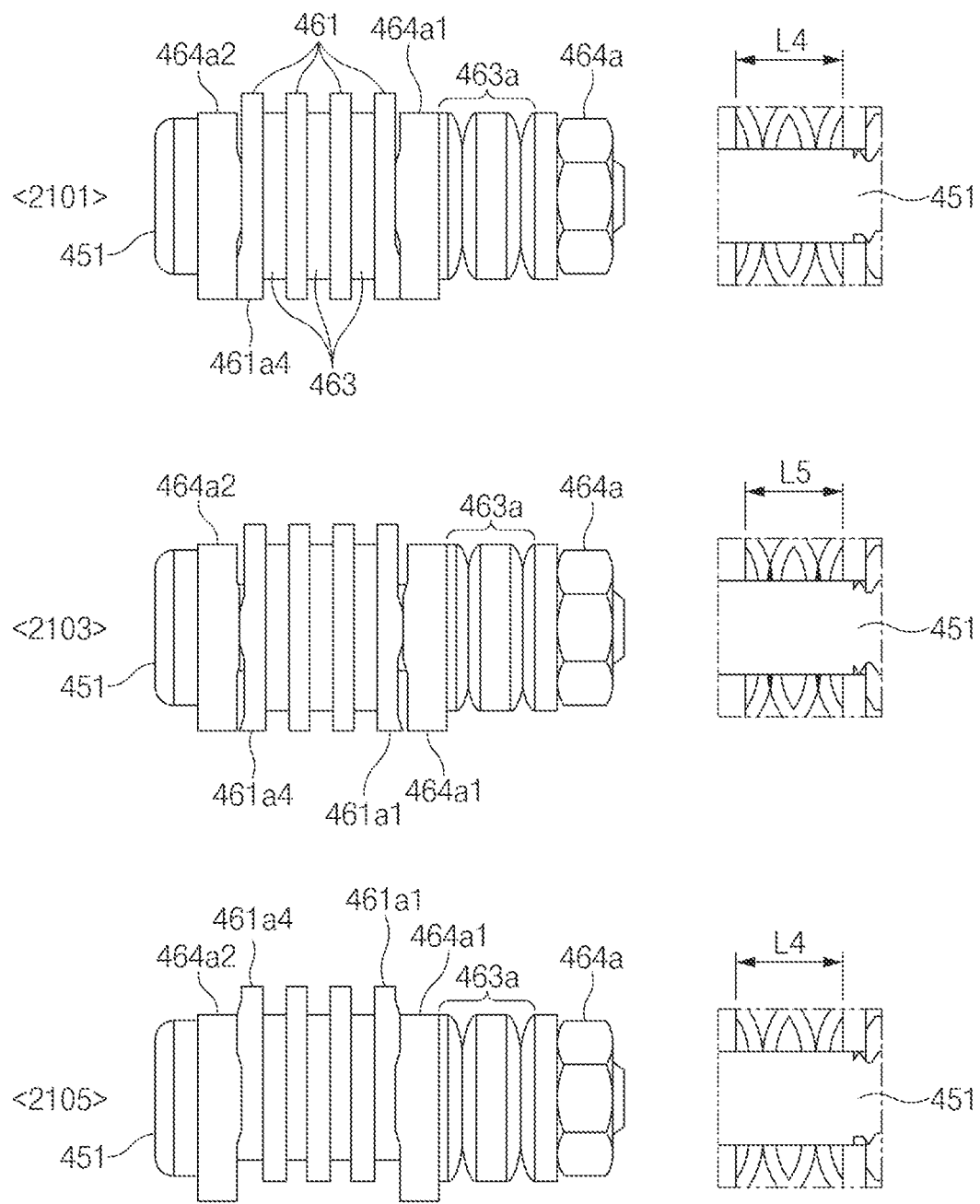
FIG. 21 is a view illustrating mounting forms of a hinge structure according to an embodiment of the disclosure.

FIG. 21 is a view illustrating mounting forms of a hinge structure according to an embodiment of the disclosure.

Referring to FIGS. 15 to 21, a hinge structure 400 may have various mounting states as illustrated. For example, as in state 2101, the hinge structure 400 may have a flat state. In this operation, the third rotary member 413 and the fourth rotary member 414 may be disposed side by side in a horizontal state. In the state of being coupled to the first arm 421 and the second arm 422, the first torque providing member 460*a* and the second torque providing member 460*b* may be disposed in the horizontal state.

As in state 2103 or 2105, the hinge structure 400 may have a partially folded state. In this case, ends of the fifth type friction plates 461 may be moved in a direction away from the first arm 421. The fifth type friction plates 461, while being moved, may generate friction with the sixth type friction plates 463. In this operation, the ridges of the cam structures formed on the friction-plate fixing members 464*a*1 and 464*a*2 and ridges of cam structures formed on specific friction plates (e.g., friction plate 461*a*1 and friction plate 461*a*4) may make contact with each other.

As in state 2107, the hinge structure 400 may have a folded state. In this case, at least part of the third rotary member 413 and at least part of the fourth rotary member 414 may be disposed to face each other. The fifth type friction plates 461 may slide with respect to the first rotary shaft 451 and may be disposed away from the first arm 421.

In the above-described hinge structure 400, while the first rotary member 411 and the third rotary member 413 rotate, the first rotary shaft 451 may not move, and the fifth type friction plates 461 may move (slide) and may generate friction required for generation of a frictional force.

As described above, an electronic device according to an embodiment may include a first housing 110, a second housing 120, and a hinge structure 200 that connects the first housing 110 and the second housing 120. The hinge structure 200 may include a first rotary member 211 connected with the first housing, a second rotary member 212 connected with the second housing, a gear structure 230 that makes the first rotary member and the second rotary member operate in conjunction with each other, a first arm 221 connected with the first rotary member, a second arm 222 connected with the second rotary member, a first torque providing member 260*a* that fastens the first arm and the first rotary member, and a second torque providing member 260*b* that fastens the second arm and the second rotary member. The first torque providing member 260*a* may include a first type friction plate 261*a* that moves depending on rotation of the first rotary member, a second type friction plate 262*a* that at least partially faces the first friction plate, and a first elastic member 263*a* that presses one side of the first friction plate or the second friction plate. The second torque providing member 260*b* may include a third type friction plate 261*b* that moves depending on rotation of the second rotary member, a fourth type friction plate 262*b* that at least partially faces the third friction plate, and a second elastic member 263*b* that presses one side of the third friction plate or the fourth friction plate.

According to various embodiments, the first torque providing member 260*a* may further include a first rotary shaft 251 coupled with the first friction plate, the second friction plate, and the first elastic member and fastened to a rack gear pattern (e.g., first arm gear pattern 221*d*) of the first arm to rotate in place depending on a movement of the first arm, and a first fixing shaft 253 fastened with the second friction plate. The second torque providing member 260*b* may further include a second rotary shaft 252 coupled with the third friction plate, the fourth friction plate, and the second elastic member and fastened to a rack gear pattern (e.g., second arm gear pattern 222*d*) of the second arm to rotate in place depending on a movement of the second arm, and a second fixing shaft 254 fastened with the fourth friction plate.

According to various embodiments, the first friction plate may include a hole into which the first rotary shaft is inserted and a hole into which the first fixing shaft is inserted, and the third friction plate may include a hole into which the second rotary shaft is inserted and a hole into which the second fixing shaft is inserted.

According to various embodiments, the second friction plate may include a hole into which the first rotary shaft is inserted, and at least part of a section of the hole of the second friction plate may include a straight portion. The fourth friction plate may include a hole into which the second rotary shaft is inserted, and at least part of a section of the hole of the fourth friction plate may include a straight portion.

According to various embodiments, the first rotary member may include a first insertion hole 211*d*_2 into which one side of the first rotary shaft is inserted and a second insertion hole 211*e*_2 into which one side of the first fixing shaft is inserted. The second rotary member may include a third insertion hole 211*f*_2 into which one side of the second rotary shaft is inserted and a fourth insertion hole 212*d*_2 into which one side of the second fixing shaft is inserted.

According to various embodiments, the first arm may include a first sliding hole 221*b*2 in which an opposite side of the first rotary shaft is disposed and a first gear fastening hole 221*c*2 into which one portion of the gear structure is inserted. The second arm may include a second sliding hole 222*b*2 in which an opposite side of the second rotary shaft is disposed and a second gear fastening hole 222*c*2 into which another portion of the gear structure is inserted.

According to various embodiments, the sliding holes may have an edge portion larger in size than a central portion.

According to various embodiments, the rack gear patterns may be formed in the sliding holes.

According to various embodiments, the first torque providing member 360*a* may further include a first rotary shaft 351 coupled with the first friction plate, the second friction plate, and the first elastic member and fastened to a rack gear pattern 311*d* of the first rotary member to rotate in place depending on a movement of the first rotary member, and a first fixing shaft 353 fastened with the second friction plate. The second torque providing member 360*b* may further include a second rotary shaft 352 coupled with the third friction plate, the fourth friction plate, and the second elastic member and fastened to a second rack gear pattern 312d of the second rotary member to rotate in place depending on a movement of the second rotary member, and a second fixing shaft 354 fastened with the fourth friction plate.

According to various embodiments, the hinge structure may further include sliding holes 311c and 312c that are formed in the rotary members and in which at least parts of the rotary shafts move.

According to various embodiments, the hinge structure may further include a first cam structure formed on the second friction plate and the fourth friction plate and a second cam structure formed on the first friction plate and the third friction plate.

According to various embodiments, the hinge structure may further include a fixed cam structure 211g formed on one side of each of the rotary members and a second rotary cam structure 251d_c formed on one side of each of the rotary shafts.

As described above, an electronic device according to an embodiment may include a first housing 110, a second housing 120, a display disposed on the first housing and the second housing, and a hinge structure 200 that connects the first housing and the second housing. The hinge structure may include a first rotary member 211 connected with the first housing, a second rotary member 212 connected with the second housing, a gear structure 230 that makes the first rotary member and the second rotary member operate in conjunction with each other, a first arm 221 connected with the first rotary member, a second arm 222 connected with the second rotary member, a first torque providing member 260a that fastens the first arm and the first rotary member, and a second torque providing member 260b that fastens the second arm and the second rotary member. The first torque providing member 260a may include a first type friction plate 261a that moves depending on rotation of the first rotary member, a second type friction plate 262a that at least partially faces the first friction plate, and a first elastic member 263a that presses one side of the first friction plate or the second friction plate. The second torque providing member 260b may include a third type friction plate 261b that moves depending on rotation of the second rotary member, a fourth type friction plate 262b that at least partially faces the third friction plate, and a second elastic member 263b that presses one side of the third friction plate or the fourth friction plate.

According to the various embodiments, the hinge structure may support manufacturing an electronic device having a compact shape and may stably support various angles of the electronic device by providing a high frictional force in relation to hinge operation.

Various other aspects and effects provided by the hinge structure and the electronic device including the same according to the various embodiments may be mentioned depending on the embodiments.

Each component (e.g., a module or a program) according to various embodiments may be composed of single entity or a plurality of entities, a part of the above-described sub-components may be omitted, or other sub-components may be further included in various embodiments. Alternatively or additionally, after being integrated in one entity, some components (e.g., a module or a program) may identically or similarly perform the function executed by each corresponding component before integration. According to various embodiments, operations executed by modules, programs, or other components may be executed by a successive method, a parallel method, a repeated method, or a heuristic method, or at least one part of operations may be executed in different sequences or omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A hinge structure comprising:
    a first rotary member connected with a first housing;
    a second rotary member connected with a second housing;
    a gear structure configured to make the first rotary member and the second rotary member operate in conjunction with each other;
    a first arm connected with the first rotary member;
    a second arm connected with the second rotary member;
    a first torque providing member configured to fasten the first arm and the first rotary member; and
    a second torque providing member configured to fasten the second arm and the second rotary member,
    wherein the first torque providing member comprises:
       a first friction plate configured to move depending on rotation of the first rotary member,
       a second friction plate configured to at least partially face the first friction plate, and
       a first elastic member configured to press one side of the first friction plate or the second friction plate, and
    wherein the second torque providing member comprises:
       a third friction plate configured to move depending on rotation of the second rotary member,
       a fourth friction plate configured to at least partially face the third friction plate, and
    a second elastic member configured to press one side of the third friction plate or the fourth friction plate,
    a first rotary shaft coupled with the first friction plate, the second friction plate, and the first elastic member; and
    a second rotary shaft coupled with the third friction plate, the fourth friction plate, and the second elastic member.

2. The hinge structure of claim 1, further comprising:
    a first fixing shaft fastened with the second friction plate, and
    a second fixing shaft fastened with the fourth friction plate.

3. The hinge structure of claim 2,
    wherein the first rotary member comprises:
       a first insertion hole into which one side of the first rotary shaft is inserted, and
       a second insertion hole into which one side of the first fixing shaft is inserted, and
    wherein the second rotary member comprises:
       a third insertion hole into which one side of the second rotary shaft is inserted, and
       a fourth insertion hole into which one side of the second fixing shaft is inserted.

4. The hinge structure of claim 3,
    wherein the first arm comprises:
       a first sliding hole in which an opposite side of the first rotary shaft is disposed, and
       a first gear fastening hole into which one portion of the gear structure is inserted, and
    wherein the second arm comprises:
       a second sliding hole in which an opposite side of the second rotary shaft is disposed, and
       a second gear fastening hole into which another portion of the gear structure is inserted.

5. The hinge structure of claim 4, wherein the sliding holes have an edge portion larger in size than a central portion.

6. The hinge structure of claim 4,
wherein the first rotary shaft fastened to a first rack gear pattern of the first arm to rotate in place depending on a movement of the first arm,
wherein a second rotary shaft fastened to a second rack gear pattern of the second arm to rotate in place depending on a movement of the second arm, and
wherein the first and the second rack gear patterns are formed in the sliding holes.

7. The hinge structure of claim 2,
wherein the first friction plate comprises:
a hole into which the first rotary shaft is inserted and a hole into which the first fixing shaft is inserted, and
wherein the third friction plate comprises:
a hole into which the second rotary shaft is inserted and a hole into which the second fixing shaft is inserted.

8. The hinge structure of claim 7,
wherein the second friction plate comprises a hole into which the first rotary shaft is inserted,
wherein at least part of a section of the hole of the second friction plate comprises a straight portion,
wherein the fourth friction plate comprises a hole into which the second rotary shaft is inserted, and
wherein at least part of a section of the hole of the fourth friction plate comprises a straight portion.

9. The hinge structure of claim 1,
wherein the
a first rotary is fastened to a rack gear pattern of the first rotary member to rotate in place depending on a movement of the first rotary member, and
wherein the second rotary shaft is fastened to a rack gear pattern of the second rotary member to rotate in place depending on a movement of the second rotary member.

10. The hinge structure of claim 9, further comprising:
sliding holes formed in the first and the second rotary members,
wherein at least parts of the first and the second rotary shafts move inside the sliding holes.

11. The hinge structure of claim 1, further comprising:
a first cam structure formed on the second friction plate and the fourth friction plate; and
a second cam structure formed on the first friction plate and the third friction plate.

12. The hinge structure of claim 1, further comprising:
a first cam structure formed on one side of each of the first and the second rotary members; and
a second cam structure formed on one side of each of the first and the second rotary shafts.

13. An electronic device comprising:
a first housing;
a second housing;
a display disposed on the first housing and the second housing; and
a hinge structure configured to connect the first housing and the second housing,
wherein the hinge structure comprises:
a first rotary member connected with the first housing,
a second rotary member connected with the second housing,
a gear structure configured to make the first rotary member and the second rotary member operate in conjunction with each other,
a first arm connected with the first rotary member,
a second arm connected with the second rotary member,
a first torque providing member configured to fasten the first arm and the first rotary member, and
a second torque providing member configured to fasten the second arm and the second rotary member,
wherein the first torque providing member comprises:
a first friction plate configured to move depending on rotation of the first rotary member,
a second friction plate configured to at least partially face the first friction plate, and
a first elastic member configured to press one side of the first friction plate or the second friction plate, and
wherein the second torque providing member comprises:
a third friction plate configured to move depending on rotation of the second rotary member,
a fourth friction plate configured to at least partially face the third friction plate, and
a second elastic member configured to press one side of the third friction plate or the fourth friction plate,
a first rotary shaft coupled with the first friction plate, the second friction plate, and the first elastic member; and
a second rotary shaft coupled with the third friction plate, the fourth friction plate, and the second elastic member.

14. The electronic device of claim 13, further comprising:
a hinge housing in which at least part of the hinge structure is seated.

15. The electronic device of claim 13, wherein the hinge structure further comprises
a first fixing shaft fastened with the second friction plate, and
a second fixing shaft fastened with the fourth friction plate.

16. The electronic device of claim 15,
wherein torque depending on friction of the first friction plate and the second friction plate configured to at least partially face each other is formed as the first rotary shaft rotates in place while moving in a first direction depending on rotation of the first rotary member, and
wherein torque depending on friction of the third friction plate and the fourth friction plate configured to at least partially face each other is formed as the second rotary shaft rotates in place while moving in a second direction opposite to the first direction depending on rotation of the second rotary member.

17. The electronic device of claim 13, wherein the first housing comprises a depression for seating the hinge housing.

18. The electronic device of claim 13,
wherein the first rotary shaft is fastened to a first rack gear pattern of the first arm to rotate in place depending on a movement of the first arm, and
wherein the second rotary shaft is fastened to a second rack gear pattern of the second arm to rotate in place depending on a movement of the second arm.

19. The electronic device of claim 13,
wherein the first rotary shaft is fastened to a first rack gear pattern of the first rotary member to rotate in place depending on a movement of the first rotary member, and
wherein the second rotary shaft is fastened to a second rack gear pattern of the second rotary member to rotate in place depending on a movement of the second rotary member.

* * * * *